US010878429B2

(12) United States Patent
Bakalis

(10) Patent No.: US 10,878,429 B2
(45) Date of Patent: Dec. 29, 2020

(54) SYSTEMS AND METHODS FOR USING CODES AND IMAGES WITHIN A BLOCKCHAIN

(71) Applicant: Konstantinos Bakalis, Brooklyn, NY (US)

(72) Inventor: Konstantinos Bakalis, Brooklyn, NY (US)

( * ) Notice: Subject to any disclaimer, the term of this patent is extended or adjusted under 35 U.S.C. 154(b) by 0 days.

(21) Appl. No.: 16/156,570

(22) Filed: Oct. 10, 2018

(65) Prior Publication Data

US 2019/0303951 A1 Oct. 3, 2019

Related U.S. Application Data

(60) Provisional application No. 62/649,464, filed on Mar. 28, 2018, provisional application No. 62/684,190, filed on Jun. 13, 2018.

(51) Int. Cl.
*G06Q 30/00* (2012.01)
*G06K 7/14* (2006.01)
(Continued)

(52) U.S. Cl.
CPC ..... *G06Q 30/0185* (2013.01); *G06K 7/10722* (2013.01); *G06K 7/12* (2013.01); *G06K 7/1413* (2013.01); *G06K 7/1417* (2013.01)

(58) Field of Classification Search
CPC ............ G06Q 30/018; G06Q 30/0185; G06Q 2220/00
(Continued)

(56) References Cited

U.S. PATENT DOCUMENTS 9,641,338 B2 5/2017 Sriram et al.
9,641,342 B2 5/2017 Sriram et al.
(Continued)

FOREIGN PATENT DOCUMENTS

| CN | 106709734 A | | 5/2017 |
|---|---|---|---|
| CN | 109146024 A | * | 1/2019 |
| WO | 2017165909 A1 | | 10/2017 |

OTHER PUBLICATIONS

High Value Data Sharing Protocol amongst the immigration authorities of the Five Country Conference. assets.publishing.service.gov.uk. Dec. 9, 2010. [Retrieved on: Jul. 3, 2019]. <URL:https://assets.publishing.service.gov.uk/government/uploads/system/uploads/attachment_data/file/257229/pia.pdf> (Year: 2010).*
(Continued)

*Primary Examiner* — Tamara Griffin
(74) *Attorney, Agent, or Firm* — Weber Rosselli & Cannon LLP

(57) ABSTRACT

Systems and methods allow customers to verify the authenticity or provenance of physical objects before purchasing or obtaining the physical objects. The methods involve scanning a code of or a pattern embedded or incorporated in a physical object in transit or upon creation, transmitting the scanned code and information of the physical object through the Internet, generating or updating a block based on the scanned code and the information, verifying or authenticating the block, and storing the block as an immutable part of a distributed ledger. The code or pattern is a unique identifier of the physical object. The methods may include capturing an image of the physical object (e.g., an identification card, document, or passport) or an object associated with the physical object to be used for secondary verification and generating or updating the block so as to include the obtained image in the block of the blockchain.

15 Claims, 64 Drawing Sheets

(51) Int. Cl.
*G06K 7/10* (2006.01)
*G06K 7/12* (2006.01)

(58) Field of Classification Search
USPC .................................... 705/50, 64, 317, 318
See application file for complete search history.

(56) References Cited

U.S. PATENT DOCUMENTS

| | | | |
|---|---|---|---|
| 10,581,847 B1* | 3/2020 | Sun ........................ | H04L 63/083 |
| 2006/0271787 A1* | 11/2006 | DeYoung .............. | H04L 9/3236 |
| | | | 713/176 |
| 2007/0220614 A1* | 9/2007 | Ellis .................... | G06F 21/6245 |
| | | | 726/27 |
| 2014/0304183 A1* | 10/2014 | Zabar ................... | G06Q 50/265 |
| | | | 705/321 |
| 2016/0098723 A1* | 4/2016 | Feeney .............. | G06Q 20/4016 |
| | | | 705/75 |
| 2016/0164884 A1 | 6/2016 | Sriram et al. | |
| 2016/0261411 A1 | 9/2016 | Yau et al. | |
| 2016/0330027 A1* | 11/2016 | Ebrahimi .............. | H04L 9/3066 |
| 2017/0024579 A1* | 1/2017 | Lacey ................... | G06Q 20/02 |
| 2017/0039575 A1 | 2/2017 | Kang | |
| 2017/0237553 A1 | 8/2017 | Sriram et al. | |
| 2017/0243193 A1 | 8/2017 | Manian et al. | |
| 2017/0257358 A1 | 9/2017 | Ebrahimi et al. | |
| 2017/0286974 A1 | 10/2017 | Weiss et al. | |
| 2017/0300905 A1* | 10/2017 | Withrow .............. | G06Q 10/087 |
| 2018/0005239 A1 | 1/2018 | Schlesinger et al. | |
| 2019/0044727 A1* | 2/2019 | Scott .................... | H04L 9/0891 |
| 2019/0114584 A1* | 4/2019 | Toohey .................. | H04W 4/35 |

OTHER PUBLICATIONS

O'Gorman et al. Secure Identification Documens Via Pattern Recognition and Public-Key Cryptography. IEEE Transactions on Pattern Analysis and Machine Intelligence, vol. 20, No. 10. Oct. 1998. [Retrieved on: Oct. 8, 2020]. entire document (Year: 1998).*
PCT Search Report and Written Opinion issued in corresponding application No. PCT/US19/023324 dated Jul. 2, 2019.
PCT Search Report and Written Opinion issued in related PCT Application No. PCT/US19/37124 dated Oct. 18, 2019, 13 pages.

* cited by examiner

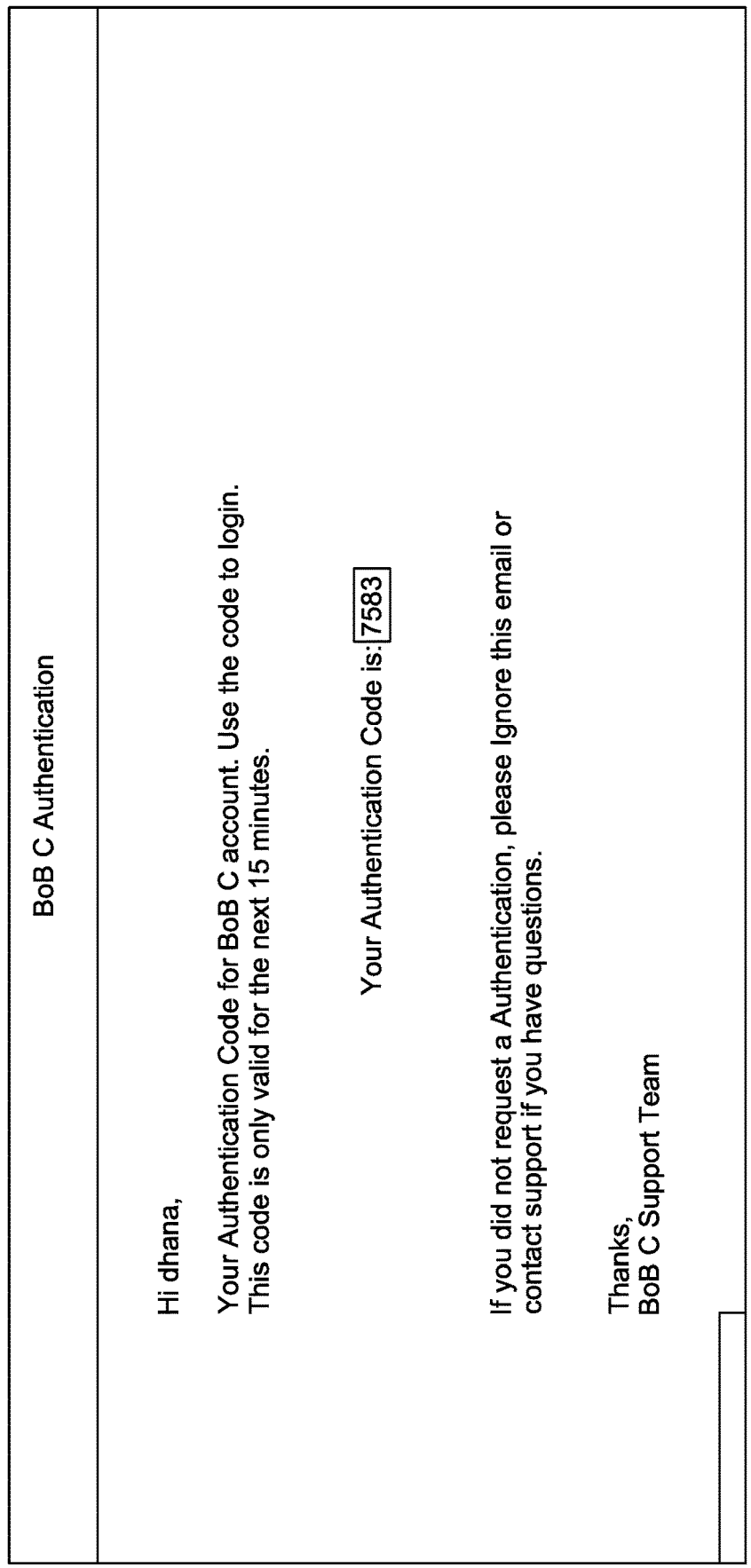

FIG. 15

BoB C dhana ▶

- ⊞ Dashboard
- ▤ Create Project
- ⊞ Create Product
- ⊟ Create Batch
- ⊞ Generate UPC Code
- ⊚ View UPC Code
- ✎ Update UPC Code
- ⚇ Users
- Acitivty Log ⋯ Project Project Details Project created successfully    ✕

Show 10 entries

ADD NEW

Search records

| Project Name | ⇅ Project Description | ⇅ Created Date | ⇅ Author | ⇅ Actions |
|---|---|---|---|---|
| Bobc demo project | bobc demo project description | 7/30/2018 8:56:53 PM | dhana | ✎ ✕ |

Showing 1 to 1 of 1 entries

FIRST  PREVIOUS  ① NEXT  LAST

© 2018. All Rights Reserved. Elegant Simplicity Corp.

BoB C dhana

- Dashboard
- Create Project
- [+] Create Product
- Create Batch
- Generate UPC Code
- View UPC Code
- Update UPC Code
- Users
- Activity Log ⊙ Product Product Details Product Created Successfully ✕

Show 10 Entries                                    Search records

| Project Name ⇅ | Product Name ⇅ | ID ⇅ | Description ⇅ | Created Date ⇅ | Author ⇅ | Actions ⇅ |
|---|---|---|---|---|---|---|
| Bobc demo project | Demo product name | 828 | Demo product description | 7/30/2018 8:57:51 PM | dhana | ✎ ✕ |

Showing 1 to 1 of 1 entries                FIRST PREVIOUS ① NEXT LAST

ADD NEW

© 2018. All Rights Reserved. Elegant Simplicity Corp.

BoB C
dhana

- Dashboard
- Create Project
- Create Product
- Create Batch
- Generate UPC Code
- View UPC Code
- Update UPC Code
- Users Batch Batch Details Show 10 entries                                                    ADD NEW Search records
_____
PROJECT NAME↑↓ | PRODUCT NAME↑↓ | BATCH NAME↑↓ | SHORT CODE↑↓ | CREATED DATE↑↓ | AUTHOR↑↓ | ACTION↑↓
Bobc demo Project | Demo product name | bobc demo batch | 124 | 7/30/2018 8:58:49 PM | dhana | ✎ ✕

Showing 1 to 1 of 1 entries                              FIRST  PREVIOUS ① NEXT  LAST © 2018. All Rights Reserved. Elegant Simplicity Corp.

13.127.235.179/Bobc/Web/Barcode.aspx

UPC code details

Show 10 entries | | | | | Search records

| UPC code Id ↑↓ | Project Name ↑↓ | Product Name ↑↓ | Batch Name ↑↓ | Created Date | ↑↓Author↑↓ | View↑↓ |
|---|---|---|---|---|---|---|
| 032630892806 | Bobc demo project | Demo product name | bobc demo batch | 2018-07-30 20:59:22.513 | dhana | ⦿ |
| 0df86073f383 | Bobc demo project | Demo product name | bobc demo batch | 2018-07-30 20:59:22.513 | dhana | ⦿ |
| 132bc7911531 | Bobc demo project | Demo product name | bobc demo batch | 2018-07-30 20:59:22.513 | dhana | ⦿ |
| 1b1c2bc50dc1 | Bobc demo project | Demo product name | bobc demo batch | 2018-07-30 20:59:22.513 | dhana | ⦿ |
| 62d380829565 | Bobc demo project | Demo product name | bobc demo batch | 2018-07-30 20:59:22.513 | dhana | ⦿ |
| 8b1879503212 | Bobc demo project | Demo product name | bobc demo batch | 2018-07-30 20:59:22.513 | dhana | ⦿ |
| 9d66bf8bcfb1 | Bobc demo project | Demo product name | bobc demo batch | 2018-07-30 20:59:22.513 | dhana | ⦿ |
| b605a0a2f235 | Bobc demo project | Demo product name | bobc demo batch | 2018-07-30 20:59:22.513 | dhana | ⦿ |
| c021f6f32be0 | Bobc demo project | Demo product name | bobc demo batch | 2018-07-30 20:59:22.513 | dhana | ⦿ |
| e44a5d2e48f8 | Bobc demo project | Demo product name | bobc demo batch | 2018-07-30 20:59:22.513 | dhana | ⦿ |

Showing 1 to 10 of 10 entries

FIRST PREVIOUS (1) NEXT LAST

BoB C
dhana

- Dashboard
- Create Project
- Create Product
- Create Batch
- Generate UPC Code
- View UPC Code
- Update UPC Code
- Users 13.127.235.179/Bobc/web/barcodedetails.aspx?key=aa568e11-c416-46f5-8f2a-6f4...

| BoB C | | |
|---|---|---|
| dhana | | |
| ▦ Dashboard | | Delivery date > |
| ▤ Create Project | Origin ⌄ | Warranty claim details > |
| ⊞ Create Product | Invoice Number ⌄ | Order Number > |
| ▤ Create Batch | Hash Code ⌄ | Shipment date > |
| ⊞ Generate UPC Code | 234567 | Customer id > |
| ⊚ View UPC code | HASH CODE | |
| ✎ Update UPC Code | Warranty begin date ⌄ | |
| ⚙ Users | | |
| ⌕ Activity Log | | |

UPC Code: 03263089280 ✎

CHECK AVAILABILITY

Payment details ⌄
Shipment details ⌄
Warranty end date ⌄
Processing date ⌄
Quality Check ⌄

| BoB C | ⊕ Activity Log | | | | | | 田 ⋈ |
|---|---|---|---|---|---|---|---|
| ⊛ dhana ▸ | Our Users | | | | | Search records | |
| | Show 10 entries | | | | | | |
| ⊞ Dashboard | Name ↑↓ Email | ↑↓ PHONE NUMBER | ↑↓ CREATED DATE | ↑↓ API KEY | | ↑↓ USER ROLE | ↑↓ VIEW |
| 目 Create Project | dhana dhanarubanilt@gmail.com | 9944068282 | 7/30/2018 8:53:01 PM | 0d25b2c7-0961-4bba-b15a-49c2a92c97e6 | | (ADMIN) | ⊚ |
| ⊞ Create Product | Showing 1 to 1 of 1 entries | | | | FIRST PREVIOUS ① NEXT | | LAST |
| 昌 Create Batch | | | | | | | |
| ▦ Generate UPC Code | | | | | | | |
| ⊚ View UPC Code | | | | | | | |
| ✎ Update UPC Code | | | | | | | |
| ⨳ Users | | | | | | | |
| ⚙ Activity Log | © 2018. All Rights Reserved. Elegant Simplicity Corp. | | | | | | |

BoB C dhana ▶

About Me
Bobc Demo

⊞ Dashboard
▤ Create Project
⊞ Create Product
▤ Create Batch
▥ Generate UPC Code
◉ View UPC Code
✎ Update UPC Code
⧉ Users
⎔ Activity Log City
Fresno Zip Code
937283

State

Login/Logout Details

Show 10 entries

Search records

| Date ↑↓ | Email ↑↓ | IP ADDRESS ↑↓ | COUNTRY CODE ↑↓ | REGION NAME ↑↓ | CITY ↑↓ | LATITUDE ↑↓ | LONGITUDE ↑↓ | STATUS ↑↓ |
|---|---|---|---|---|---|---|---|---|
| 7/30/2018 8:53:23 PM | | 122.174.180.72 | IN | TAMIL NADU | Chennai | 13.0833 | 80.2833 | (LOGIN) |

Showing 1 to 1 of 1 entries

FIRST  PREVIOUS  ① NEXT  LAST

| BoB C | | | | | | |
|---|---|---|---|---|---|---|
| Zeesta ▸ | | | | | | |
| ▦ Dashboard | Showing 1 to 5 of 5 entries | | FIRST | PREVIOUS | ① NEXT | LAST |
| ⓘ Admin Ticket | | | | | | |
| | ☐ Top 5 recent UPC code | | | | | |
| | Show 10 entries | | | Search records | | |
| | UPC CODE | ↑↓PROCESSING DATE ↑↓ORDER NUMBER | ↑↓INVOICE NUMBER | ↑↓CREATED DATE | ↑↓ AUTHOR | ↑↓ |
| | 0df86073f383 | | | 7/30/2018 8:59:22 PM | dhana | |
| | 132BC7911531 | | | 7/30/2018 8:59:22 PM | dhana | |
| | 1b1c2bc50dc1 | | | 7/30/2018 8:59:22 PM | dhana | |
| | 9d66bf8bcfb1 | | | 7/30/2018 8:59:22 PM | dhana | |
| | e44a5d2e48f8 | | | 7/30/2018 8:59:22 PM | dhana | |
| | Showing 1 to 5 of 5 entries | | FIRST | PREVIOUS | ① NEXT | LAST |

© 2018. All Rights Reserved. Elegant Simplicity Corp.

Waiting for 13.127.235.179...

FIG. 25B

BoB C

🌐 Zeesta ▸

▦ Dashboard

⑦ Admin Ticket

⋯ Admin Tickets

All Ticket

Show 10 entries

| Ticket ID | ↕ SUBJECT | ↕ AUTHOR | ↕ CREATED DATE | ↕ STATUS | ↕ UPDATE |
|---|---|---|---|---|---|
| BC7622233 | Test Ticket | dhana | 7/30/2018 10:02:20 PM | Pending | ✎ |
| BC8958578 | Demo user test ticket | rafeeq | 7/30/2018 10:05:30 PM | Pending | ✎ |

Showing 1 to 2 of 2 entries

Search records

FIRST   PREVIOUS ① NEXT   LAST

© 2018. All Rights Reserved. Elegant Simplicity Corp.

SYSTEMS AND METHODS FOR USING CODES AND IMAGES WITHIN A BLOCKCHAIN

BACKGROUND

1. Technical Field

The present disclosure relates to systems and method for applying blockchain technology in managing physical objects and physical identification objects with unique codes and patterns and monitoring physical objects such as products from creation to delivery.

2. Background of Related Art

Patterns or codes, such as barcodes, have been used in various industries to identify and track products. For example, the Universal Product Code (UPC) has been widely used in many countries. As shown in FIG. 1, the first six to nine digits of a UPC are referred to as company prefixes. A non-profit organization, GS1, is the global standards organization for item/shipment identification and administers assignments of the company prefixes. This number uniquely identifies a company and always remains constant on all of a company's products. The next set of digits is called product numbers, which uniquely identify individual items. Unlike the GS1 company prefixes, product numbers are arbitrarily assigned by each company. The twelfth character is called the check digit, which is calculated by using a mathematical calculation based on the first 11 digits of the UPC code. Global identifiers such as UPC barcodes make it easier to manage product information in a database and allow local stores to easily retrieve information of the products at the point of sale by merely scanning the UPC barcode.

A common mistake companies make is creating their own UPC numbers. Any company cannot make up its own UPC number. To have a UPC code scanned at a point of sale, the UPC code must contain a GS1 assigned company prefix, also known as a manufacturer prefix. However, every UPC code is stored in a database locally and independently. Hence, it can be duplicated, counterfeited, and/or stolen. It is also logistically challenging to track each product in the event a product deviates from its supply chain trajectory. In this case, the product becomes an unnoticeable loss in revenue.

SUMMARY

According to an embodiment of the present disclosure, an apparatus for authenticating the provenance of physical objects includes a network device configured to receive logistic information of a physical object from a scanner, which scans a code of the physical object; and one or more computing devices configured to generate, verify, and store a block based on the logistic information and the scanned code. The one or more computing devices are positioned within a local area network and store a distributed ledger. The generated block is saved as a part of the distributed ledger, and the code is a unique identifier of the physical object.

According to an embodiment of the present disclosure, a method for authenticating the provenance of physical objects includes scanning a code of a physical object in transit; transmitting the scanned code and logistic information of the physical object through the Internet; generating, by one or more computing devices, a block based on the scanned code and the logistic information; verifying, by one or more computing devices, the block; and storing the block as a part of a distributed ledger, which is saved in the one or more computing devices. The one or more computing devices are positioned within a local area network, and the code is a unique identifier of the physical object.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an apparatus for authenticating provenance of physical objects, the apparatus including: a network device configured to receive logistic information of a physical object from a scanner, which scans a code of the physical object. The apparatus also includes one or more computing devices configured to generate, verify, and store a block based on the logistic information and the scanned code. The apparatus also includes one or more computing devices which are positioned within a local area network. The apparatus also includes one or more computing devices that store a distributed ledger. The generated block may be saved as a part of the distributed ledger. The code may be a unique identifier of the physical object. Other embodiments of this aspect include corresponding computer systems, apparatus, and computer programs recorded on one or more computer storage devices, each configured to perform the actions of the methods.

One general aspect includes a method for authenticating provenance of physical objects, the method including: scanning a code of a physical object in transit or upon creation. The method also includes transmitting the scanned code and logistic information of the physical object through the internet. The method also includes generating or updating, by one or more computing devices, a block based on the scanned code and the logistic information. The method also includes verifying or authenticating, by one or more computing devices, the block. The method also includes storing the block as a part of a distributed ledger, which is saved in the one or more computing devices. The one or more computing devices may be positioned within a local area network. The code may be a unique identifier of the physical object. Other embodiments of this aspect include corresponding computer systems, apparatus, and computer programs recorded on one or more computer storage devices, each configured to perform the actions of the methods.

Implementations may include one or more of the following features. The code may be a QR code, a bar code, a serialized code, a code or pattern etched in the physical object, a material embedded in the physical object and having a pattern readable by illuminating the material with ultraviolet light, infrared light, blue light, or red light. The scanned code may be in digital form. The method may further include obtaining an image of the physical object or an image of an object associated with the physical object. The method may also include generating or updating, by the one or more computing devices, the block so as to include the obtained image. The method may also include performing secondary verification based on the image of the physical object or the image of the object associated with the physical object. The physical object may be an identification document or a passport, or the object associated with the physical object is a factory where the physical object was produced or is an image of a person identified in the identification document or the passport. The method may further include identifying or flagging information in blocks that is duplicative of information in existing blocks. The method may further include continuously updating the distributed ledger as the physical object is transported or used to verify the identity of a person. The physical object may be currency, teacups, clothing, eyewear, pharmaceuticals, alcohol, tobacco, footwear, eyewear, socks, underwear, toothpaste, soda cans, butane, hardware, plywood, hammers, rakes, nails, topsoil, a three-dimensional printed object, blueprints, chickens, foodstuffs, components of a vehicle, containers holding liquids such as crude oil or gasoline, or any item that can be produced or manufactured. The method may further include determining whether all codes of a set of known codes are scanned. The method may also include generating a message indicating that one or more physical objects are lost or stolen, when it is determined that not all codes of the set of known codes are scanned. Implementations of the described techniques may include hardware, a method or process, or computer software on a computer-accessible medium.

One general aspect includes a mobile apparatus for obtaining information about products saved in a distributed ledger, the mobile apparatus including: an image capturing device configured to capture an image of a code of a product to obtain a scanned code. The mobile apparatus also includes a network interface configured to communicate with a server, which includes a distributed ledger for saving information of a plurality of products, to obtain information of the product based on the scanned code. The mobile apparatus also includes a display. The mobile apparatus also includes one or more processors. The mobile apparatus also includes a memory including instructions stored thereon that, when executed by the one or more processors, cause the mobile apparatus to control the display to display a user interface. The user interface may include a plurality of items, where corresponding information of the product is displayed. Other embodiments of this aspect include corresponding computer systems, apparatus, and computer programs recorded on one or more computer storage devices, each configured to perform the actions of the methods.

Implementations may include one or more of the following features. The code may be a one-dimensional or two-dimensional code. The two-dimensional code may be an Aztec code, a data matrix code, a PDF-417 code, or a QR code. The instructions, when executed by the one or more processors, may further cause the network interface to connect to a predetermined internet address of the server. The information may include a manufacturer, a date of sale, origin of the product, a date of creating the information, an order number, an invoice number, payment details, shipping date, hash code, shipment number, delivery date, customer identification, warranty begin date, warranty end date, or warranty claim details. The mobile apparatus may execute an Android or iOS operating system. The mobile apparatus may display a warning that the code is invalid when the code does not match any information saved in the distributed ledger. Implementations of the described techniques may include hardware, a method or process, or computer software on a computer-accessible medium.

One general aspect includes a method for obtaining information of a product saved in a distributed ledger, the method including: scanning a barcode of a product. The method also includes communicating with a server, which saves information of a plurality of products in a distributed ledger, based on the scanned barcode. The method also includes retrieving information of the product from the server based on the scanned barcode in a case that the server finds a matched product and transmits the information of the product. The method also includes displaying a warning in a case that the server does not have any information corresponding to the scanned barcode. The method also includes displaying a user interface including a plurality of items with corresponding information of the product. Other embodiments of this aspect include corresponding computer systems, apparatus, and computer programs recorded on one or more computer storage devices, each configured to perform the actions of the methods.

Implementations may include one or more of the following features. The scanned barcode may include a piece of information, which leads to an internet protocol address of the server. The scanned barcode may include an identification of the product, which is saved in the distributed ledger. Implementations of the described techniques may include hardware, a method or process, or computer software on a computer-accessible medium.

One general aspect includes a method for validating authenticity of a physical identification object, the method including: storing a plurality of images and codes of physical identification objects in a blockchain residing at one or more server devices. The method also includes obtaining a code from a physical identification object. The method also includes searching the plurality of codes for the obtained code. The method also includes transmitting a read-only image of a physical identification object corresponding to the obtained code to a client device via a high value data sharing protocol. The method also includes displaying the read-only image of the physical identification object corresponding to the obtained code. The method also includes receiving input regarding whether the physical identification object is a valid identification document based on the read-only image of the physical identification object. Other embodiments of this aspect include corresponding computer systems, apparatus, and computer programs recorded on one or more computer storage devices, each configured to perform the actions of the methods.

Implementations may include one or more of the following features. The method may further include: imaging or scanning at least a portion of the physical identification object. The method may also include comparing the imaged or scanned at least a portion of the physical identification object with the read-only image of the physical identification object to determine whether the imaged or scanned physical identification object is authentic. The method may further include displaying an error message if it is determined that the imaged or scanned physical identification object is not authentic. The method may further include displaying a scan screen after determining whether the imaged or scanned physical identification object is authentic to scan another physical identification object. The method may further include obtaining the code includes imaging or scanning at least a portion of the physical identification object including the code and performing image recognition to determine a numeric or alphanumeric string corresponding to the code. The physical identification object may be a driver license, a passport, a visa, a chip embedded within a document (parent and child relationship), a film within currency, a hologram, or a government identification document or card. The client device may be a mobile device, a smart phone, a tablet, a laptop, or a desktop computer. The method may further include comparing one or more features of the imaged or scanned at least a portion of the physical identification object with one or more corresponding features of the read-only image of the physical identification object. The one or more features may include facial features of a photo of a person or security features. The code may be a QR code, a bar code, a serialized code, a chip, a code or pattern etched in the physical identification object, or a material embedded in the physical identification object and having a pattern readable by illuminating the material with ultraviolet light, infrared light, blue light, or red light. Implementations of the described techniques may include hardware, a method or process, or computer software on a computer-accessible medium.

BRIEF DESCRIPTION OF THE DRAWINGS

Embodiments of the present disclosure are described herein with reference to the accompanying drawings, wherein:

FIGS. 14A-14D are examplary user interfaces for accessing the system according to an embodiment of the present disclosure;

FIG. 15 is an examplary user interface illustrating a dashboard according to an embodiment of the present disclosure;

FIGS. 16A and 16B are examplary user interfaces for creating a project within the system according to an embodiment of the present disclosure;

FIGS. 17A-17C are examplary user interfaces for creating a product within the system according to an embodiment of the present disclosure;

FIGS. 18A-18D are examplary user interfaces for creating a batch within the system according to an embodiment of the present disclosure;

FIGS. 19A-19C are examplary user interfaces for generating and printing UPC codes according to an embodiment of the present disclosure;

FIGS. 20A and 20B are examplary user interfaces for viewing UPC code details within the system according to an embodiment of the present disclosure;

FIGS. 21A-21E are examplary user interfaces for updating UPC codes according to an embodiment of the present disclosure;

FIGS. 22A and 22B are examplary user interfaces for viewing and adding users to the system according to an embodiment of the present disclosure;

FIGS. 23A-23D are examplary user interfaces for viewing the activity logs of users associated with the system according to an embodiment of the present disclosure;

FIGS. 24A-24D are examplary user interfaces for viewing and creating tickets and exchanging messages in the system according to an embodiment of the present disclosure;

FIGS. 25A and 25B are examplary user interfaces illustrating a dashboard for an administrator of the system according to an embodiment of the present disclosure;

FIGS. 26A-26C are examplary user interfaces for monitoring tickets and exchanging messages in the system according to an embodiment of the present disclosure;

DETAILED DESCRIPTION OF EMBODIMENTS

Embodiments of the presently disclosed systems and methods for managing physical objects using blockchain technology are described in detail with reference to the drawings. The systems and methods prevent product duplication and help reduce the risk of false product delivery. The systems using the blockchain provide a secure service that allows production management to track or monitor their product from creation to delivery like a peer-to-peer connection. The blockchain systems and methods employ no cryptocurrencies and thus, the burden on the systems and the network is lowered.

Figure 1:
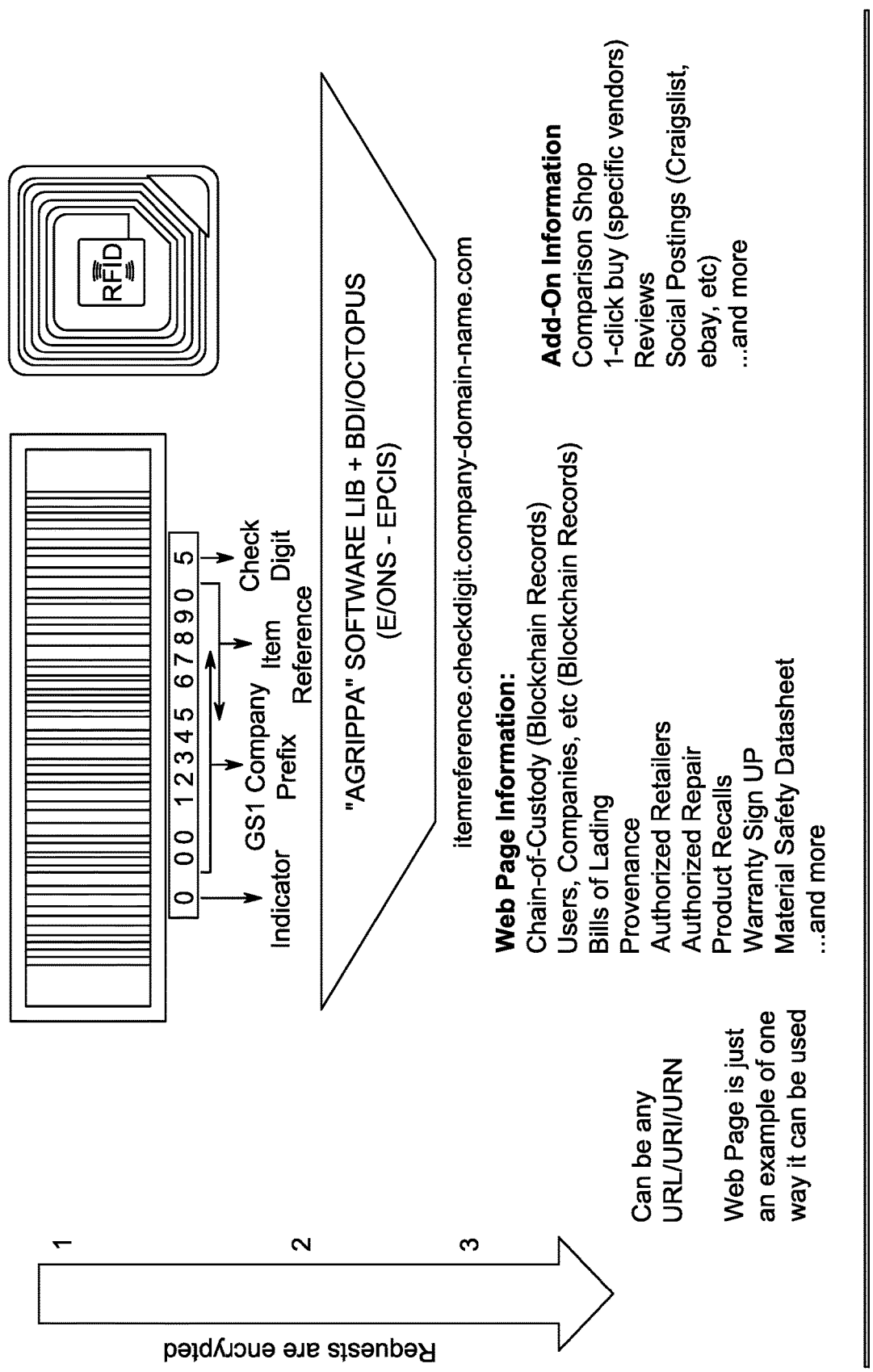
FIG. 1 is a graphical illustration showing a barcode and related information according to an embodiment of the present disclosure.

FIG. 1 is a graphical illustration showing a barcode and related information according to an embodiment of the present disclosure. The barcode is used to uniquely identify a product or other physical object as described above. It is contemplated that other codes can be used in place of or in addition to a barcode such as a QR Code, an RFID, and a bokode. The barcode may be used to access a website and to obtain further information about the product by using blockchain technology. The address of the website may be comprised of the barcode, such as item-reference.checkdigit.company-domain-name.com. The address may be URL, URI, or URN. Such information may be chain-of-custody, users, companies, bills of lading, provenance, authorized retailers, authorized repairers, product recalls, warranty sign up, material safety datasheet, etc. Further information may be added and include comparison shop, 1-click buy, reviews, social postings in Craigslist and eBay, etc. If the codes of two notes match, a fake product may be easily identified and removed from circulation. By using the unique product identification on the blockchain, crime and theft can be easily identified, solved, and reduced in the future.

If the stolen product identification on the blockchain is paid for their daily needs in the market and other public places by those who steal can be easily identified to the respective authorities by declaring those as non-functional.

As each banking transaction of the product identification on the blockchain, currency notes are scanned and details are updated in the core-server for each scanning, the barcode currency notes in circulation on a daily can be easily registered. The bank details, account number and the place of the last transaction of the currency note can be easily traced and by scanning the product identification on the blockchain currency notes, the total number of currency notes could be verified and tallied periodically with total printed and distributed currency notes.

In an embodiment, the management systems and methods of disclosed in the present disclosure, there is no incentive to run a full node within the ecosystem. Generally, a reward for running a full node by an individual would help bolster the network, add security, and speed up verifications. Rewards may be that blockchain is used for a much broader range of assets than just cryptocurrency. One can look at a cryptocurrency ledger and see all the transactions that happened, but the account information is a meaningless sequence of numbers. On the other hand, compliance requirements within the supply chain management framework requires producers and end users to know exactly who they are dealing with and this is one of the key reward or advantages of blockchain technology.

In another embodiment, products which have not been used in a certain time duration or interval may be identified and those products may be declared as black or hidden products. These products may be replaced with the corresponding product identification on the blockchain and those who are laundering the wealth to avoid taxation or confiscation can be stopped.

Figure 2:
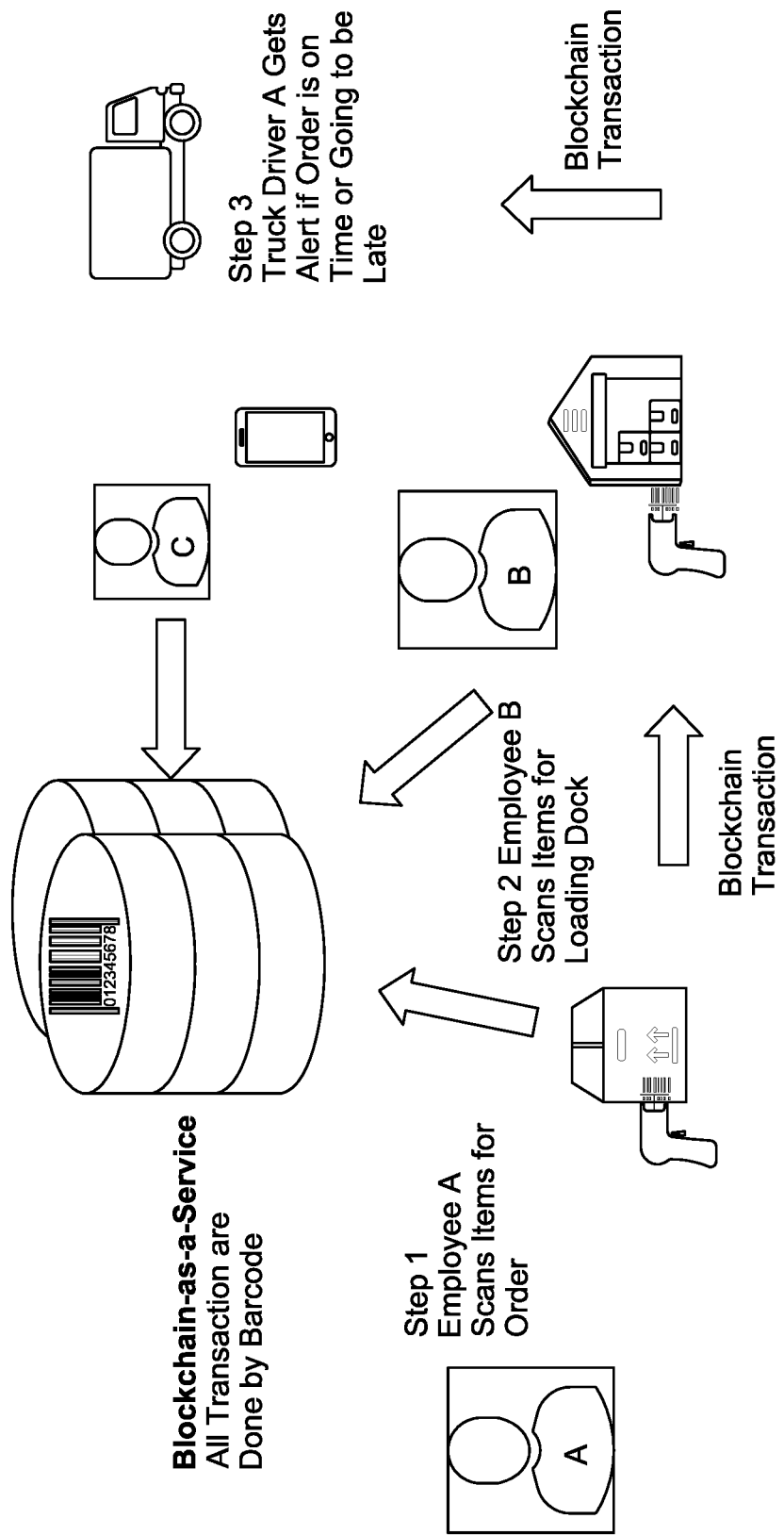
FIG. 2 is a graphical illustration of a system using blockchain technology according to an embodiment of the present disclosure.

FIG. 2 is a graphical illustration showing blockchain-as-a-service according to an embodiment of the present disclosure. The management system may be implemented as blockchain-as-a-service or in an already existing company system as software-as-a-service. When a customer initiates and send to employee A an order together with order information, the employee A receives and gets the order of products ready. The products may include a barcode as shown in FIG. 1, which may be scanned. The product information may then be sent to the management system, which updates and stores the product information using blockchain in a hyperledger.

During the transit of products, employee B receives products and scans the barcodes disposed on the products. Information regarding the reception time, delivery time, the location of the storehouse, etc. may be sent to the management system when scanned information is transmitted. Similar information may be transmitted to the management system at a different place and at a different time by employee C.

In an aspect, a truck driver may be alerted when the product is on time or going to be late. In this regard, the information about the product may include a schedule of delivery or estimated course of custody based on information stored in the hyperledger.

Figure 3:
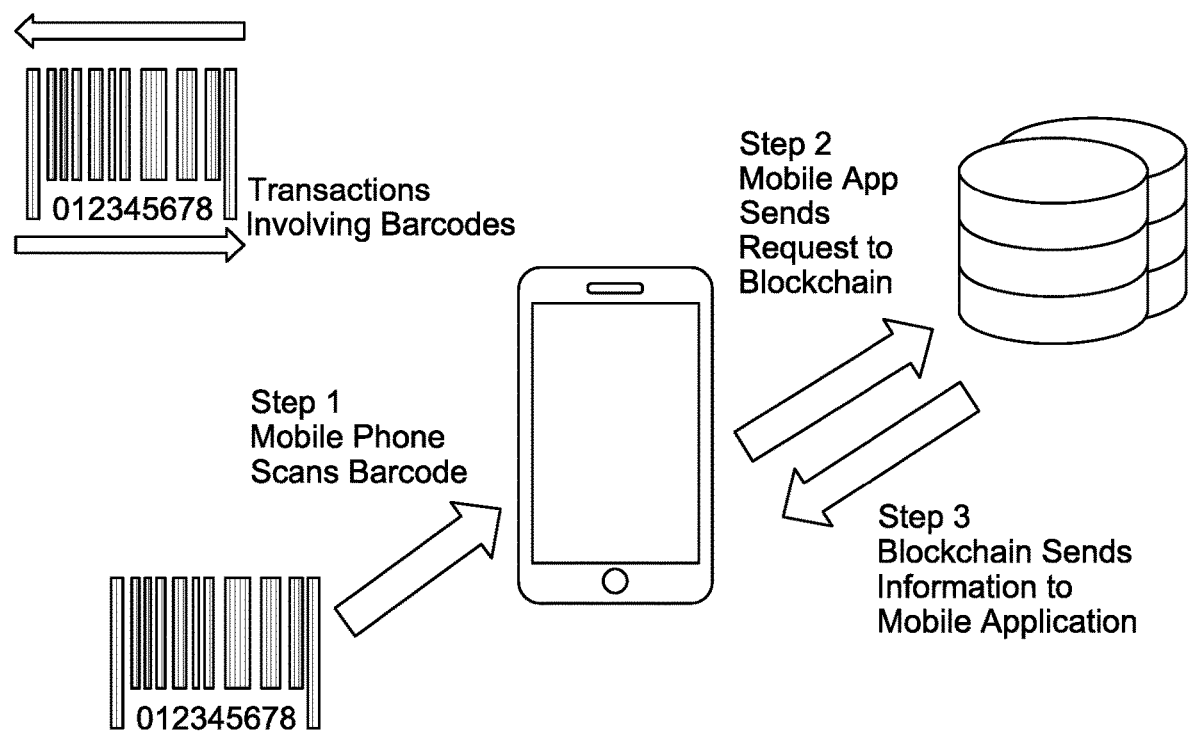
FIG. 3 is a graphical illustration showing a flow of information using a mobile phone according to an embodiment of the present disclosure.

FIG. 3 is a graphical illustration showing a flow of information using a mobile phone according to an embodiment of the present disclosure. A mobile device may be used to scan and transmit the barcode. Such transmission may be considered as a request the information stored in a hyperledger using blockchain. When the mobile phone requests information about the product based on the scanned barcode, the management system may send the information about the product. In this way, the information of the product is updated, checked, and confirmed.

Figure 4:
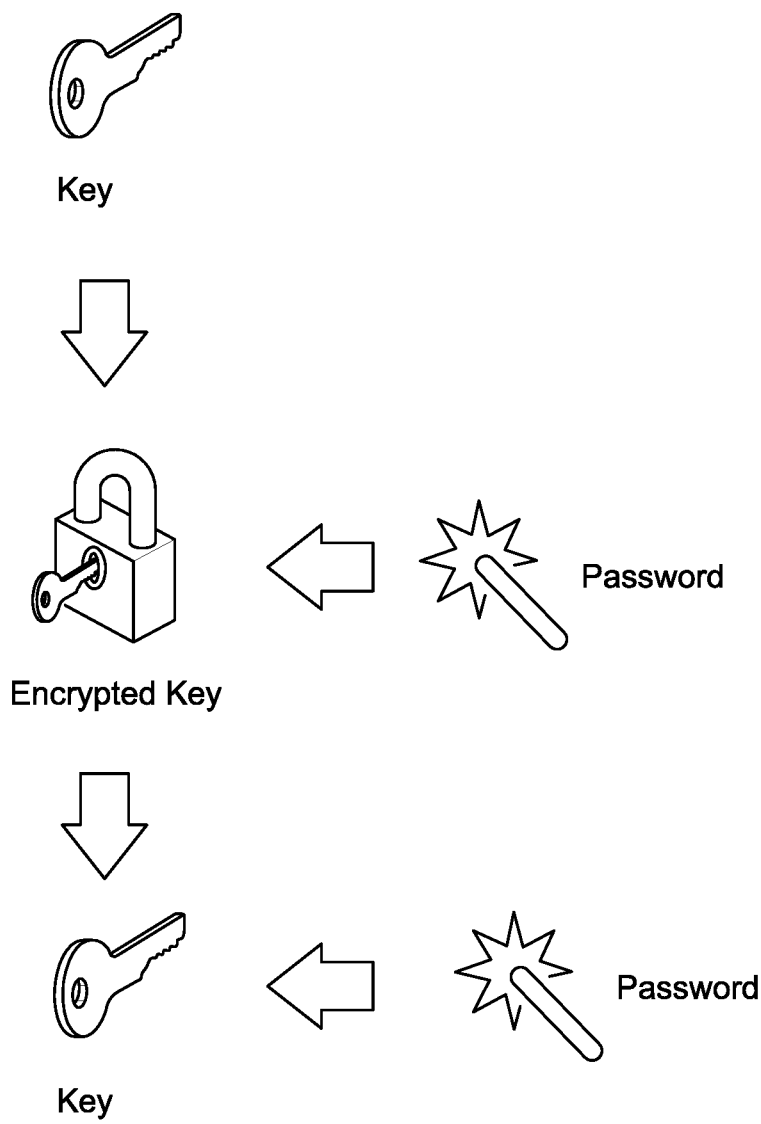
FIG. 4 is a graphical illustration showing public key cryptography according to an embodiment of the present disclosure.

FIG. 4 is a graphical illustration showing cryptography according to an embodiment of the present disclosure. Each block recorded in the hyperledger includes hash codes to preserve security and to claim ownership of the corresponding barcode. A public key may be generated from the barcode and a hash address. All barcoded clients may translate the human-friendly barcode address to the key hash readable address.

For deciphering and coding the security, private keys may be used in Base58Check called a Cryptography Secret (also known as Wallet Import Format or simply WIF), like Hash256 addresses. Generally, a private key is generated, the corresponding address is retrieved, and barcodes are sent to the address.

Cryptography secures the records in a blockchain transaction, each transaction is tied to previous transactions or records, and blockchain transactions are validated by algorithms on the nodes. Cryptography also protects identity by using a public key infrastructure (PKI) and secures emails, messaging applications, websites, and other forms of communication. PKI relies on third-party Certificate Authorities (CA) to issue, revoke, and store key pieces of information. Cryptography also protects data integrity because blockchain replaces secrets with transparency and distributing evidence across many blockchain nodes, which make it practically impossible to manipulate data without being caught.

In an aspect, the cryptography protects critical infrastructure. For example, the massive ransomware attack in May 2017, was a painful reminder of how easy it has become for hackers to hold an entire infrastructure hostage. A blockchain approach to storing DNS entries could improve security by removing the single target that hackers can attack to compromise the entire system.

In another aspect, the cryptography of the present disclosure is related to homomorphic encryption. The essence of homomorphic encryption is to enable computations on encrypted data before its actual decryption. Currently, data privacy and transactions are upheld since computations may be done on the data but only those with the decryption key may access its contents.

In a further aspect, the cryptography of the present disclosure is to enable zero knowledge proofs. An essential interaction for a blockchain may be protected through zero knowledge proofs, which are cryptographic techniques requiring two transacting parties, an authenticator, and a verifier to prove some propositions about the transactions without having to reveal all its information.

In a further aspect, all data and records stored in a database may be encrypted using the cryptography, so there is no problem in data security.

Figure 5:
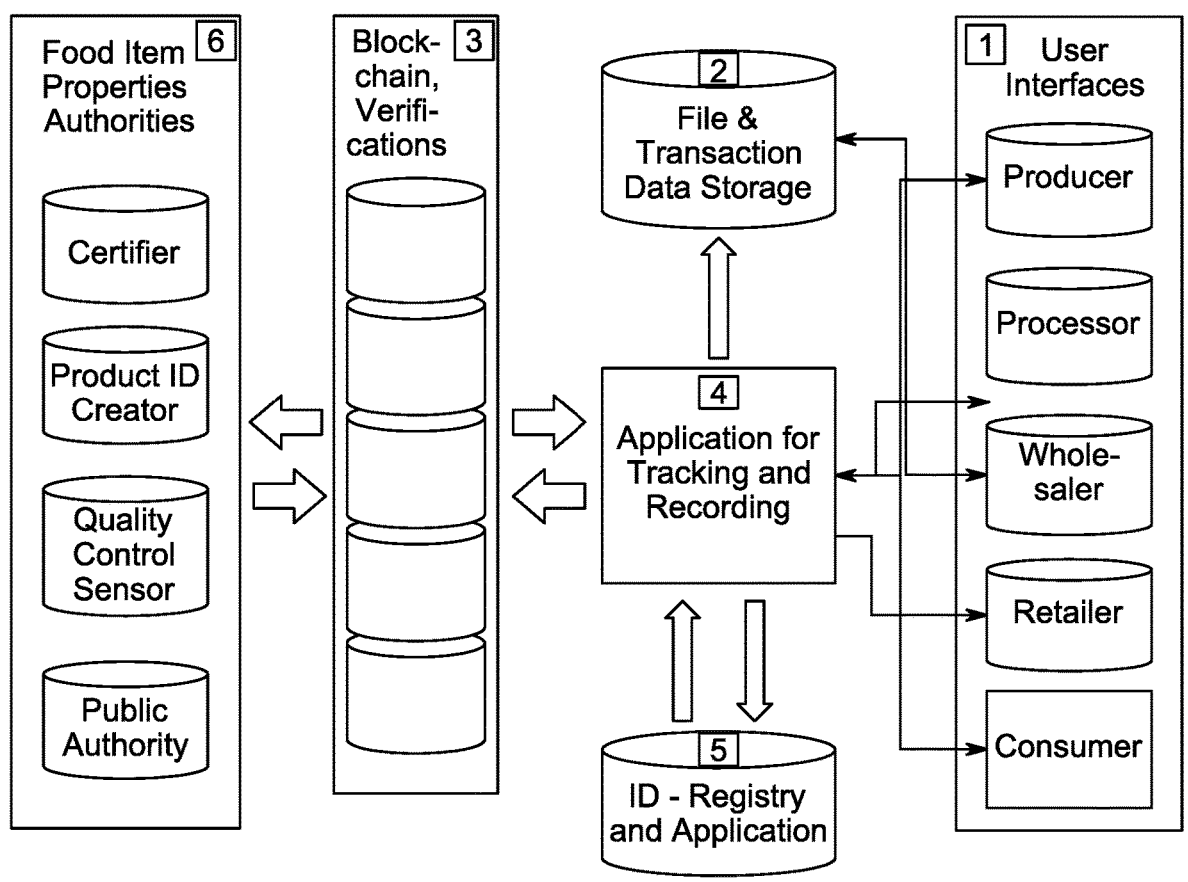
FIG. 5 is a graphical illustration of a system according to an embodiment of the present disclosure.

FIG. 5 is a graphical illustration of a system according to an embodiment of the present disclosure. The system has user interfaces and storage. The user interfaces are designed for different users. There are three main categories of user interfaces: end-users, professional users, and smart contract/software administrators.

End-users are typically the consumer. These users are expected to use their mobile and a dedicated application for the solution. It is expected to be a read-only application in the first place and will therefore not require a log-in.

Consumers are able to scan a barcode or QR-code and can access the information related to that particular product. Depending on the choice of solution, consumers may access all the steps in the supply chain or only the place of production and the description of products (e.g., foods).

Professional users are wholesalers, retailers, freight companies, farmers, and processing and packaging companies. Each professional user may have an interface through either mobile or desktop, or integrated in the ERP-system via a web-browser. Users can obtain information regarding previous and next parties in the supply chain as well as the product origin (provenance) and various specifications of the product. In some cases, they get more information than what is needed by consumers. In the end, users can obtain provenance information to share which their customers, which helps the consumer know that she is getting an authentic product.

Smart contract/software administrators administer the contract for the other users. If there are changes in the process or contracts, such changes have to be made through this interface. The governance of the system can be organized with a public authority, a company, or group of companies, that is trusted for doing this.

In aspects, the code in a smart contract may be open source code so that any changes may be visible to all participants and can be challenged if there is a setup for governance of this.

The storage stores information added to the blockchain in the hyperledger, which is saved in one or more servers located within a local area network. The information may contain contract verifications, hash codes, and identification of who has added this information. If, for example, a farmer takes a photo of the crop and add it to the blockchain. The photo may be uploaded to the blockchain and fully transparent for the nodes in the blockchain, but this requires the blockchain to store a significant amount of information.

Figure 6:
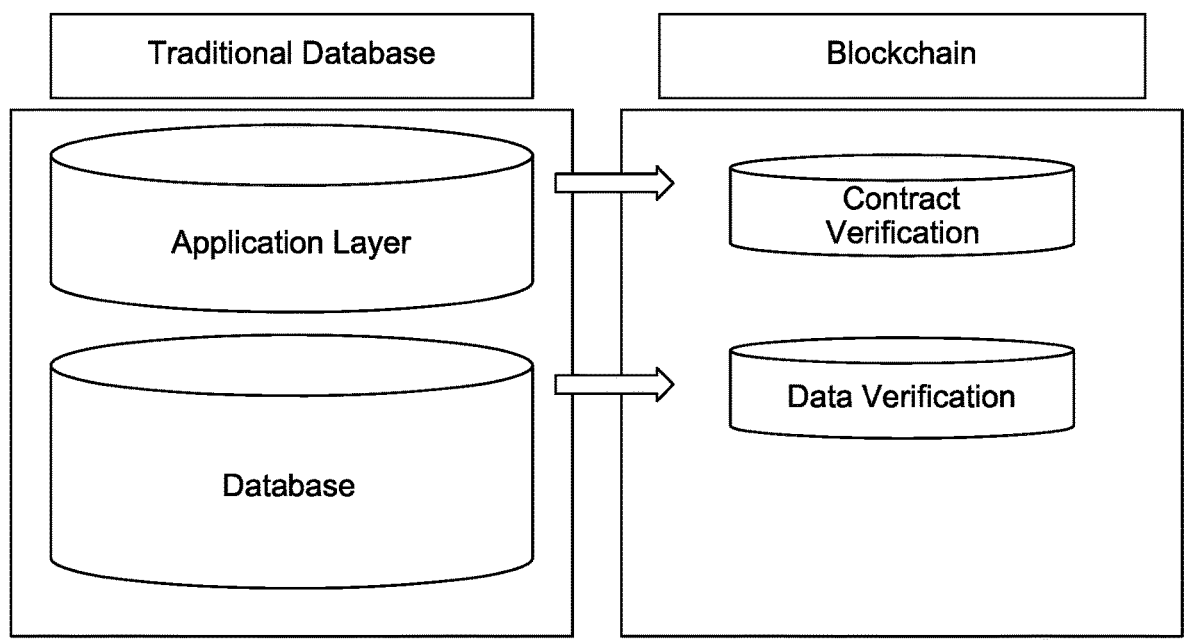
FIG. 6 is a graphical illustration showing traditional database and blockchain for storing information according to an embodiment of the present disclosure.

As shown in FIG. 6, a photo may be uploaded to a separate database and accessible by the blockchain where the access may be restricted or open for everyone who interacts with the blockchain. In another aspect, the photo may be stored in a database that is owned or controlled by the person or organization uploading the photo, but it is not possible to access it through the blockchain. Only the creator of the file or photo may decide how and with whom they want to share their data.

Figure 7A:
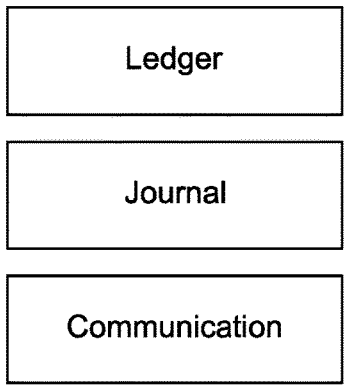
FIGS. 7A-7D are graphical illustrations showing layers of architecture of a distributed ledger according to an embodiment of the present disclosure.

FIGS. 7A-7D show layers of architecture of a distributed ledger according to an embodiment of the present disclosure. The hyperledger or distributed ledger may include three architectural layers: the ledger layer, the journal layer, and the communication layer, as shown in FIG. 7A. In embodiments, the hyperledger may be embedded in a variety of media including digital three-dimensional plans (e.g., digital 3D plans of guns, etc.).

Figure 7B:
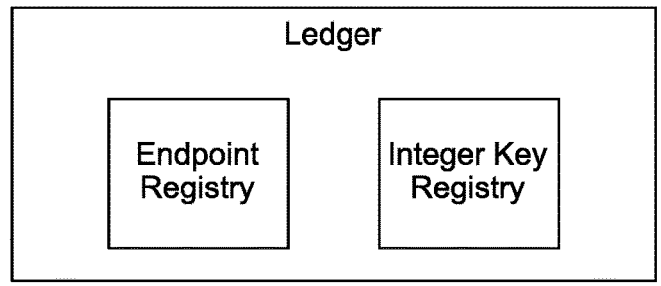

A ledger is a conceptual semantic and data model layer for transaction types. A ledger is described as a conceptual layer because it is implemented as a specialization of existing base classes already present in the communication and journal layers. In addition to some in-built system ledgers (Endpoint Registry and Integer Key Registry as shown in FIG. 7B), implementing new classes in the ledger layer allows for the creation of new transaction families. The MarketPlace Transaction Family, located in the extensions directory may be a good example of how the ledger layer may be extended.

Figure 7C:
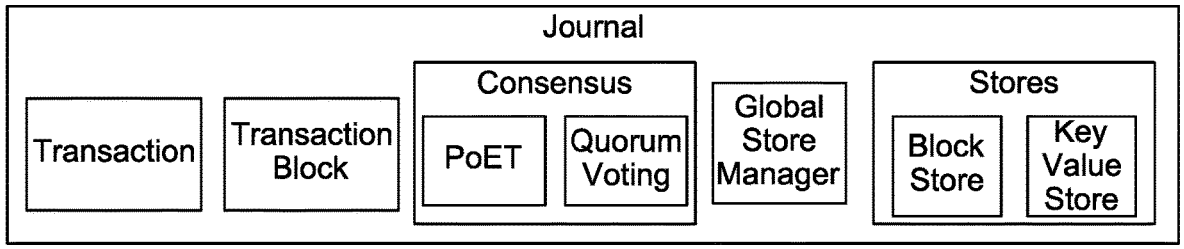

FIG. 7C shows the journal layer, which handles consensus on blocks of identifiers. Identifiers reference transactions, which are globally replicated. To verify blocks, nodes need a copy of the transaction. In this fashion, the journal provides global consensus on block ordering, transaction ordering within blocks, and the content of transactions. The journal module may contain: the implementation of the base transaction and transaction block classes, the consensus algorithms, the global store manager, and the block store and key value store.

The consensus mechanism may be Sawtooth Lake. The distributed ledger implemented by Sawtooth Lake may provide a unique mechanism to ensure fairness in the node lottery. In some implementations, a Proof-of-Work competition amongst nodes is the consensus mechanism. In other implementations, a Proof-of-Elapsed-Time (PoET) algorithm is used for distributed consensus. PoET relies upon a trusted execution environment (e.g., Intel's Software Guard Extensions (SGX)) to generate fair, verifiable random wait timers and signed certificates of timer expiration. This consensus mechanism may substantially reduce the computation and energy cost of ensuring fair distributed consensus.

The journal layer may include a transaction and a block. The transaction is a set of updates to be applied automatically to the distributed ledger. The transaction defines the data model and representation. For example, in the Integer-Key Transaction Family, the IntegerKey Transaction is defined as a list of zero or more updates to key value pairs. The associated variable may wrap the derived transaction object in a standard message object. There may be a message type for all or a portion of the transaction types.

The block may be a set of transactions to be applied to the distributed ledger. Other than some specialized transaction block implementations for the consensus mechanisms, new transaction block types may not be created. Multiple transaction types may coexist on single transaction blocks. There is typically a message type for every transaction block type.

Figure 7D:
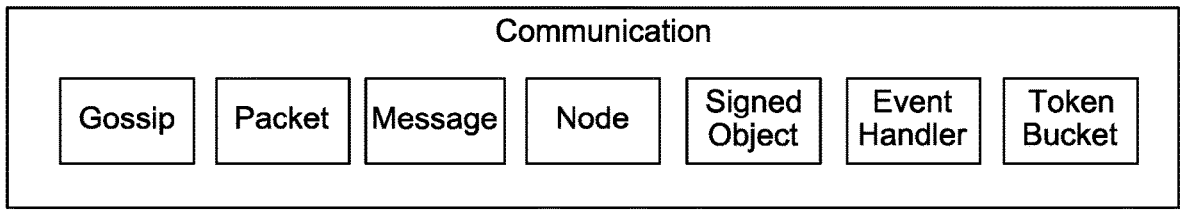

FIG. 7D shows the communication layer in which a gossip protocol enables communication between nodes. The gossip protocol may include protocol level connection management and basic flow control. The communication layer further includes a Token Bucket, of which implementation is used to limit the average rate of message transmission. Peers in the gossip network are called nodes.

Messages are exchanged among the nodes. Messages may represent information to send or receive from peers over the gossip network. Messages may be serialized and deserialized using a standard wire format (either CBOR or JSON). Types of messages may include transaction messages, transaction block messages, journal transfer messages, debug messages (log data), connection messages, shutdown messages, and topology messages. Messages are used broadly across the architecture for both system communication (administrative messages or consensus messages), and for transaction-type specific handling.

In an embodiment, cloud services may be used instead of the gossip network. For example, it may be Amazon Web Services, which protects its network layers and brings up a hotspot immediately if there are any problems that occur on the current network protocol. As used in this disclosure, peer-to-peer means nodes that have internet connections with other peers within the blockchain similar to the way people spread gossip across a network of peers (friends, relatives, co-workers). After peers exchange their information (and validate that all transactions and blocks follow the protocol rules), they store it. Since all of the transactions from the beginning of the block chain are needed to validate everything that has taken place, essentially all full nodes store the same data. This is what a gossip network layer does in a blockchain.

As described above, creation of new classes in the distributed ledger layer may allow for the addition of transaction families. By a message handling and dispatch model, new transaction families may register themselves with the underlying journal consensus and global store mechanisms to allow for arbitrary call backs on message arrival and persistence of the transactions. If specialized transactions are required to be stored, those can also be defined and added to the ledger during initialization.

Figure 8:
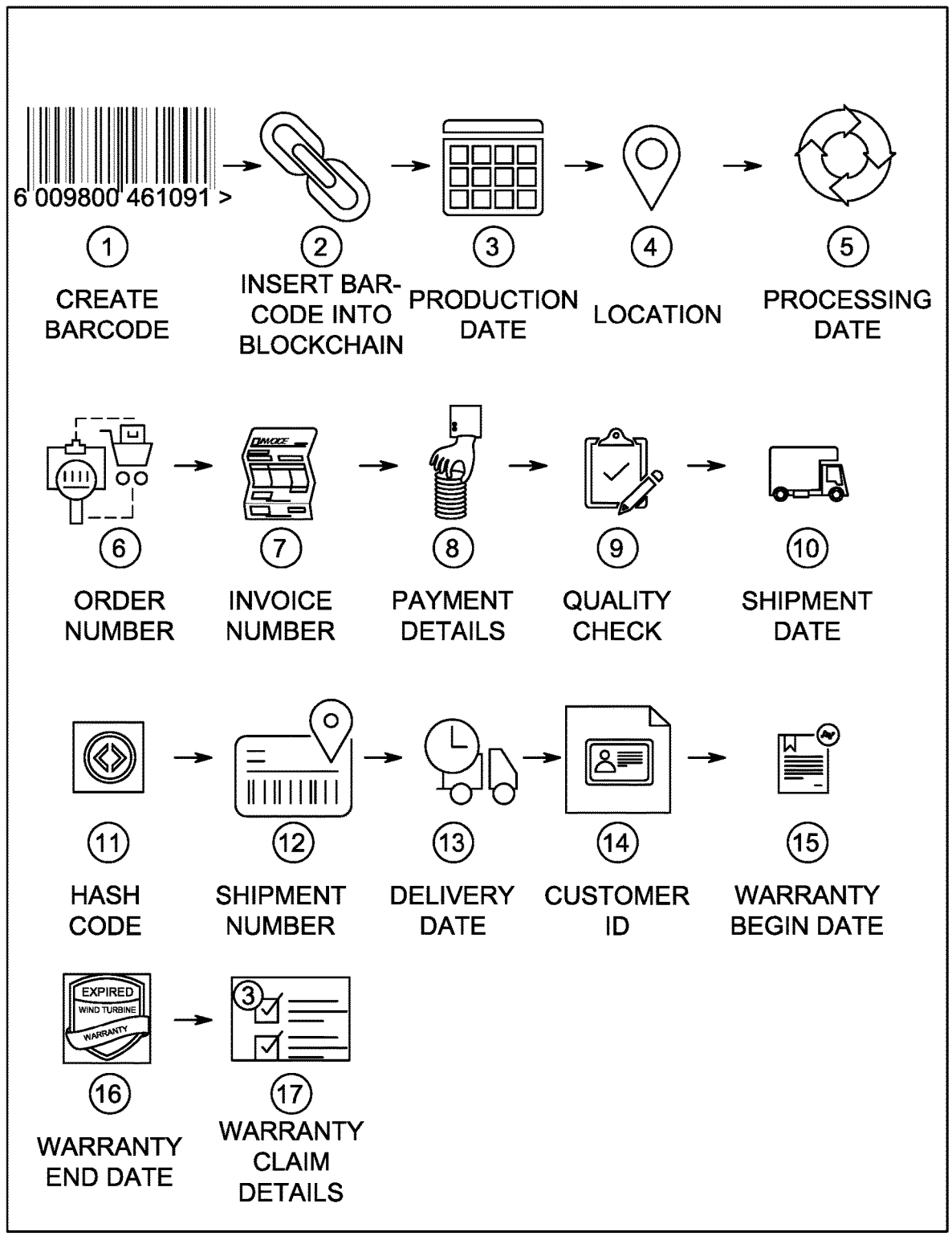
FIG. 8 is a graphical flow chart illustrating steps for a method according to an embodiment of the present disclosure.

FIG. 8 shows a flow chart illustrating steps for a method according to an embodiment of the present disclosure. The method starts with creating a barcode for a product. The barcode is then saved in a block, which is to be saved in a hyperledger utilizing blockchain. The block may include a smart contract having production location, provenance, processing date, and other information that is related to producing the product.

When an order from a client is received, an invoice number is issued. The client then pays the amount in the invoice. This transactional information is also recorded in the block based on the barcode printed on the product.

The product goes through a quality check and then is placed in transit to the client for shipment. The hash code may be generated at this time for shipping with creation of a shipment number. The block may also include an estimated delivery date. In an aspect, when the product is not in the transit according to the expected or estimated schedule, persons (e.g., delivery person, the client, the manufacturer, etc.) may be alerted.

The block may be updated with a copy of the customer's ID, warranty begin and end dates, and warranty claims. This list of information is provided as an example and is not meant to limit the scope of the disclosure.

Figure 9:
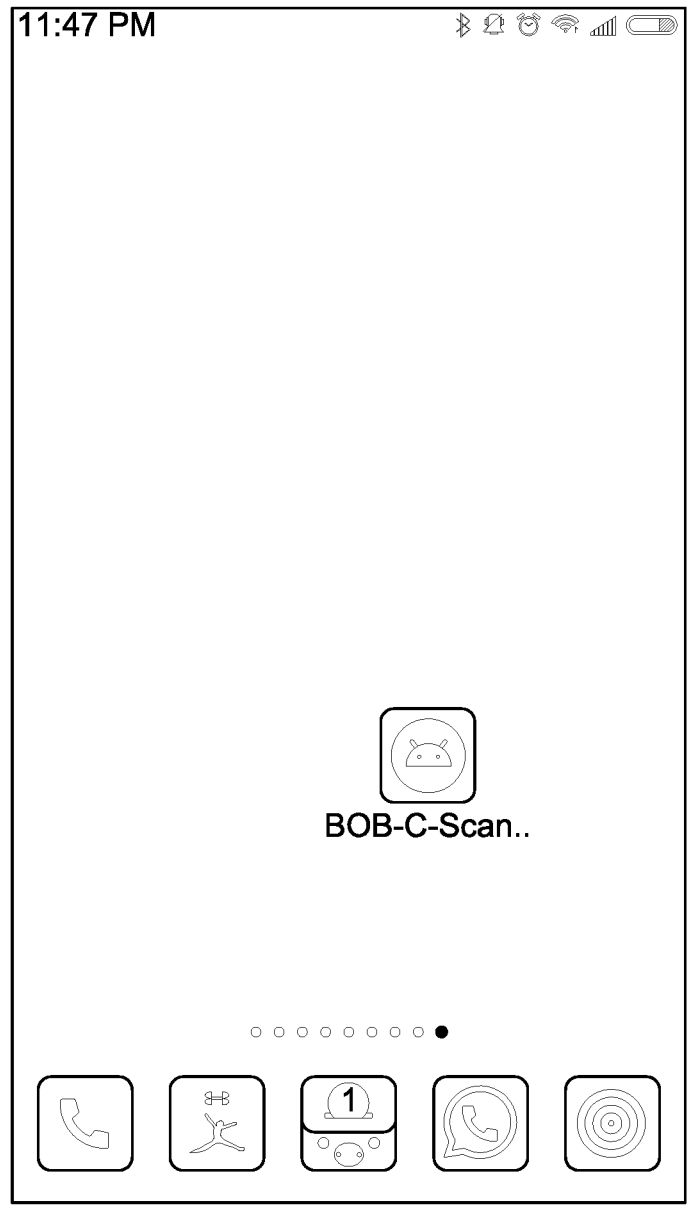
FIG. 9 is a graphical illustration showing an icon for a mobile application according to an embodiment of the present disclosure.

FIG. 9 shows a screenshot showing an icon of a mobile application according to an embodiment of the present disclosure. When a mobile device user downloads and installs the mobile application, the icon of the mobile application may show up on a screen of the mobile device. For example, BOB-C scanner icon may be shown as in FIG. 9.

The mobile application may be developed with Core Java with Google Android Studio and software development kit (SDK) for mobile devices running on the Android operating system or Objective C with iOS Apple Xcode and SDK for mobile devices running on iOS.

Figure 10:
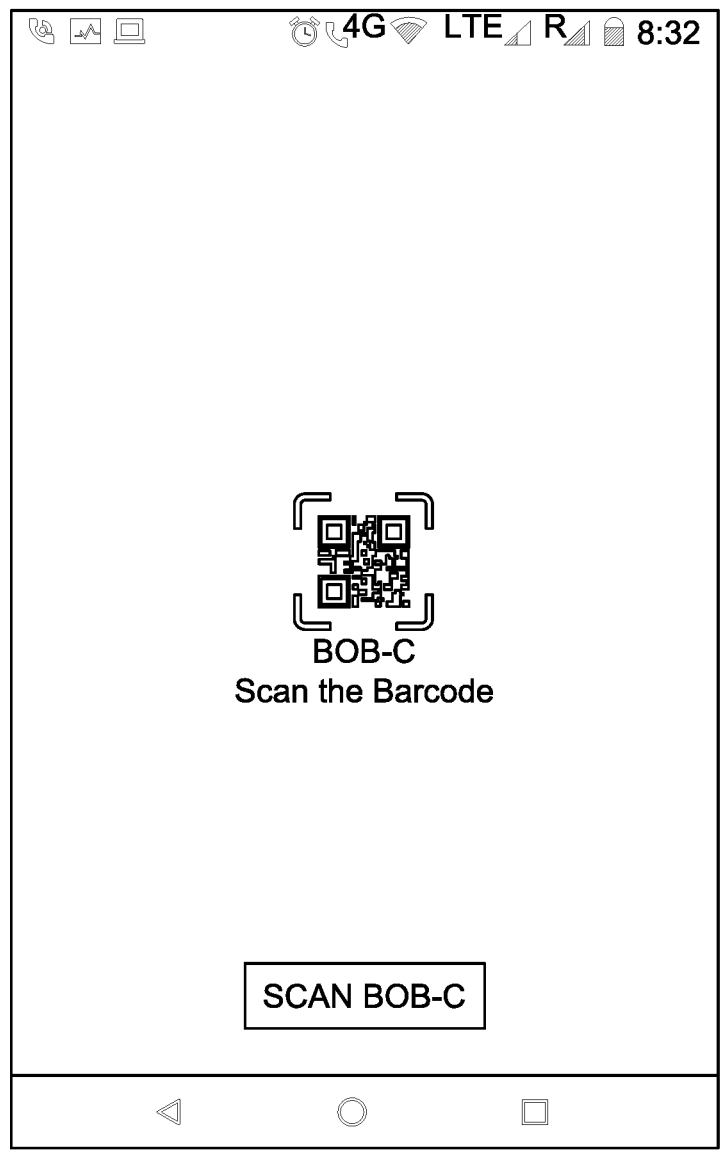
FIG. 10 is a graphical illustration showing an initial screen of a mobile application according to an embodiment of the present disclosure.

When the mobile device user clicks or double-clicks the icon, the mobile application is executed and may show an initial screen as shown in FIG. 10. The initial screen may include a scanning button or instructions showing a way to scan a barcode. When the user follows the instructions or presses the scanning button, the mobile application controls the image capturing device of the mobile device to capture an image of a barcode. An approval by the user may be required for the mobile application to control the image capturing device prior to or at the time of scanning.

Figure 11:
FIG. 11 is a graphical illustration showing a scanning user interface according to an embodiment of the present disclosure.

FIG. 11 shows a screenshot of the mobile application when capturing a barcode. When the user captures the barcode of the product, the mobile application transmits the scanned barcode to the central server, which stores the distributed ledger. The distributed ledger includes all information of products including identification information, transportation information, and administration information.

In an aspect, when the barcode is captured, the mobile application may decode the barcode into alphanumeric characters. Further, the mobile application may utilize optical character recognition (OCR) to recognize alphanumeric characters displayed under the barcode and check whether decoded alphanumeric characters match the OCR-ed alphanumeric characters. In this way, the mobile application may filter out products having mismatched barcodes and provide a warning that the scanned barcode is invalid.

Figure 12:
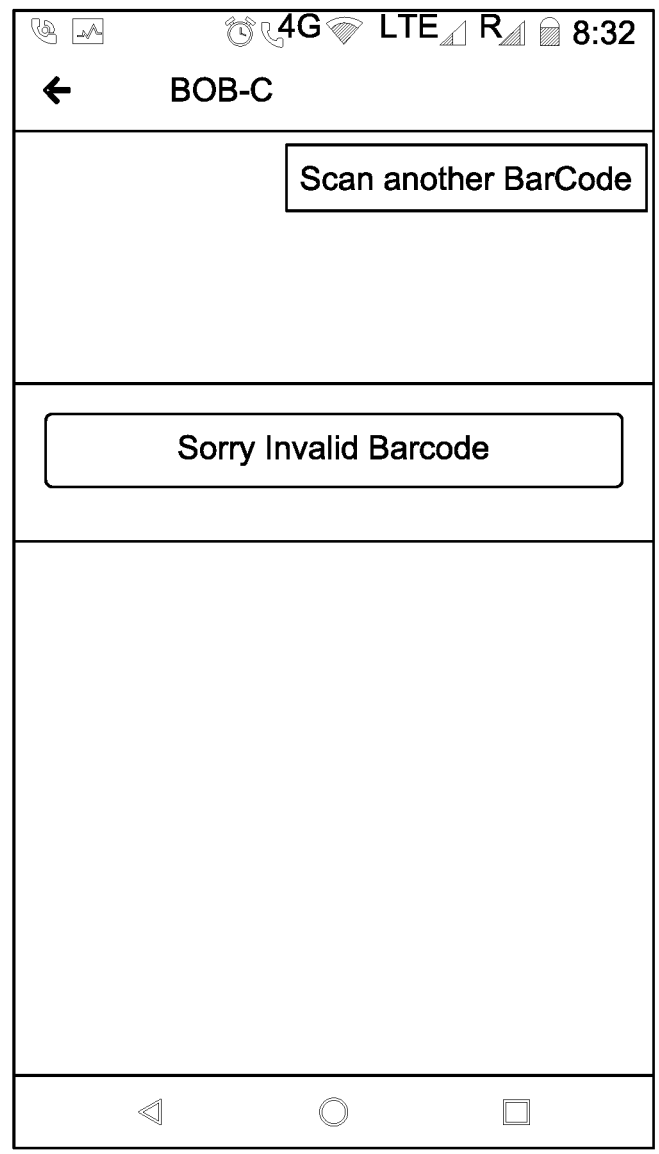
FIG. 12 is a graphical illustration showing a warning according to an embodiment of the present disclosure.

In another aspect, the mobile application may transmit the alphanumeric characters decoded from the barcode as the information of the product. In a case when the mobile application transmits the captured image of the barcode, the central server may convert the captured image of the barcode to alphanumeric characters. The central server then checks whether the alphanumeric characters of the scanned barcode match with identification information of products saved in the distributed ledger. When the information of the scanned barcode does not match with any products, the central server notifies the mobile application of the mismatch. Then, the mobile application displays a warning as shown in FIG. 12. The user may be able to filter out the product and scan a barcode of another product.

Figure 13A:
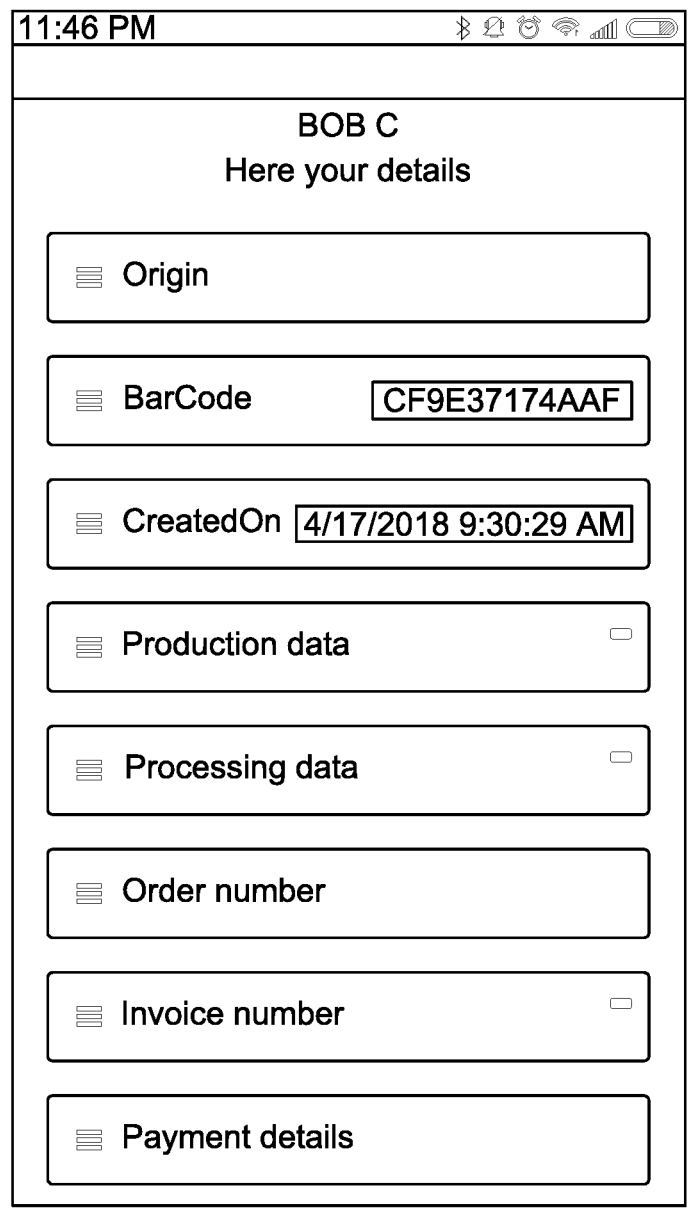
FIGS. 13A and 13B are graphical illustrations showing information of a product saved in a distributed ledger according to an embodiment of the present disclosure.
Figure 13B:
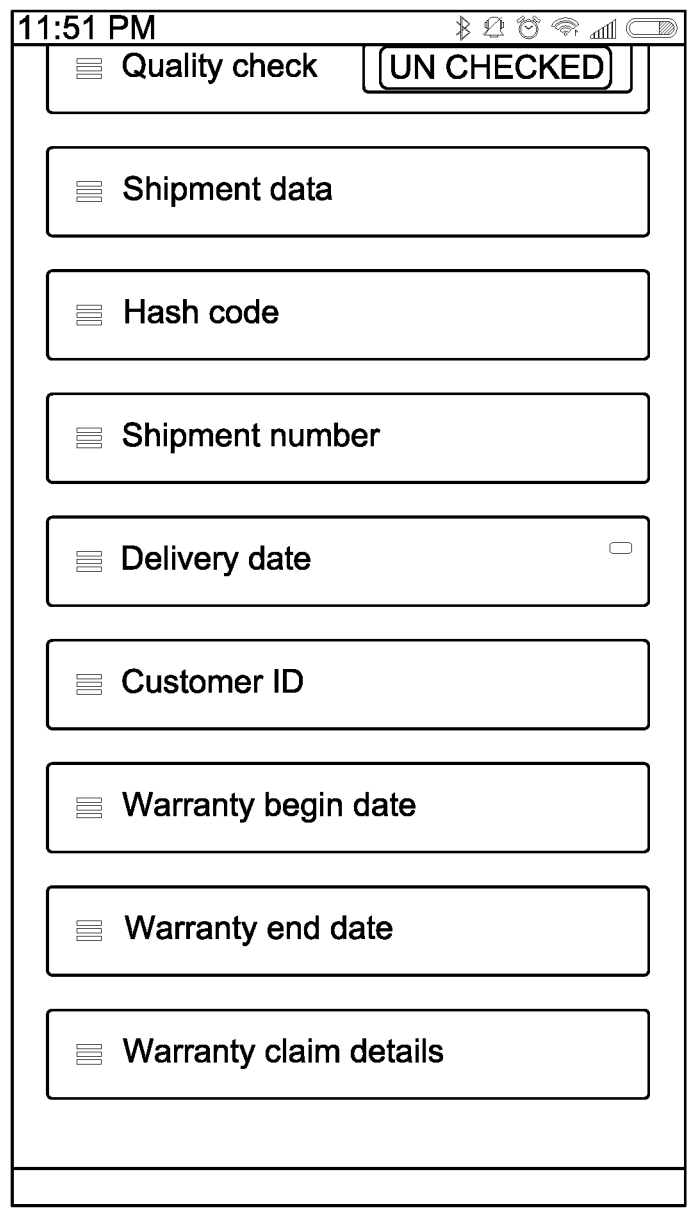

When the information in the scanned barcode matches in the distributed ledger, the central server transmits corresponding information of the matched product stored in blocks of the distributed ledger to the mobile application. As shown in FIGS. 13A and 13B, the mobile application shows the received information from the central server next to the corresponding items, such as the origin, barcode, created date, production date, processing date, order number, invoice number, payment details, shipment date, hash code, shipment number, delivery date, customer ID, warranty begin and end dates, and warranty claim details. These pieces of information may be displayed in one or more webpages or screens. The information may be displayed in the user interface at the corresponding location on the screen. For example, the barcode and created date are shown in FIG. 13A. When information cannot be fully displayed in the corresponding location, such information may not be displayed at the corresponding locations but can be displayed when the user of the mobile application touches the item on the screen. In an aspect, the mobile device user may arrange an order of the items or customize the items by removing or hiding items.

In an aspect, when there is no information saved in the distributed ledger for specific items, an icon is displayed in the corresponding location, instead, to indicate that no information has been saved yet. For example, a short horizontal bar is shown in the right side of the rows of the production date, the processing date, invoice number, and delivery date.

Further, a warning may be shown in the user interface of the mobile application. Regarding the quality check, if no quality check has been performed, the term "UNCHECKED" in white is displayed on the red background to attract the user's attention. The shape, color, and phrase are provided only for explaining purposes and other forms may be used as appropriate to persons having ordinary skill in the art.

Figure 14A:
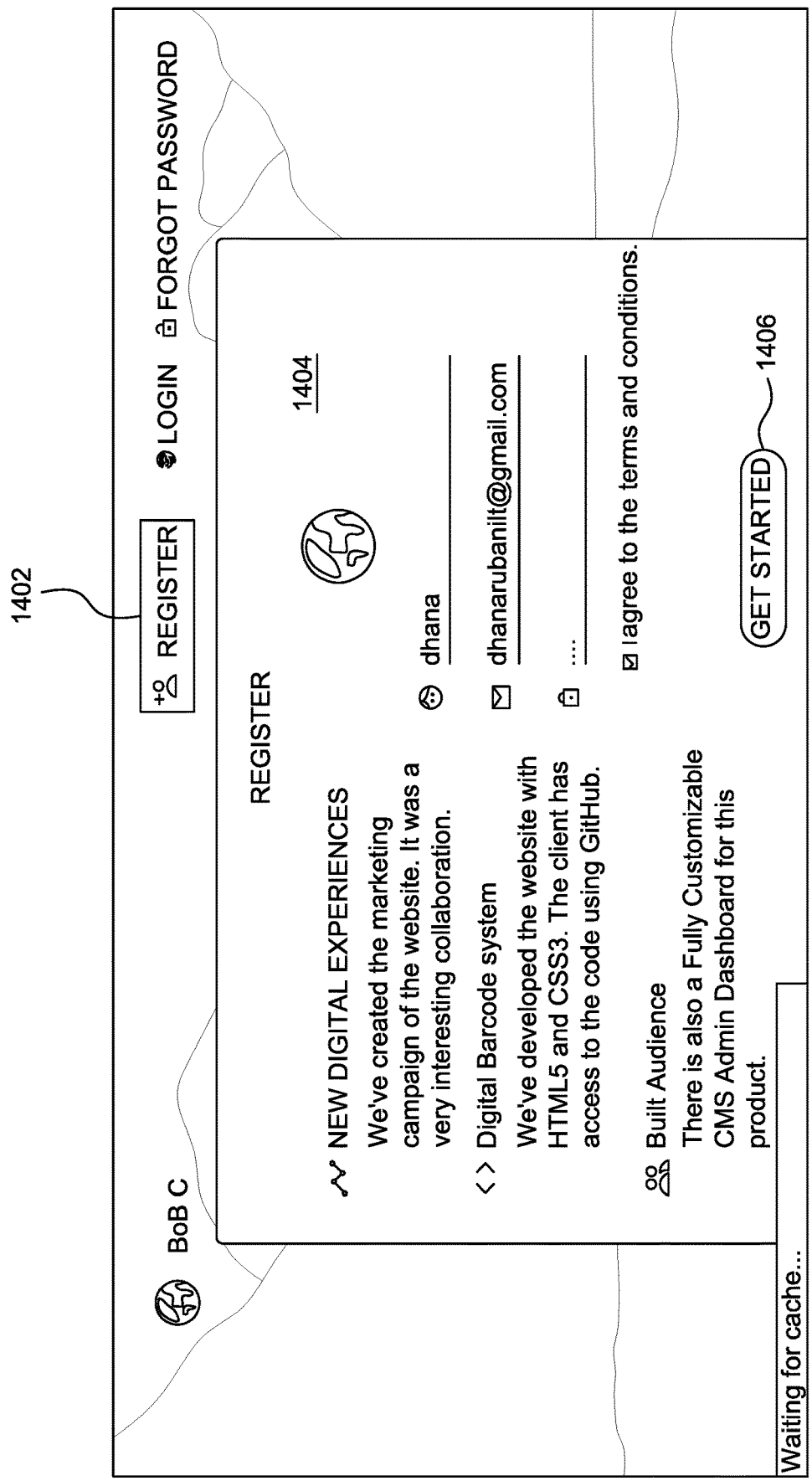

FIGS. 14A-14D are examplary user interfaces for accessing the system according to an embodiment of the present disclosure. As illustrated in FIG. 14A, a user selects the register button 1402 to display the user registering window 1404. After entering a username, an email address, and a password, the user selects the "Get Started" button 1406 to continue with the registration process.

Figure 14C:
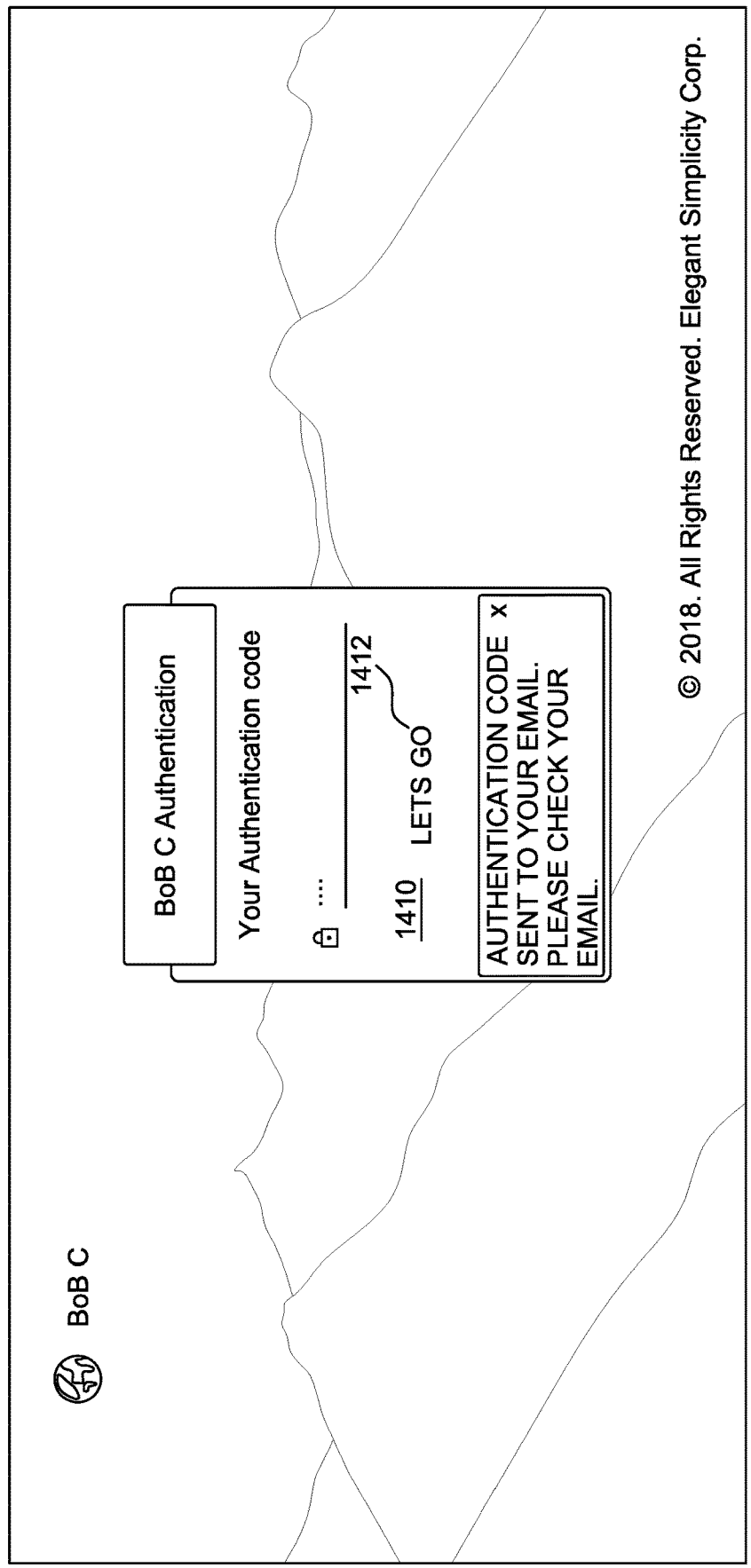
Figure 14D:
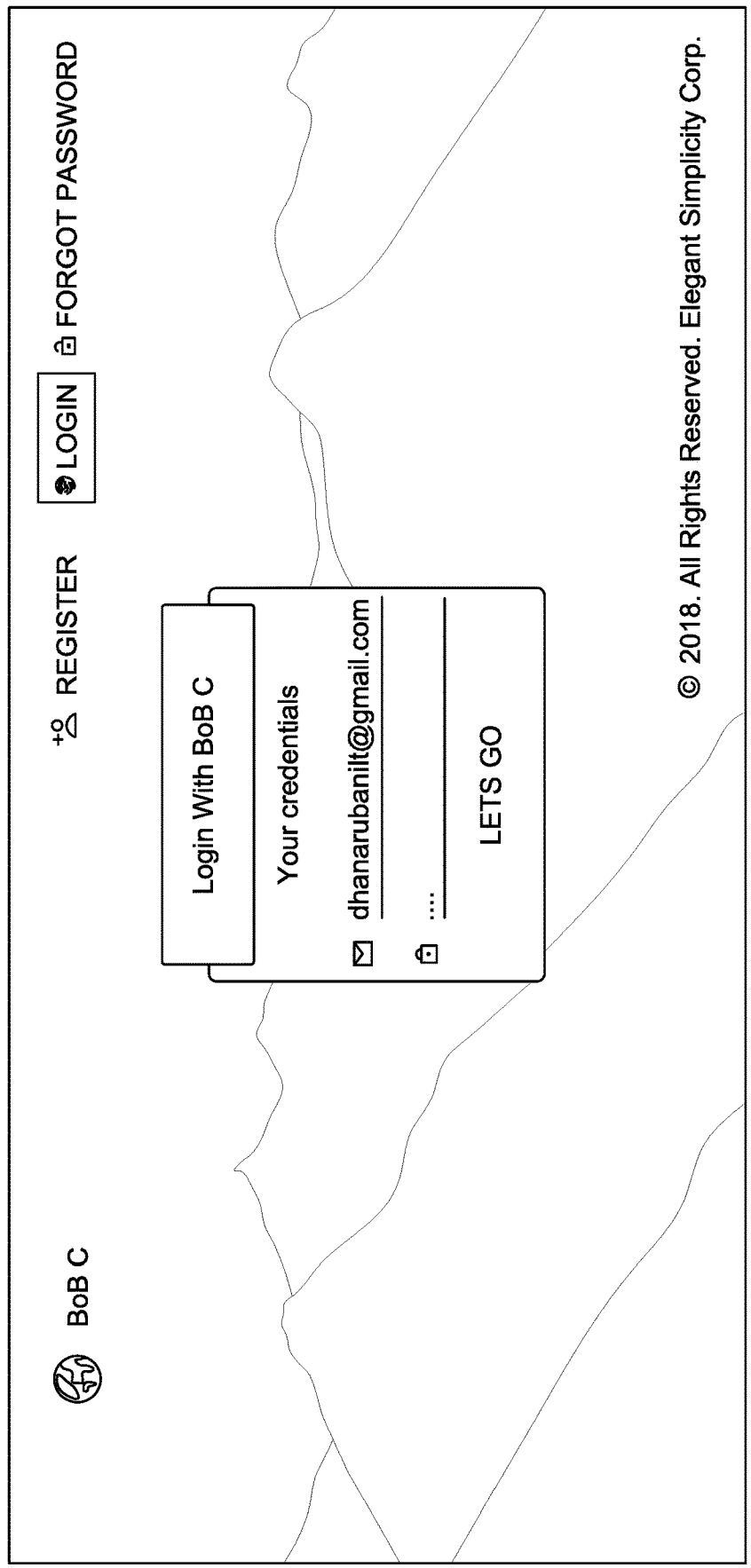

After the "Get Started" button 1406 is selected, an authentication window 1410 is displayed as illustrated in FIG. 14C and an email message including an authentication code is transmitted to the user's email as illustrated in FIG. 14B. If the user enters the authentication code in the authentication window 1410 and selects the "Let's Go" button 1412, the user is registered in the system and can access the system by selecting the login button in FIG. 14D, entering email and password information in the login window, and selecting the "Let's Go" button.

Figure 15:
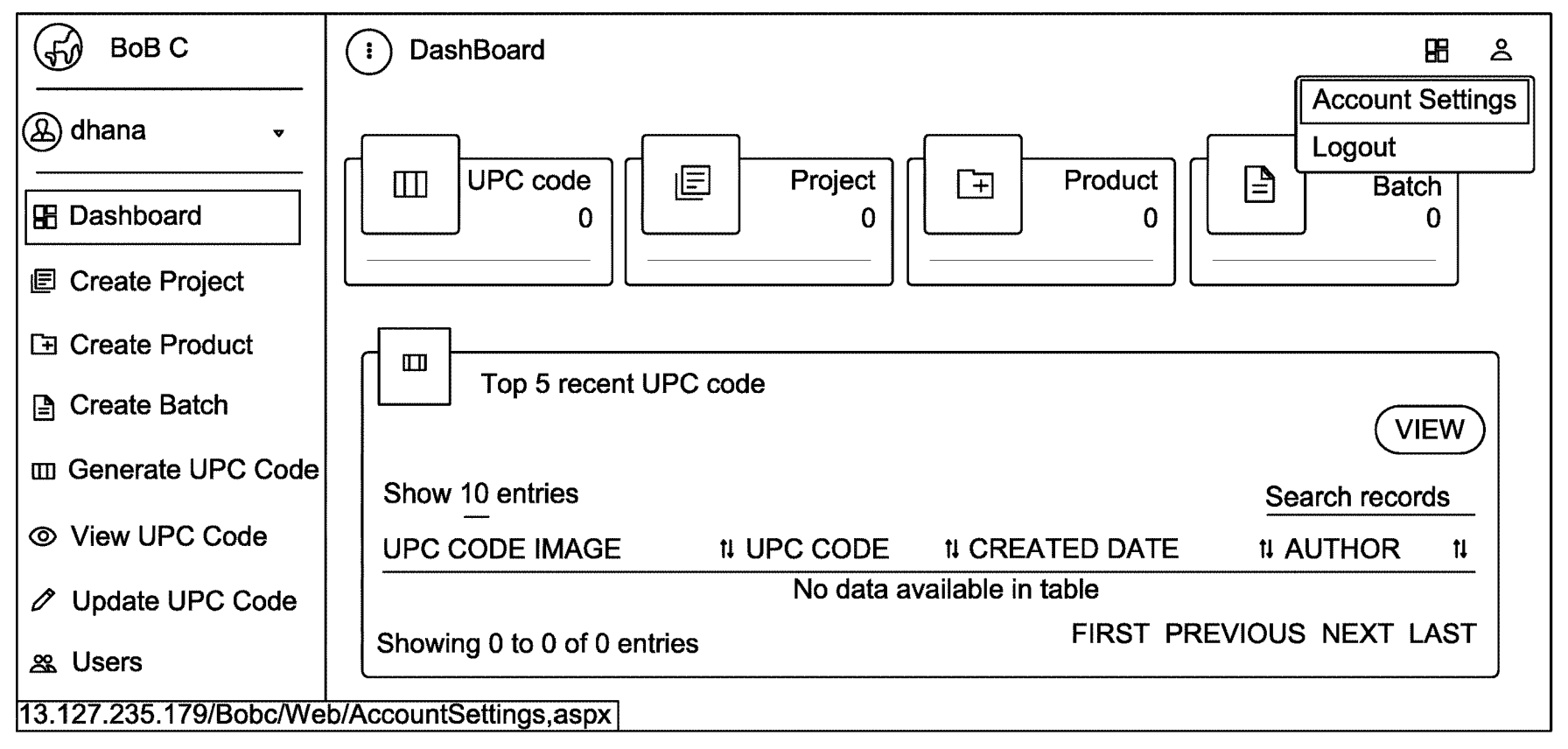

FIG. 15 is an examplary user interface illustrating a dashboard according to an embodiment of the present disclosure. The interface includes a menu with multiple menu items including a dashboard menu item, a project creation menu item, a product creation menu item, a batch creation menu item, a UPC code generation menu item, a view UPC code menu item, an update UPC code menu item, a users menu item, etc. After a user logs into the system, the interface of FIG. 15 is shown. The dashboard shows the number of UPC codes, the number of projects, the number of products, and the number of batches in the system. The dashboard also shows the top number of recent UPC codes that were created.

Figure 16A:
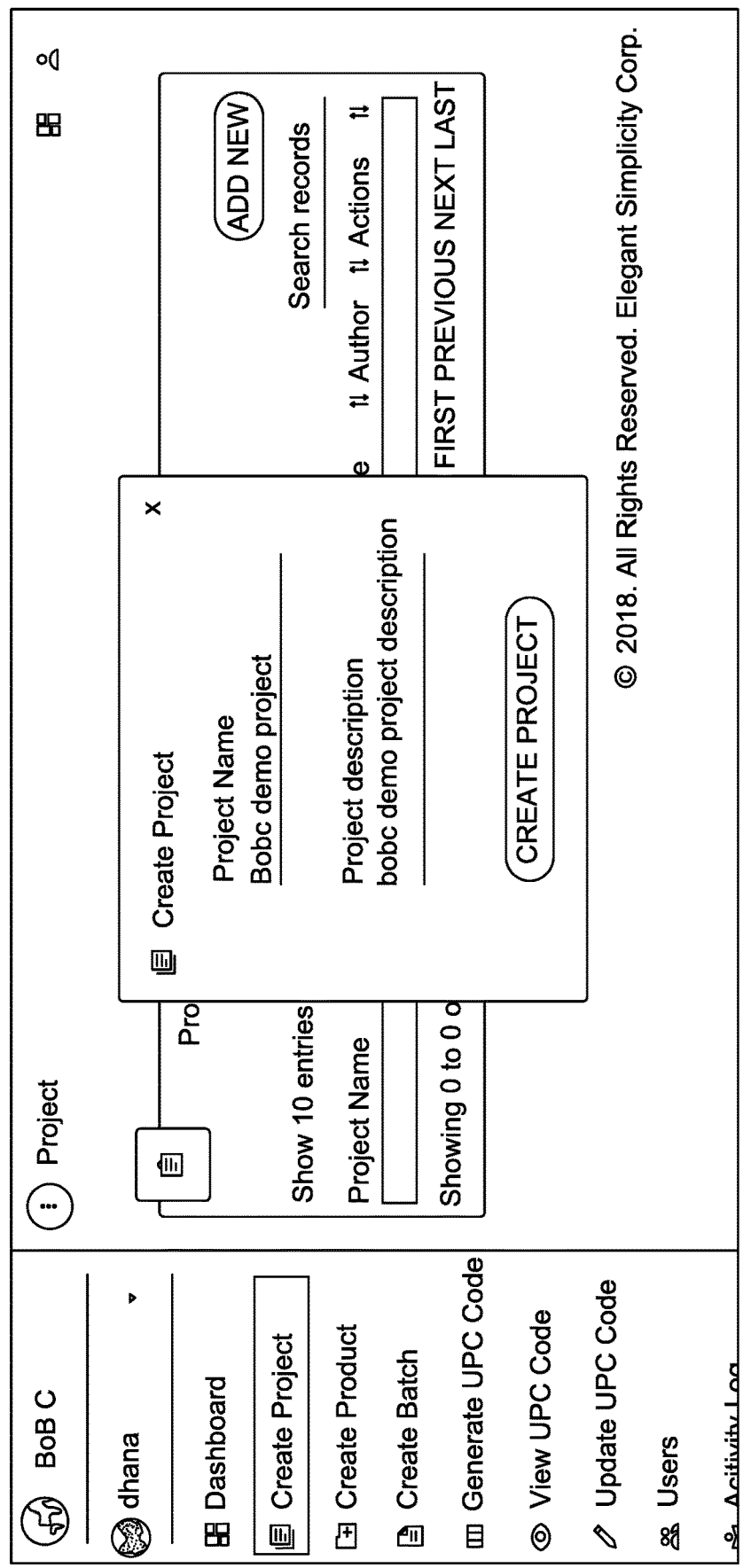

FIGS. 16A and 16B are examplary user interfaces for creating a project within the system according to an embodiment of the present disclosure. A project is created by entering relevant information, e.g., project name and project description, in a project creation window. The created projects are listed in a projects details section of the interface as illustrated in FIG. 16B.

Figure 17A:
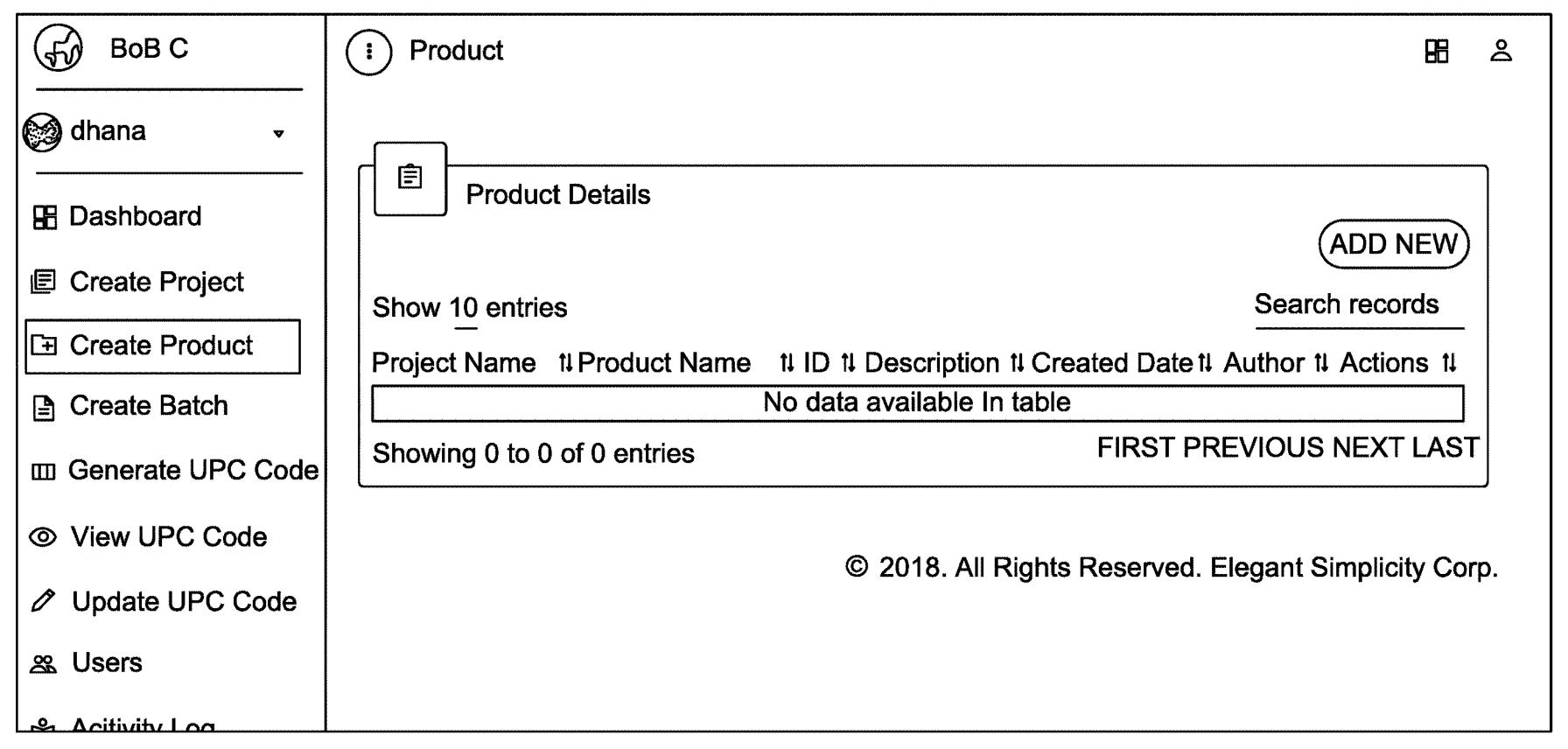
Figure 17B:
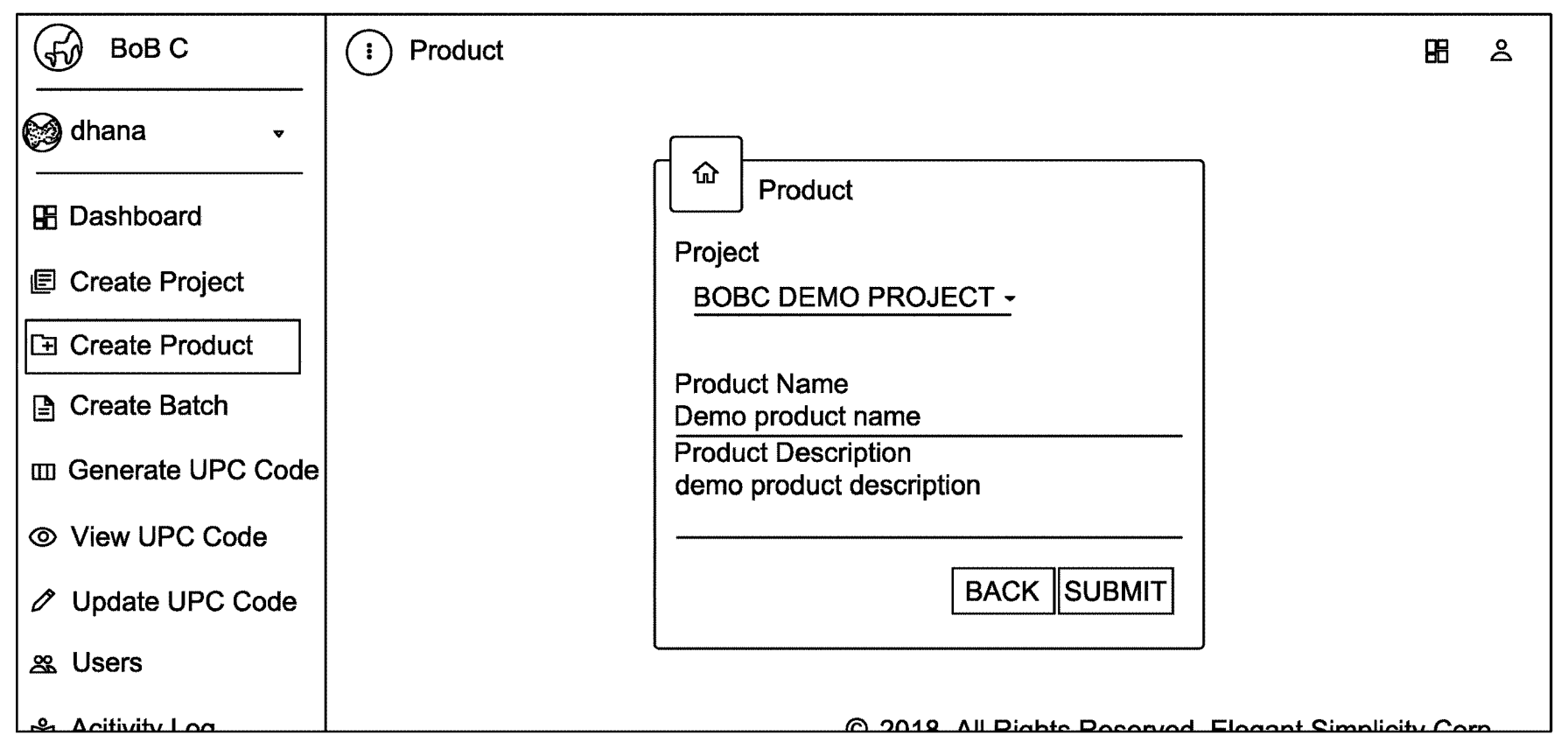

FIGS. 17A-17C are examplary user interfaces for creating a product within the system according to an embodiment of the present disclosure. A product is created by selecting a project (e.g., via a pull-down menu) with which the product is associated and entering relevant information, e.g., product name and product description, in a product creation window. The created products are listed in a product details section of the interface as illustrated in FIG. 17C.

Figure 18A:
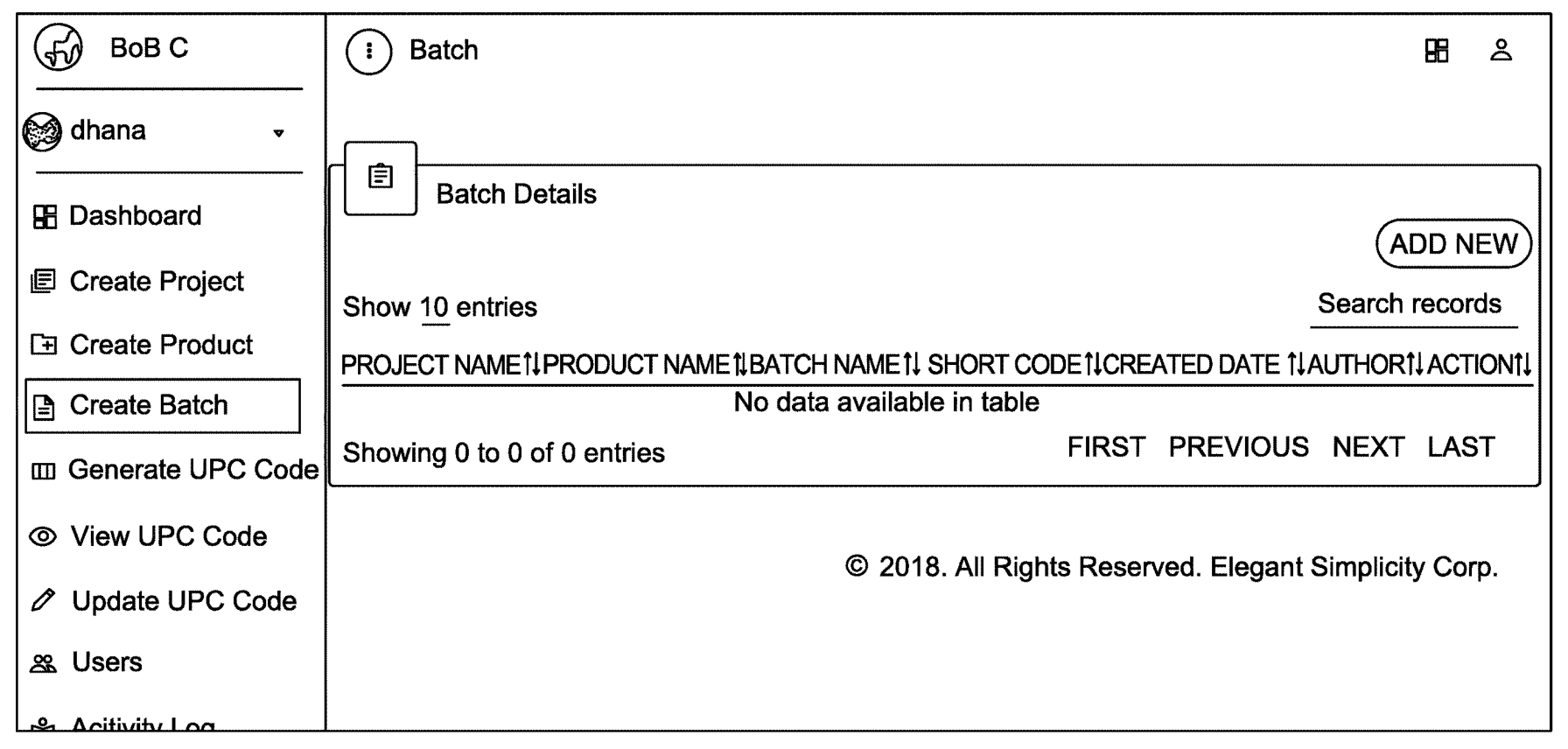
Figure 18B:
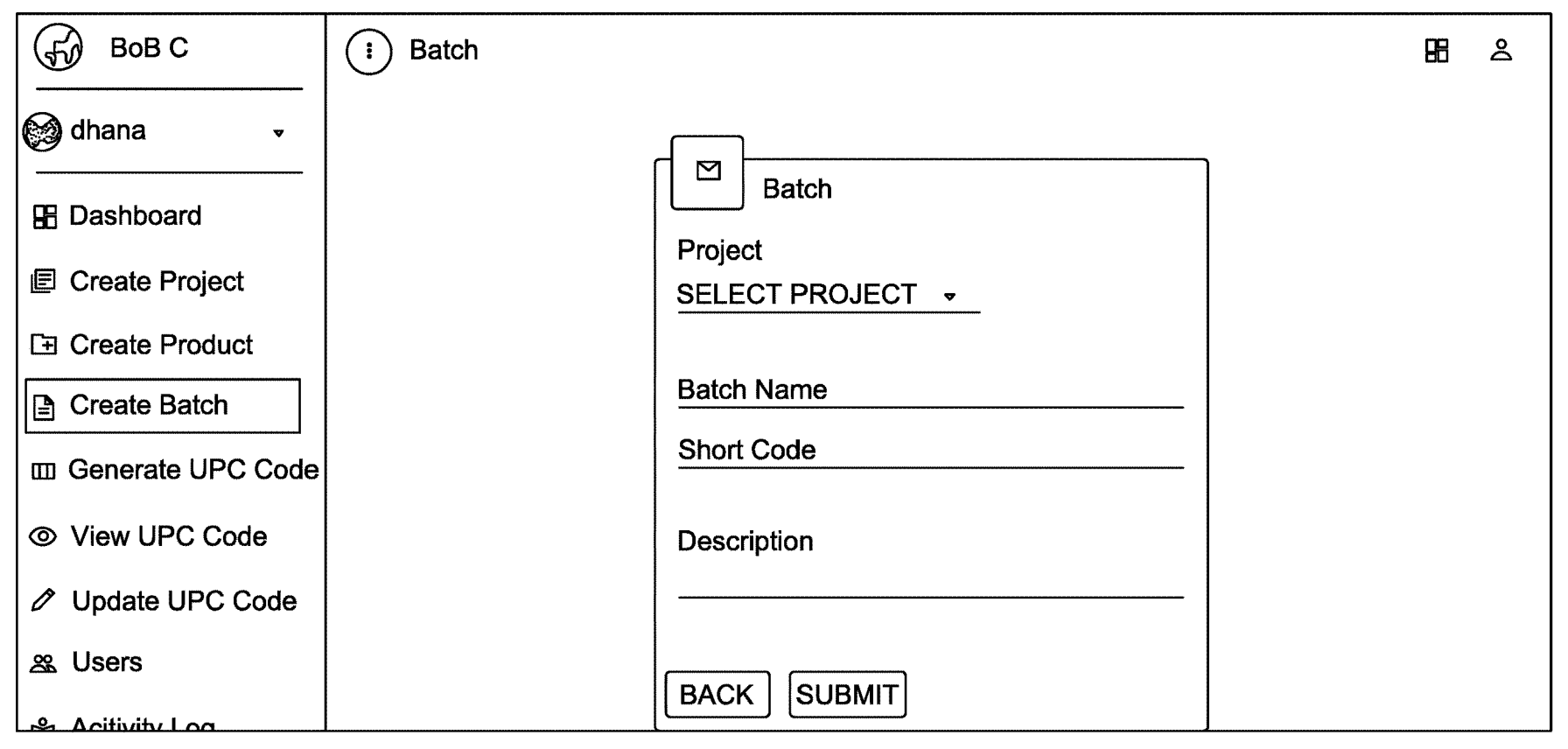
Figure 18C:
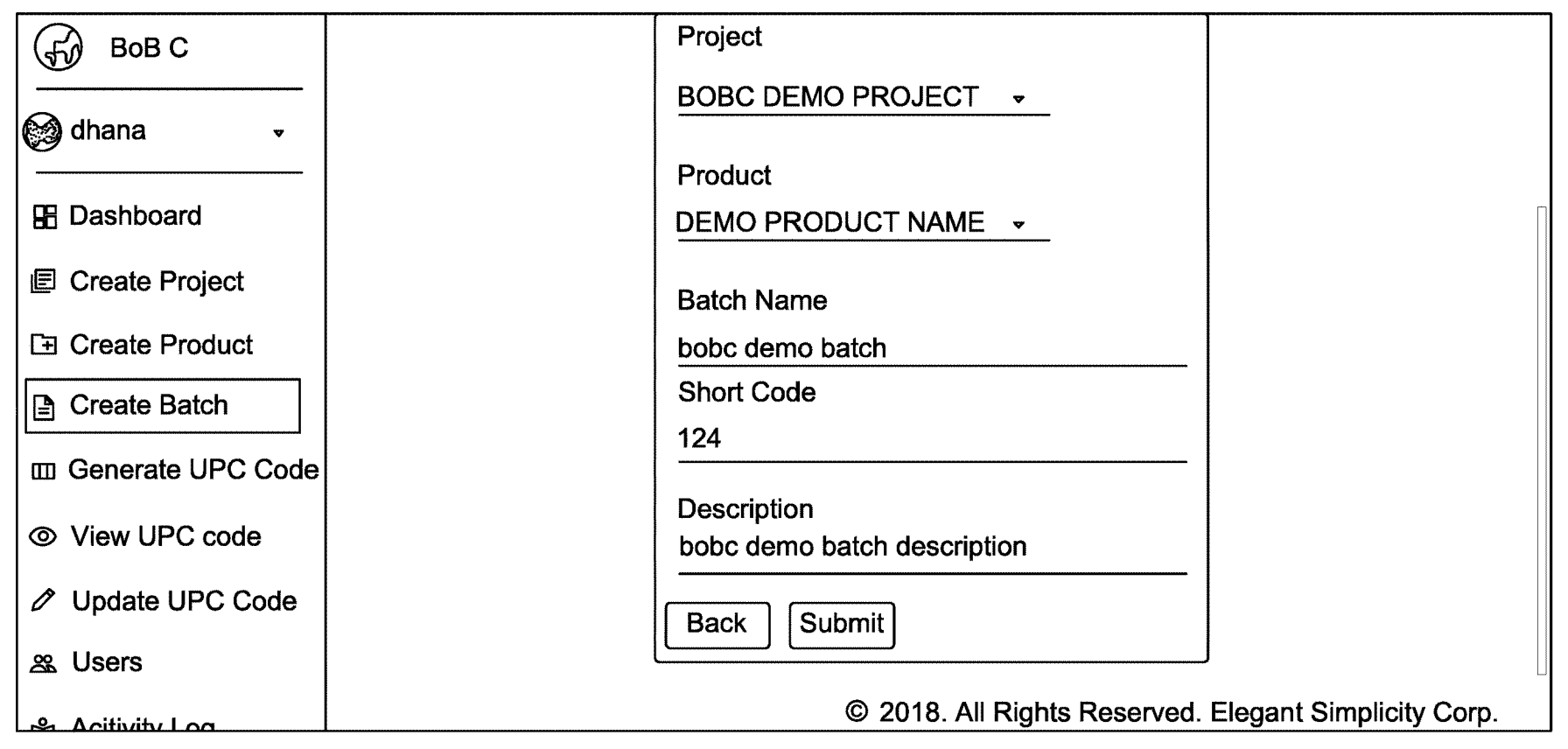

FIGS. 18A-18D are examplary user interfaces for creating a batch within the system according to an embodiment of the present disclosure. A batch is created by selecting a project and product (e.g., via pull-down menus) with which the batch is associated and entering relevant information, e.g., batch name, short code, and batch description, in a batch creation window. The created batches are listed in a batch details section of the interface as illustrated in FIG. 18D.

Figure 19A:
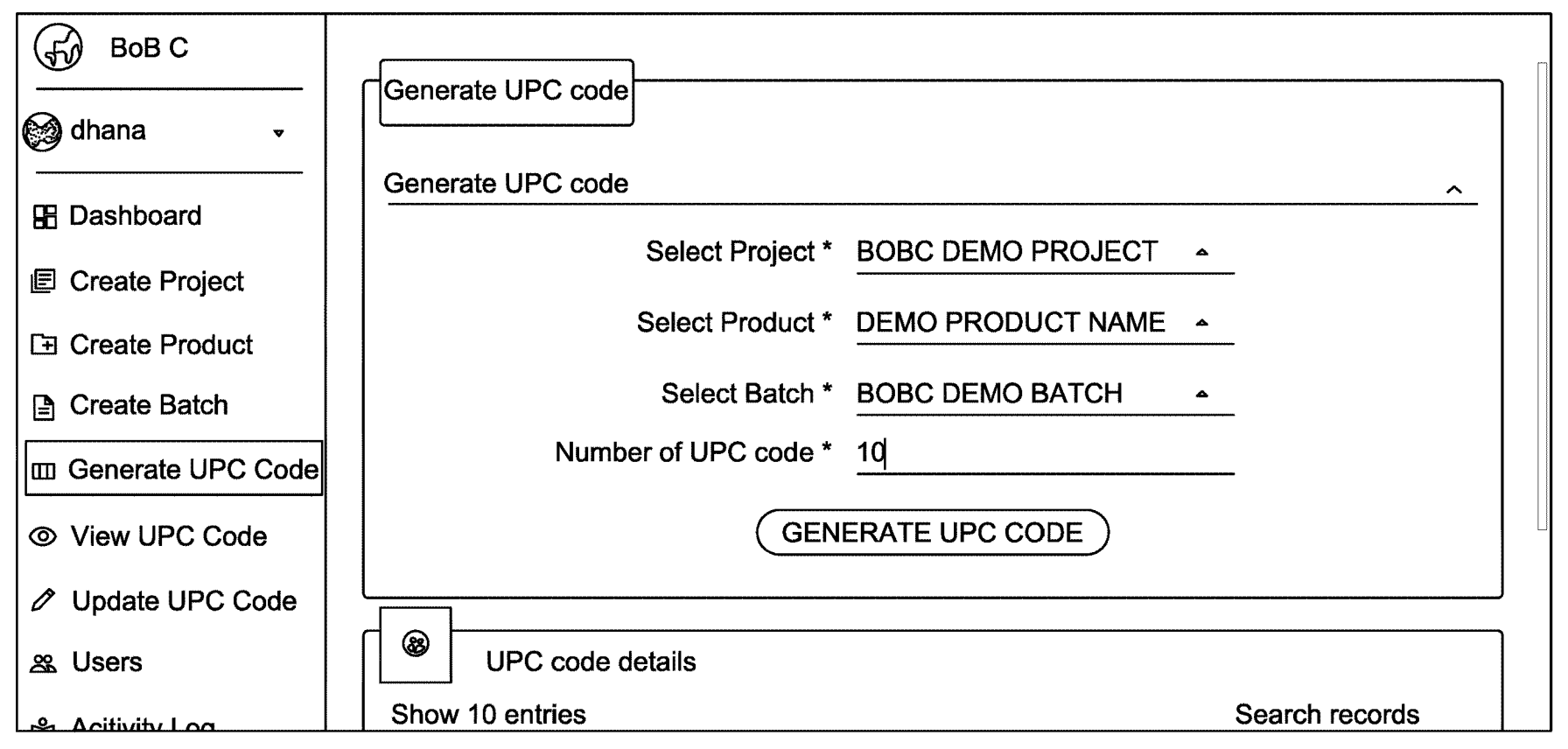
Figure 19C:
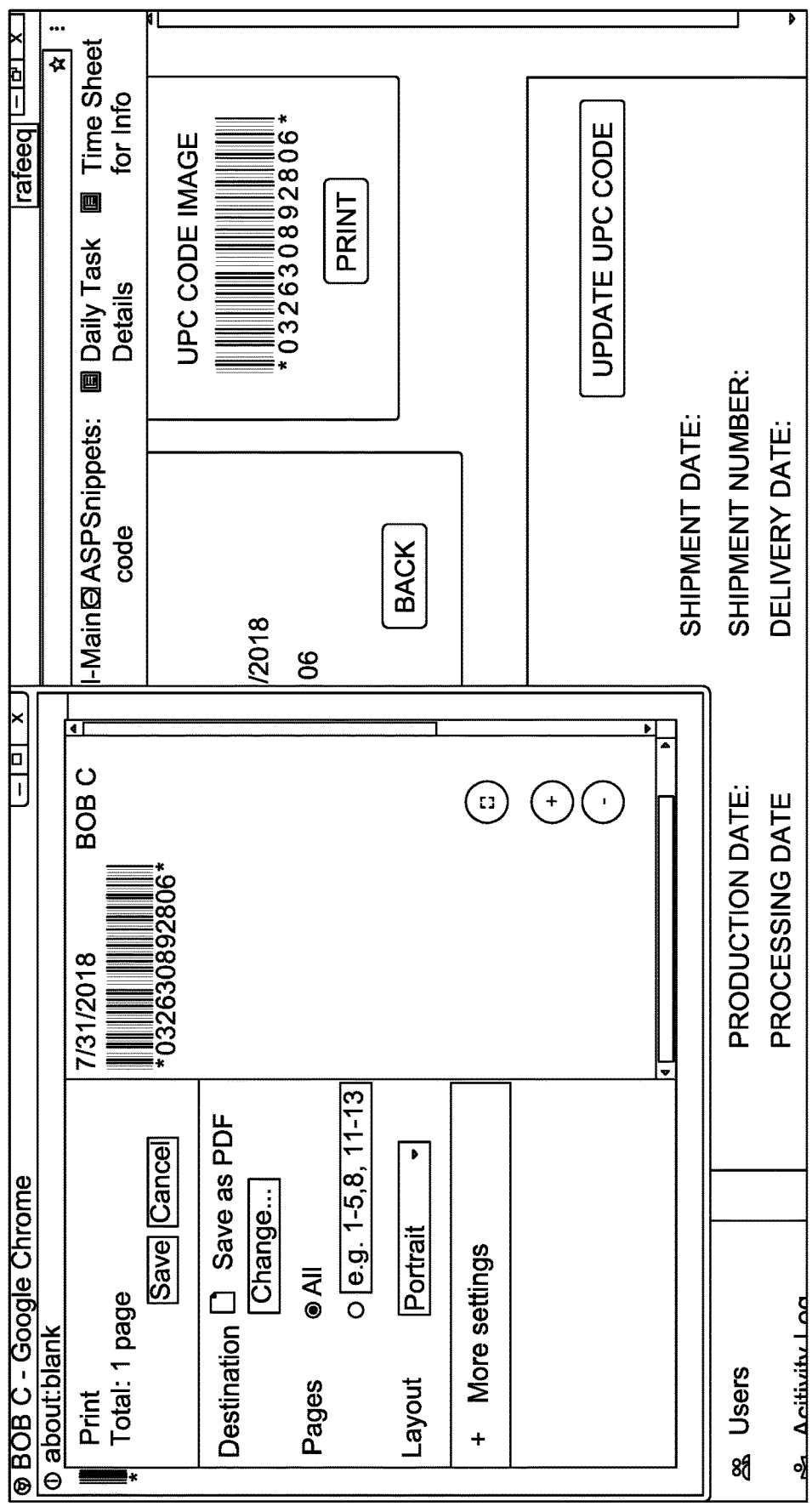

FIGS. 19A-19C are examplary user interfaces for generating and printing UPC codes according to an embodiment of the present disclosure. UPC codes are generated by selecting a project, product, and batch (e.g., via pull-down menus), entering the number of UPC codes to be generated in a UPC code generation section of the interface of FIG. 19A, and selected the "Generate UPC Code" button. The generated UPC codes are listed in a UPC code details section of the interface as illustrated in FIG. 19B. A user may select a view button for one of the UPC codes to view and print a UPC code image as illustrated in FIG. 19C.

Figure 20A:
Figure 20B:
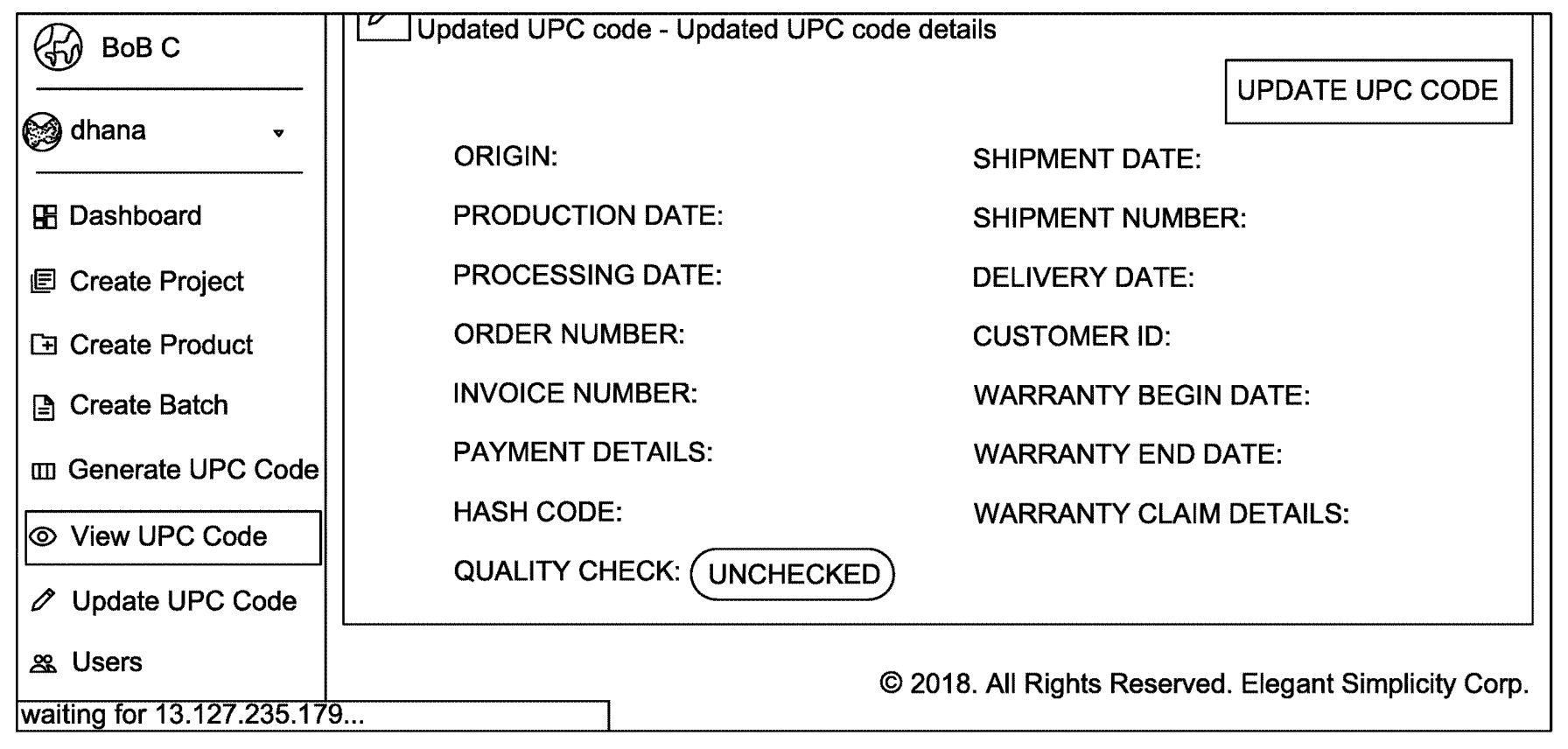

FIGS. 20A and 20B are examplary user interfaces for viewing block information associated with a UPC code within the system according to an embodiment of the present disclosure. The user interface of FIGS. 20A and 20B includes a view UPC code details section, a UPC code image section, and an updated UPC code details section. The view UPC code details section includes general information regarding a generated UPC code including the project name, the product name, the batch name, the author, the UPC code generation date, and the UPC code. The updated UPC code details section includes fields for block information relating to a particular physical product and corresponding generated UPC code including the origin, the production date, processing date, the order number, the invoice number, the payment details, the hash code, the quality check, the shipment date, the shipment number, the delivery date, the customer ID, the warranty begin date, the warranty end date, and the warranty claim details.

In implementations applied to collectables or collector's items (e.g., art, comic books, coinage, plates, figurines, bells, dolls, weapons, or swords), the fields of the blockchain may include descriptive information regarding the collector's items and the grade (as given by a grader or examiner certified by the relevant industry) of the collector's items.

In other embodiments, the user interfaces of FIGS. 20A and 20B may be configured for personal identification documents, e.g., passports, driver licenses, or other types of government-issued personal identification documents. A block of the blockchain for a personal identification document may include an image of all or a portion of the personal identification document in place of the image of the UPC code shown in FIG. 20A. The block may also include relevant information fields for inputting or updating information extracted from or related to the personal identification document. In the case of a passport, a block of the blockchain may include an image of a person that is shown in the physical passport, a passport number, and information relating to the person. In some embodiments, the image of the person may be modified based on the changing age of the person, added to the blockchain, and displayed in a read-only form to aid a government official in accurately verifying the identity of the person.

Figure 21A:
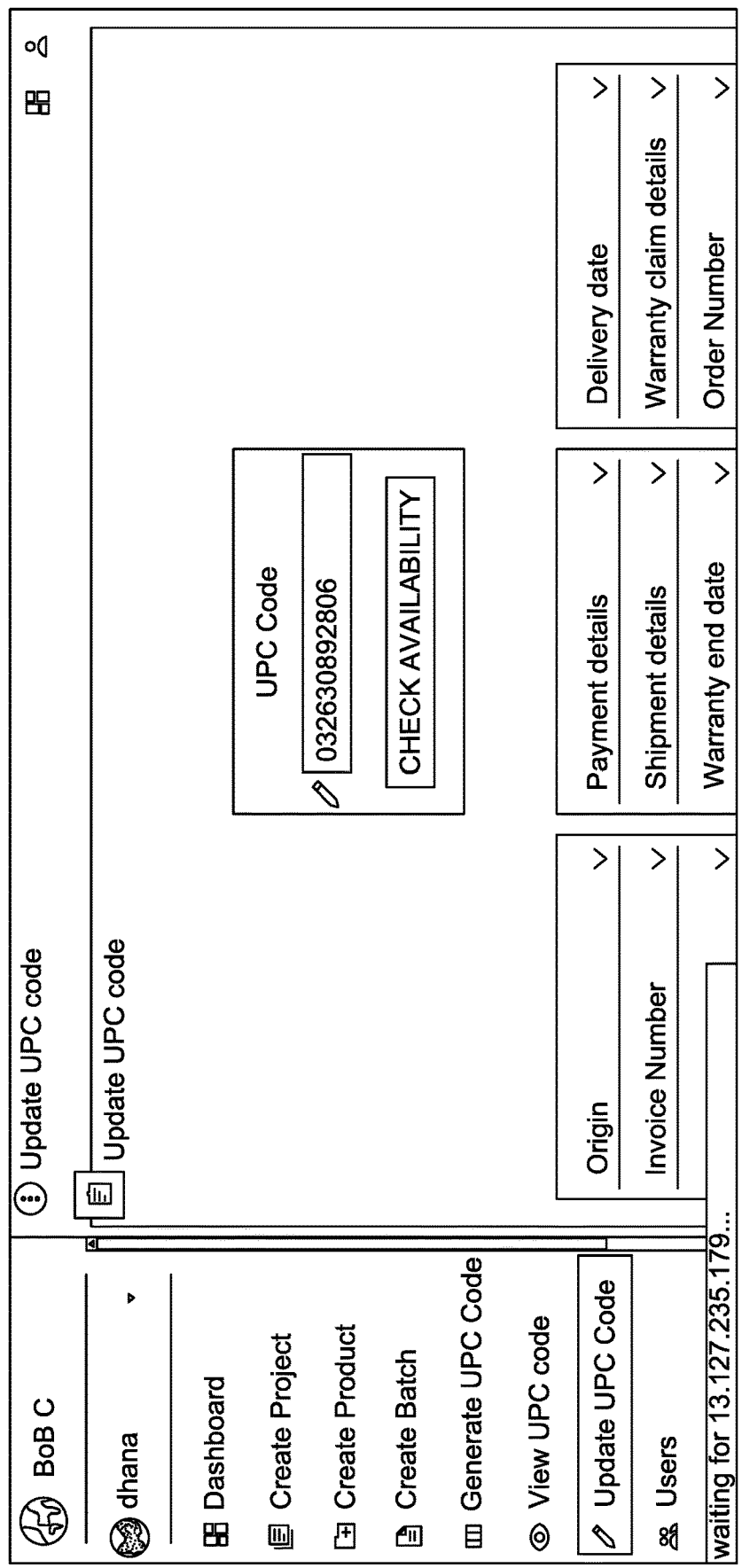
Figure 21C:
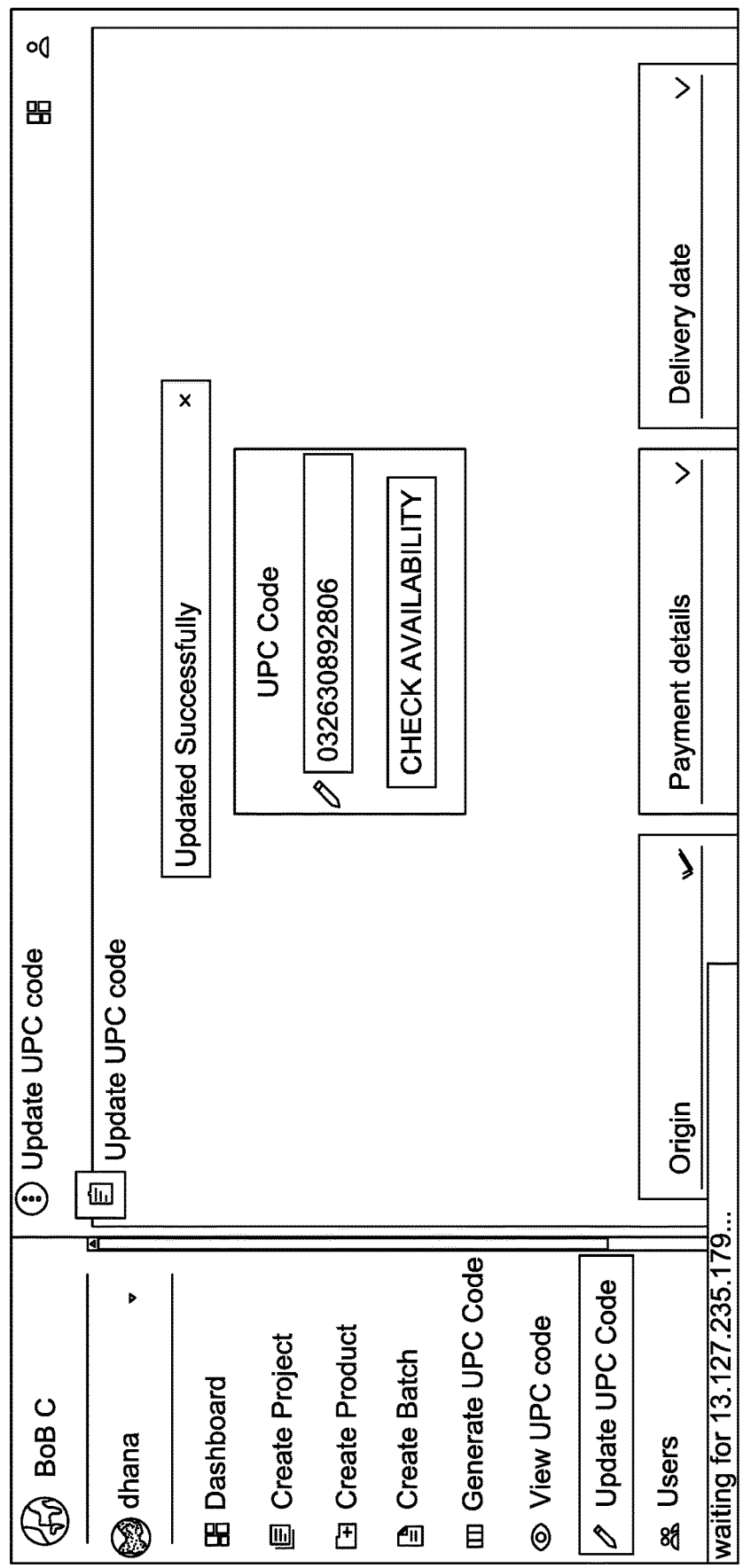

FIGS. 21A-21E are examplary user interfaces for updating block information associated with UPC codes according to an embodiment of the present disclosure. As illustrated in FIG. 21A, a user enters a UPC code in the UPC code field and selects the "Check Availability" button to access the block information associated with the UPC code. When a UPC code is first generated, the information fields may be empty as illustrated in FIG. 21A. A user may manually populate one or more of the information fields by selecting an information field, which reveals a user input field and an information field button. After a user enters appropriate text in the user input field, the user selects the information field button to cause the entered text to populate the information field associated with a UPC code. For example, when the user selects the hash code field, a user input field and a hash code button is revealed. The user may then enter a hash code in the user input field and select the hash code button to populate the hash code field with the entered hash code.

Figure 21D:
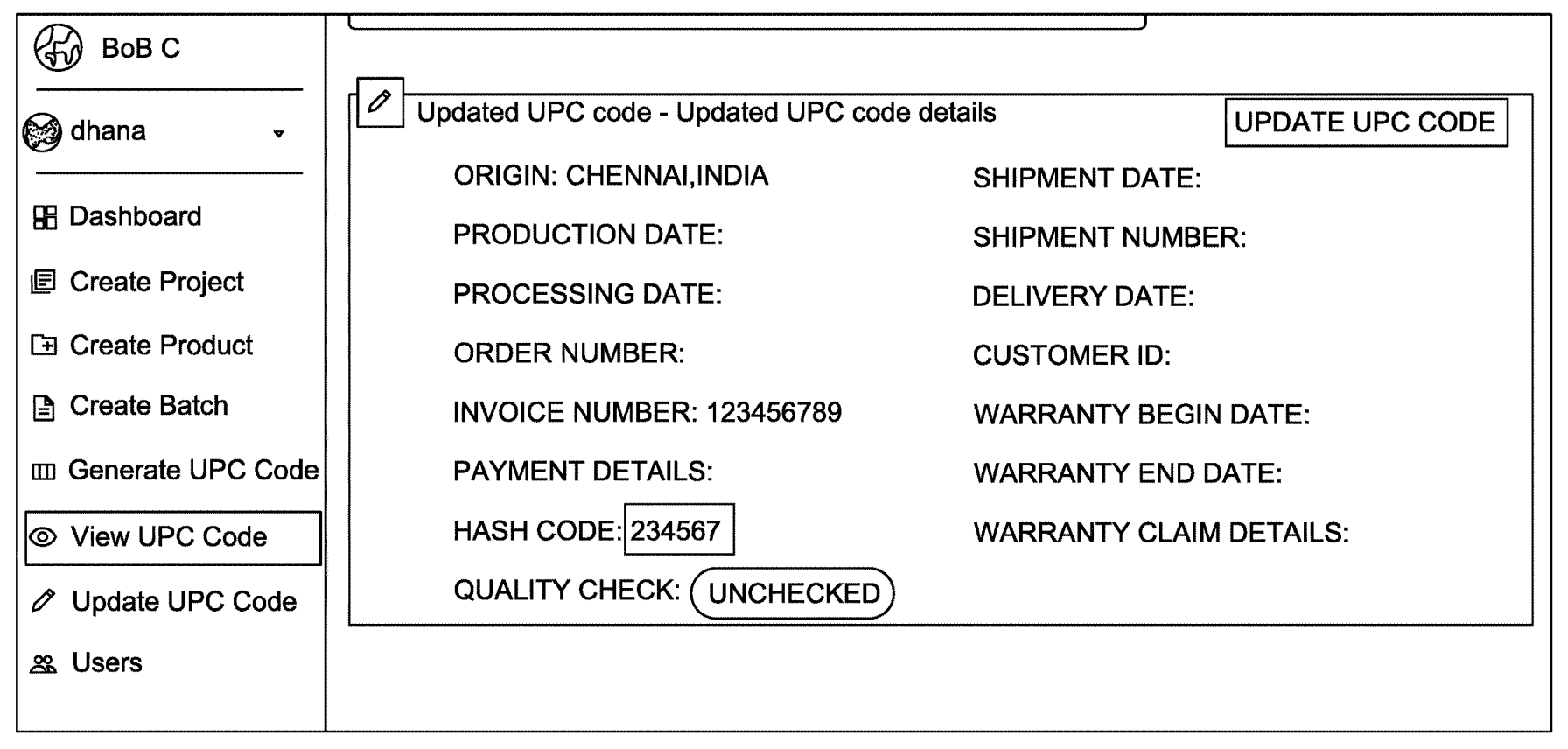
Figure 21E:
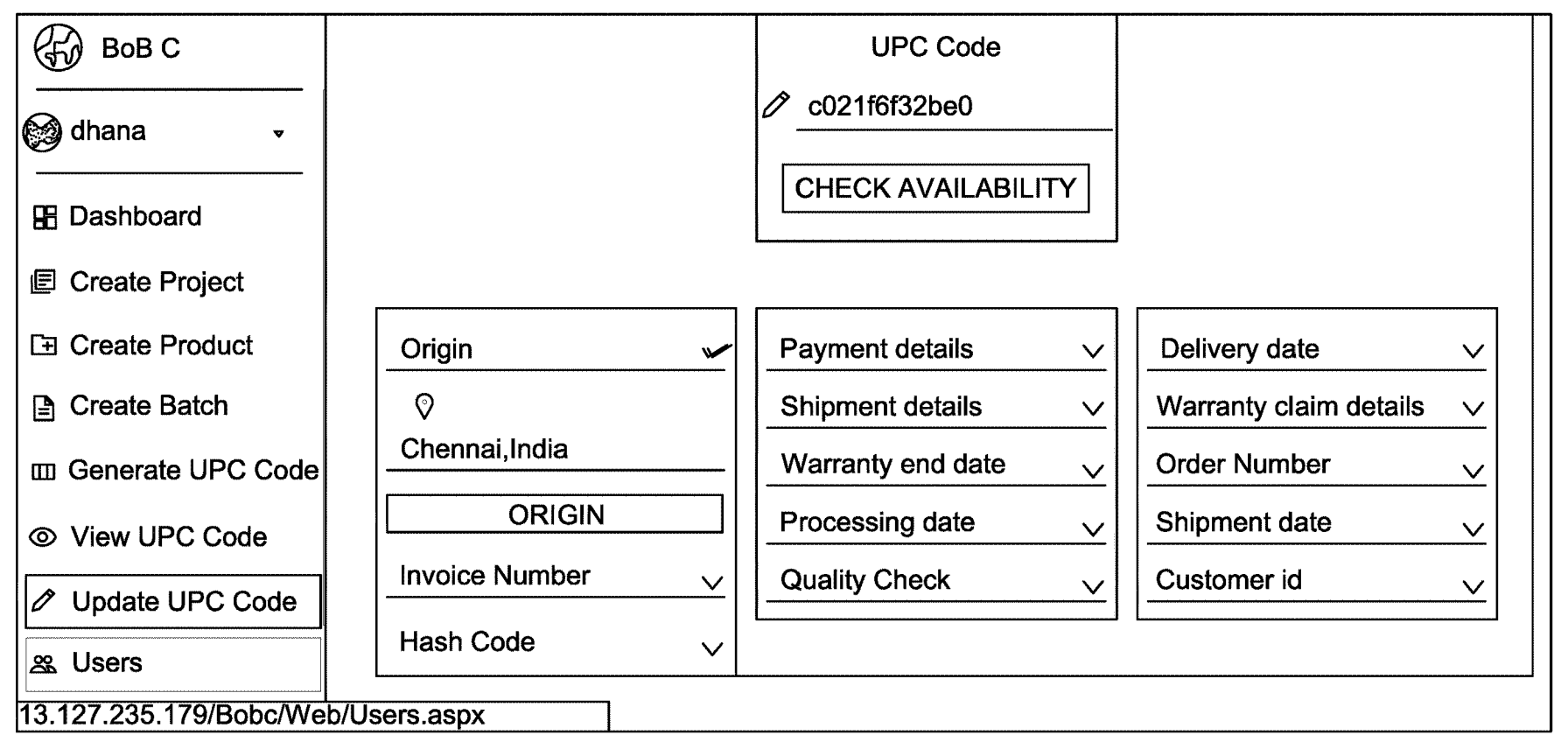

As illustrated in FIG. 21D, a user can select the view UPC code menu button to view the information fields. FIG. 21D shows that the origin, invoice number, and hash code fields are populated. The other information fields may be populated as the physical item having the UPC code is transported and delivered to a customer. In some implementations, information fields can be added by the administrator to meet the needs of a particular industry. For example, in implementations that use more than one code or "layered" codes, there may be two or more fields for the codes. In one implementation, one of the codes may correspond to a pattern on the physical item that is only readable by infrared or ultraviolet light. FIG. 21E illustrates checking the availability of a code. As shown, after entering a code and selecting the "check availability" button, double check marks are displayed to the right of the "Origin" text indicating the origin field to show that the code is being used and is unavailable. And, in some implementations, if a user attempts to change or delete data in a field that contains previously-entered data, the text indicating the field and/or the double check marks may be changed from the color black to the color red.

Figure 22A:
Figure 22B:
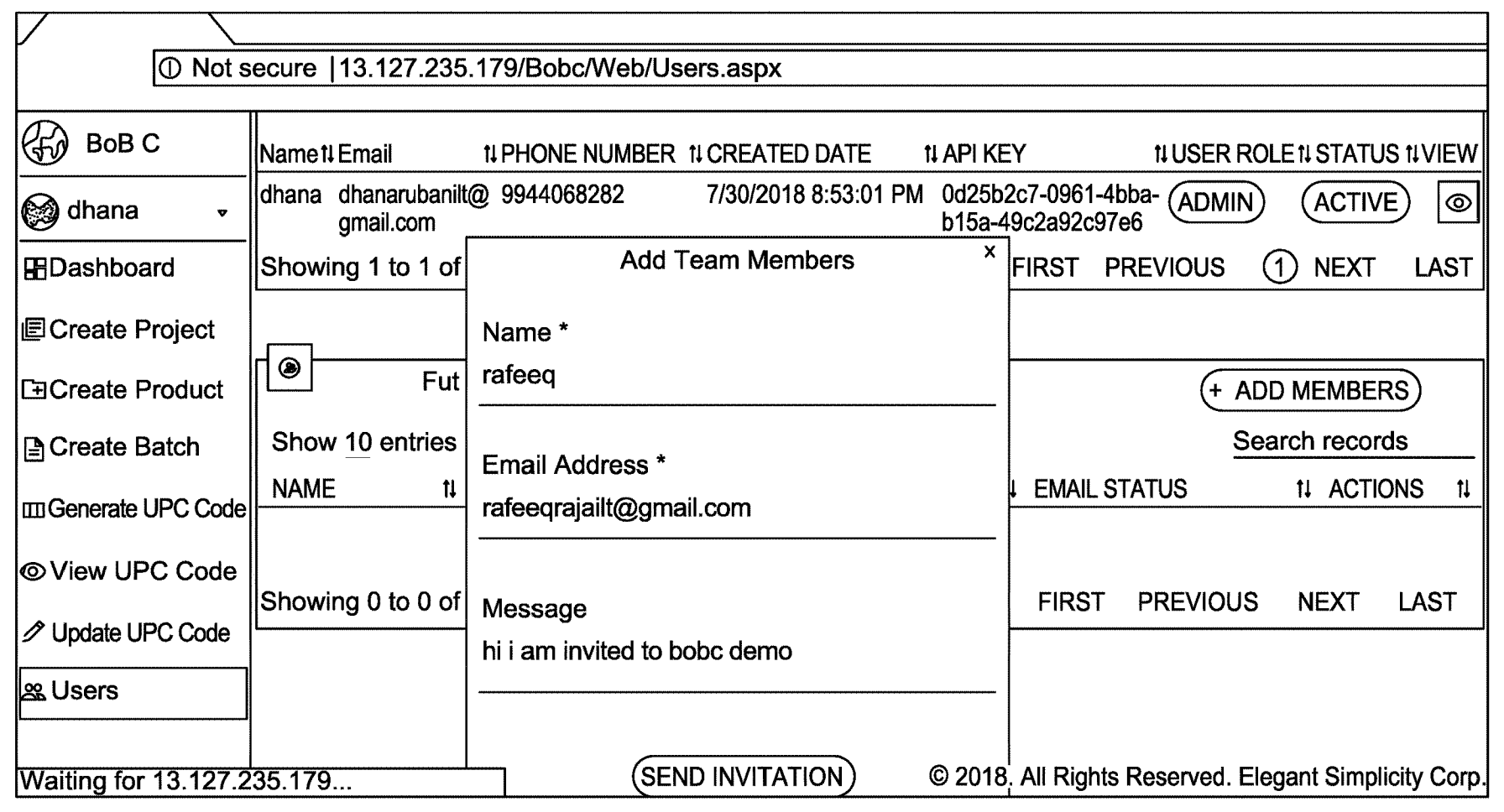

FIGS. 22A and 22B are examplary user interfaces for viewing and adding users to the system according to an embodiment of the present disclosure. FIG. 22A illustrates an interface having sections listing the current and future members. The future members are members who have been sent an invitation message, but who have not yet completed the registration process. Members may be added to the system by selecting the "Add Members" button, which causes an invitation message window (labeled "Add Team Members") to be displayed. A user may then enter a name of a member to be added and the email address of the member to be added into the corresponding fields of the invitation message window. The user may optionally enter text in the message field of the "Add Team Members" window. The user may then send the invitation message by selecting the "Send Invitation" button. The member to be added may then follow a registration process similar to the registration process illustrated in FIGS. 14A-14C.

Figure 23B:
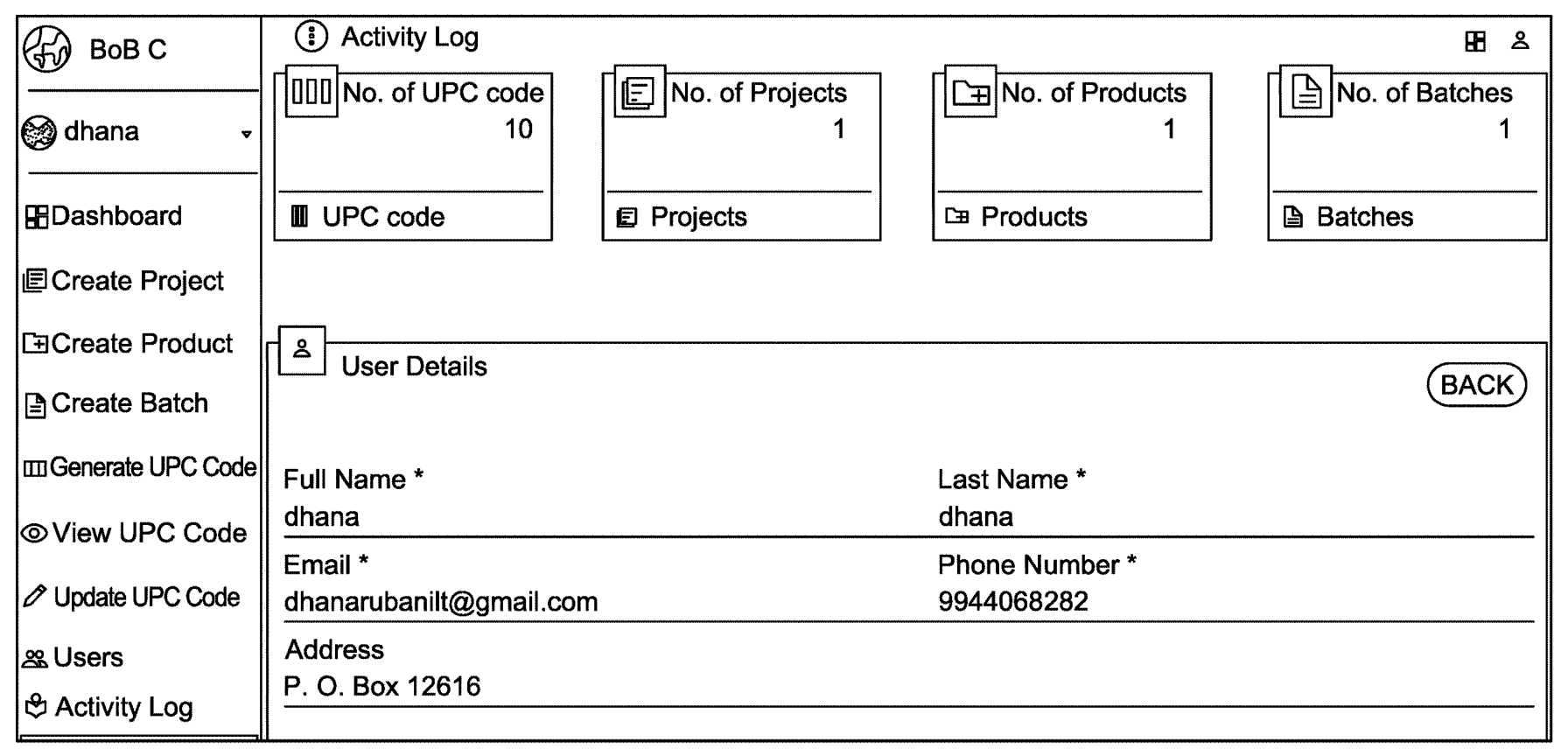
Figure 23D:
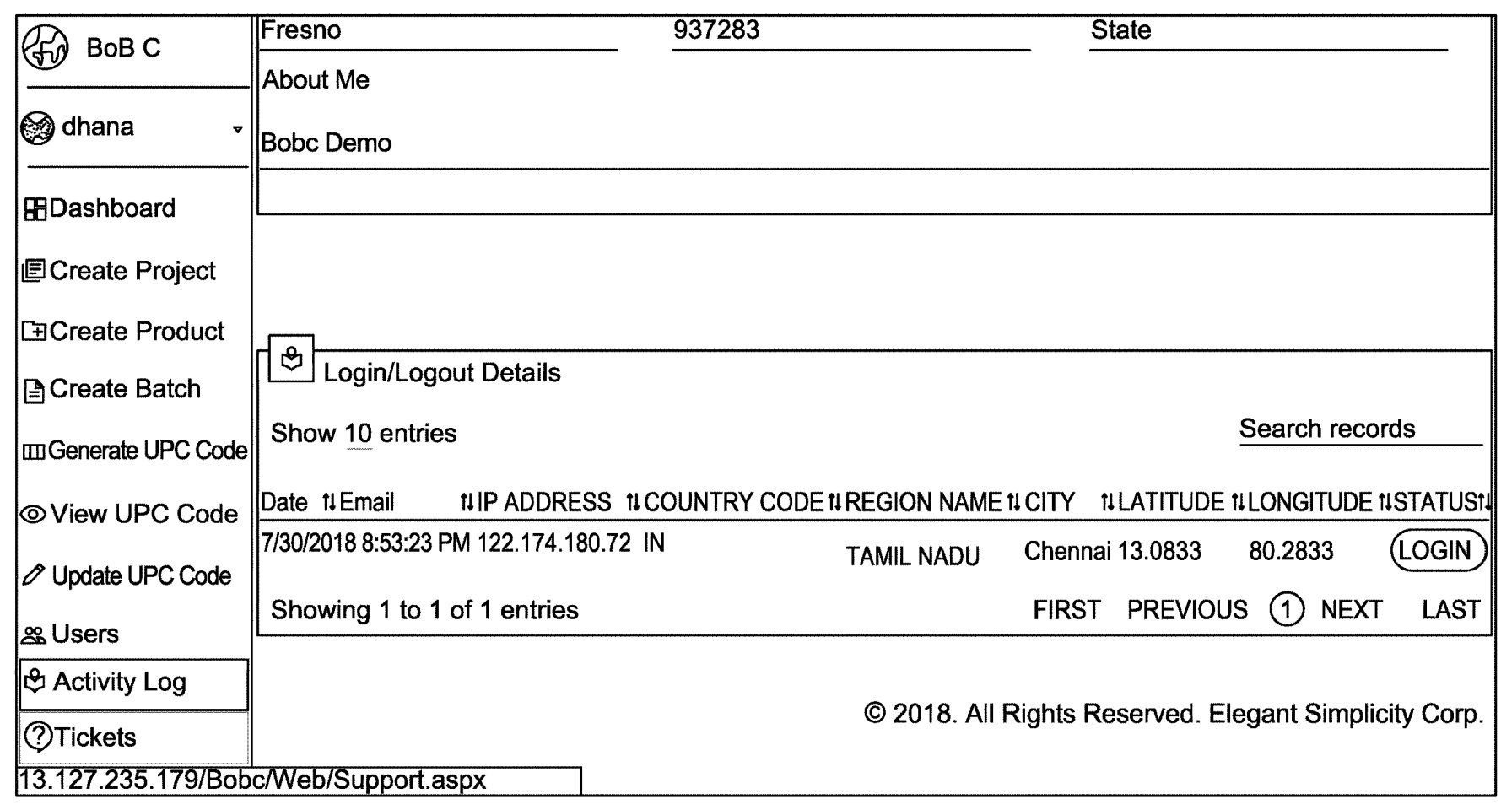

FIGS. 23A-23D are examplary user interfaces for viewing the activity logs of users associated with the system according to an embodiment of the present disclosure. The activity log feature facilitates transparency to ensure that members are behaving in an appropriate way and do not comprise the security of the system. As illustrated in FIG. 23A, the activity log interface includes a section listing the users of the system and relevant information associated with the users, e.g., name, email, phone number, created date, API key, and role of the users. By selecting the view button corresponding a user, the same or a different user can view details associated with the user as illustrated in FIG. 23B. The user details may include UPC code, project, product, and batch information, user contact information, and login and logout information, as illustrated in FIGS. 23B and 23C.

Figure 24A:
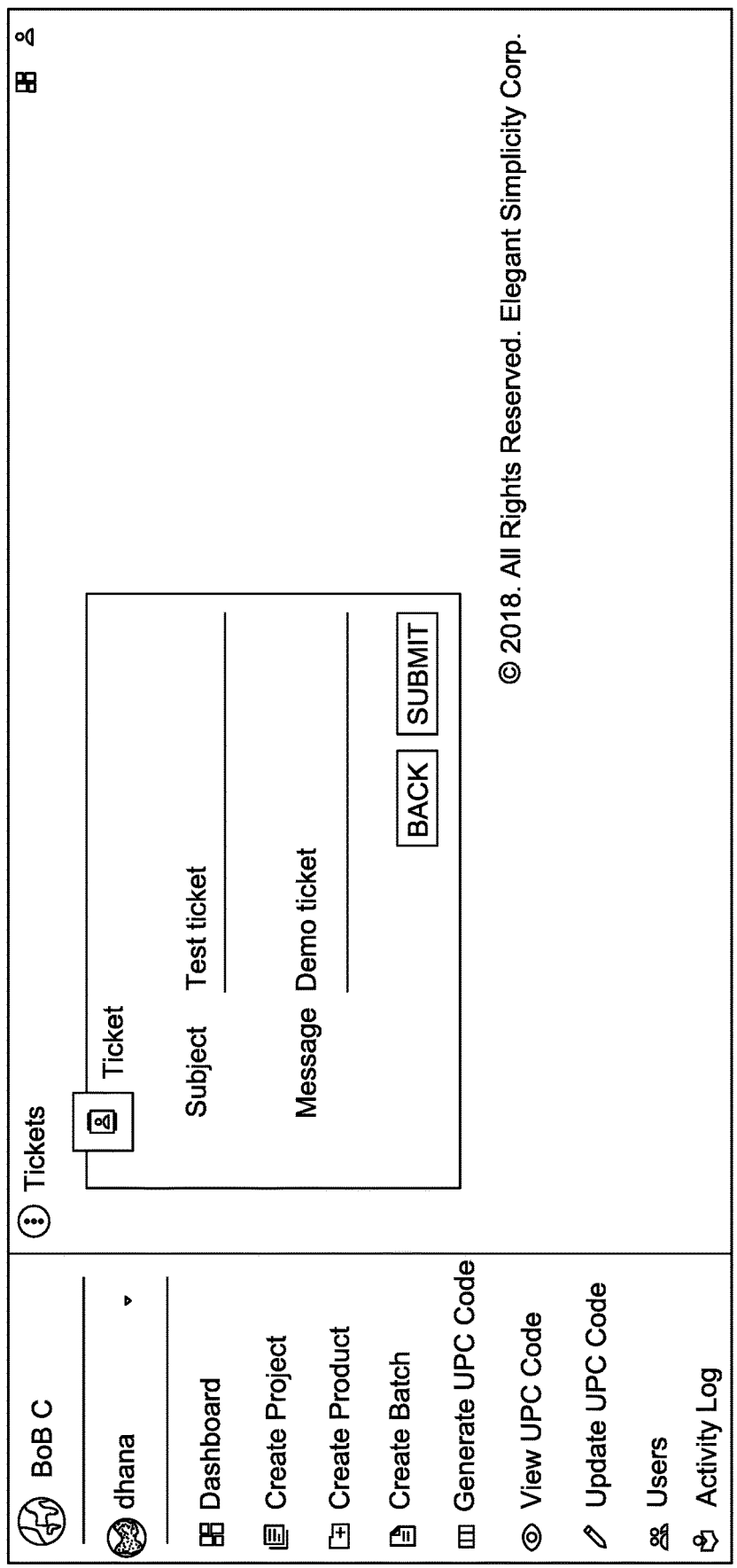
Figure 24B:
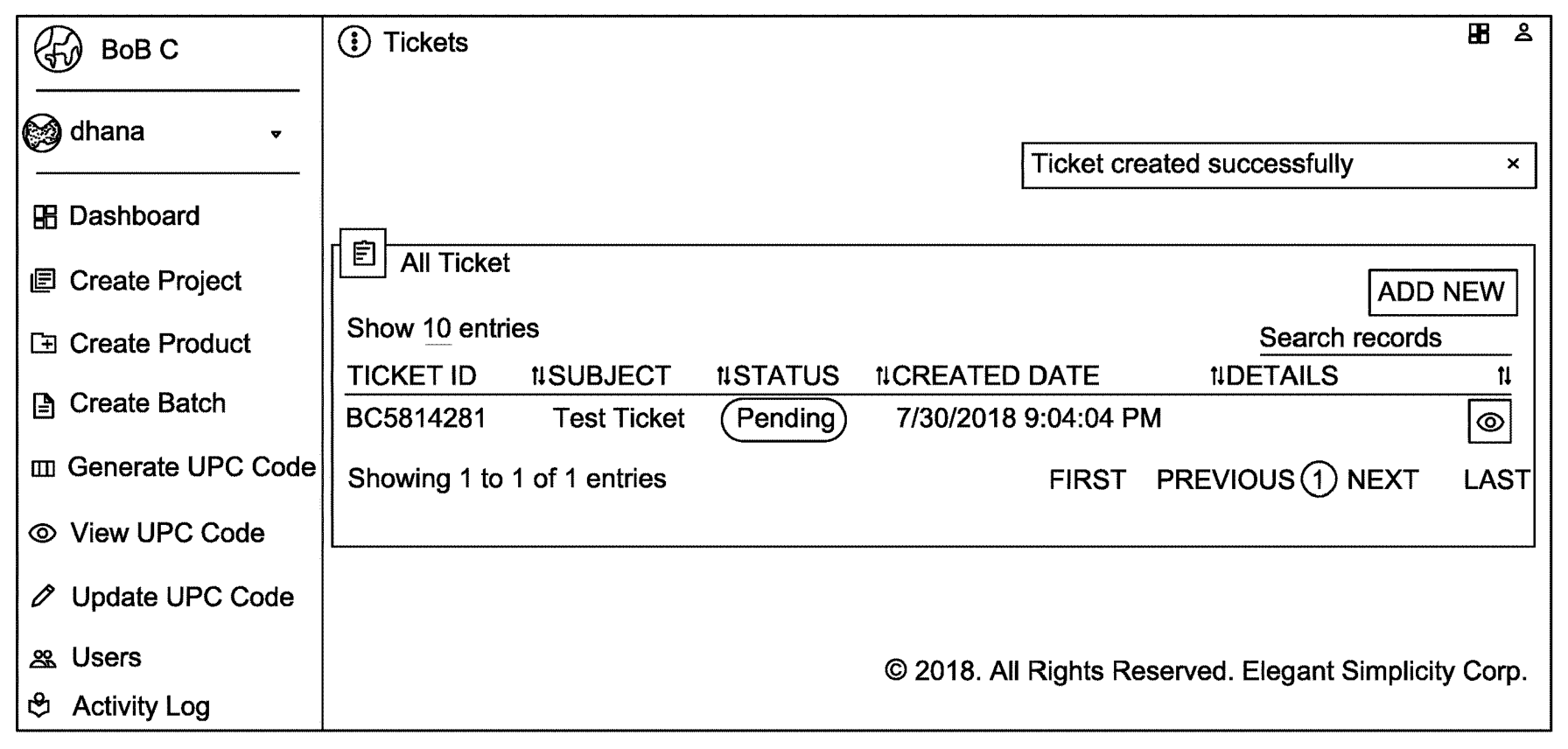
Figure 24C:
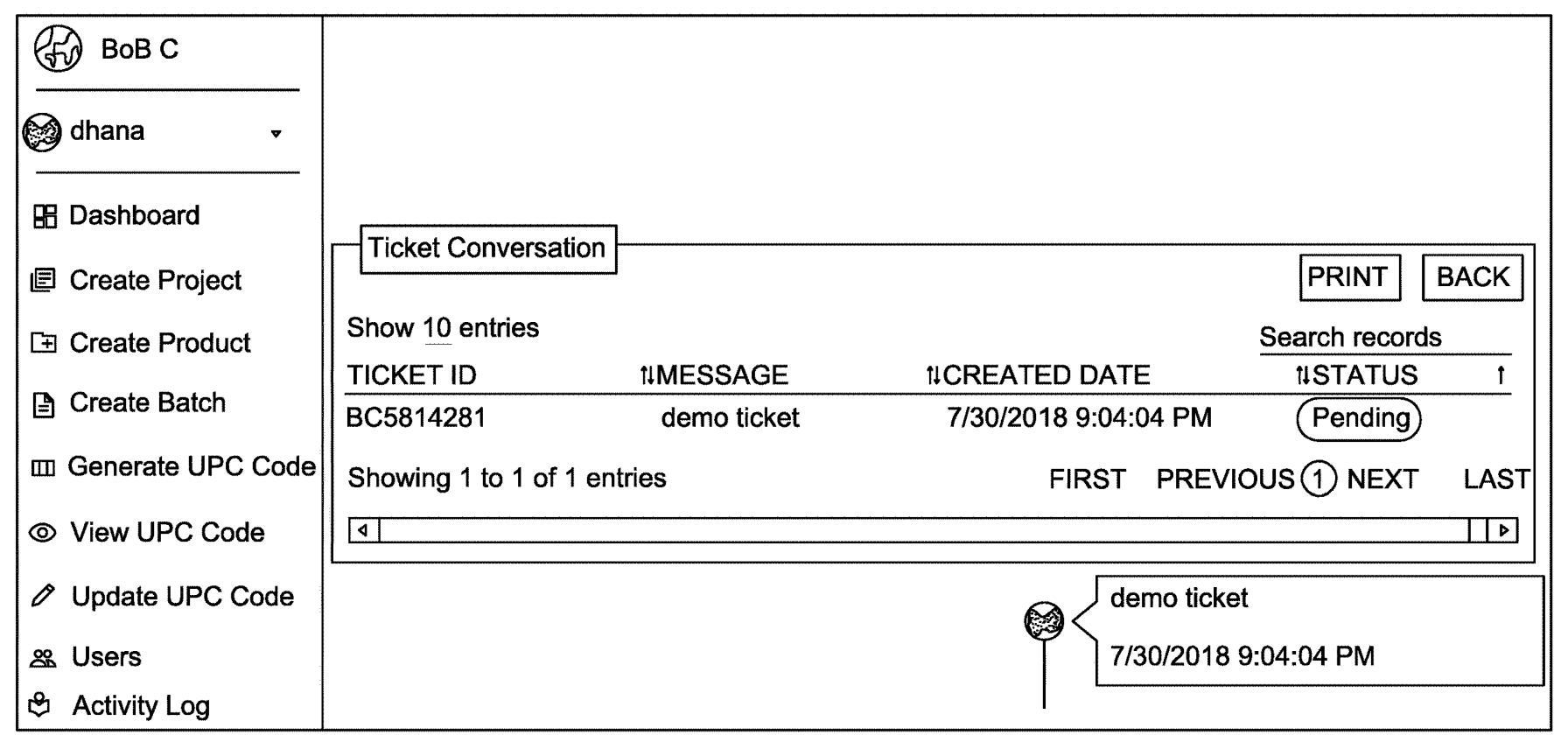
Figure 24D:
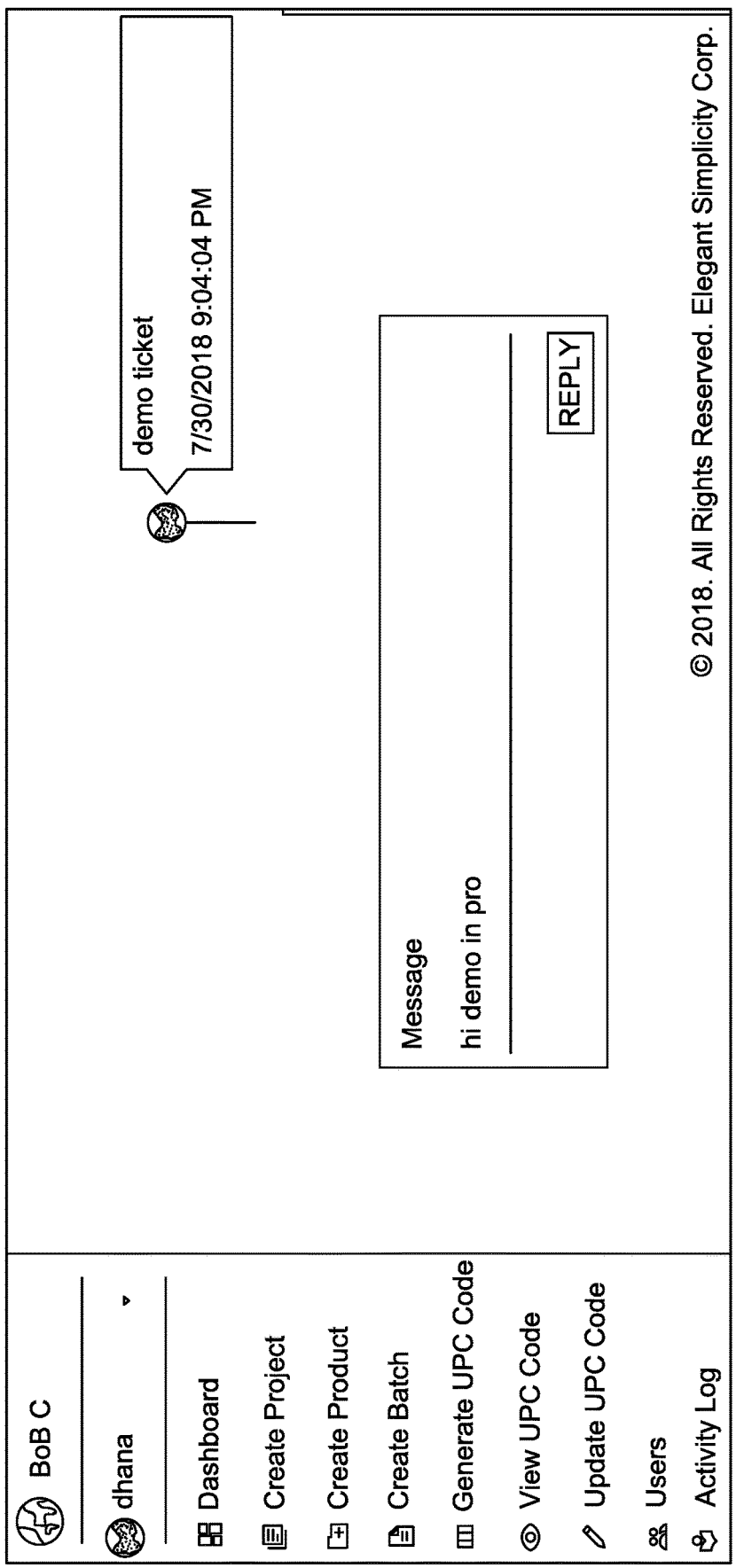

FIGS. 24A-24D are examplary user interfaces for viewing and creating tickets and exchanging messages in the system according to an embodiment of the present disclosure. When a user selects the "Tickets" menu button illustrated in FIG. 23D, the system displays a tickets interface, which includes a section listing tickets and a button to add new tickets, as illustrated in FIG. 24B. Each ticket item in the section listing tickets may be identified by a ticket identification number, a subject, a status, and a creation date. When a user selects the button to add a new ticket, the system displays a ticket creation window, which includes subject and message input fields in which a user may enter appropriate text. The user then selects the submit button to add the ticket, which is listed in the "All tickets" section of the interface illustrated in FIG. 24B. As illustrated in FIGS. 24C and 24D, the tickets interface also includes a ticket conversation section that allows users to send messages to each other regarding one or more tickets.

Figure 25A:
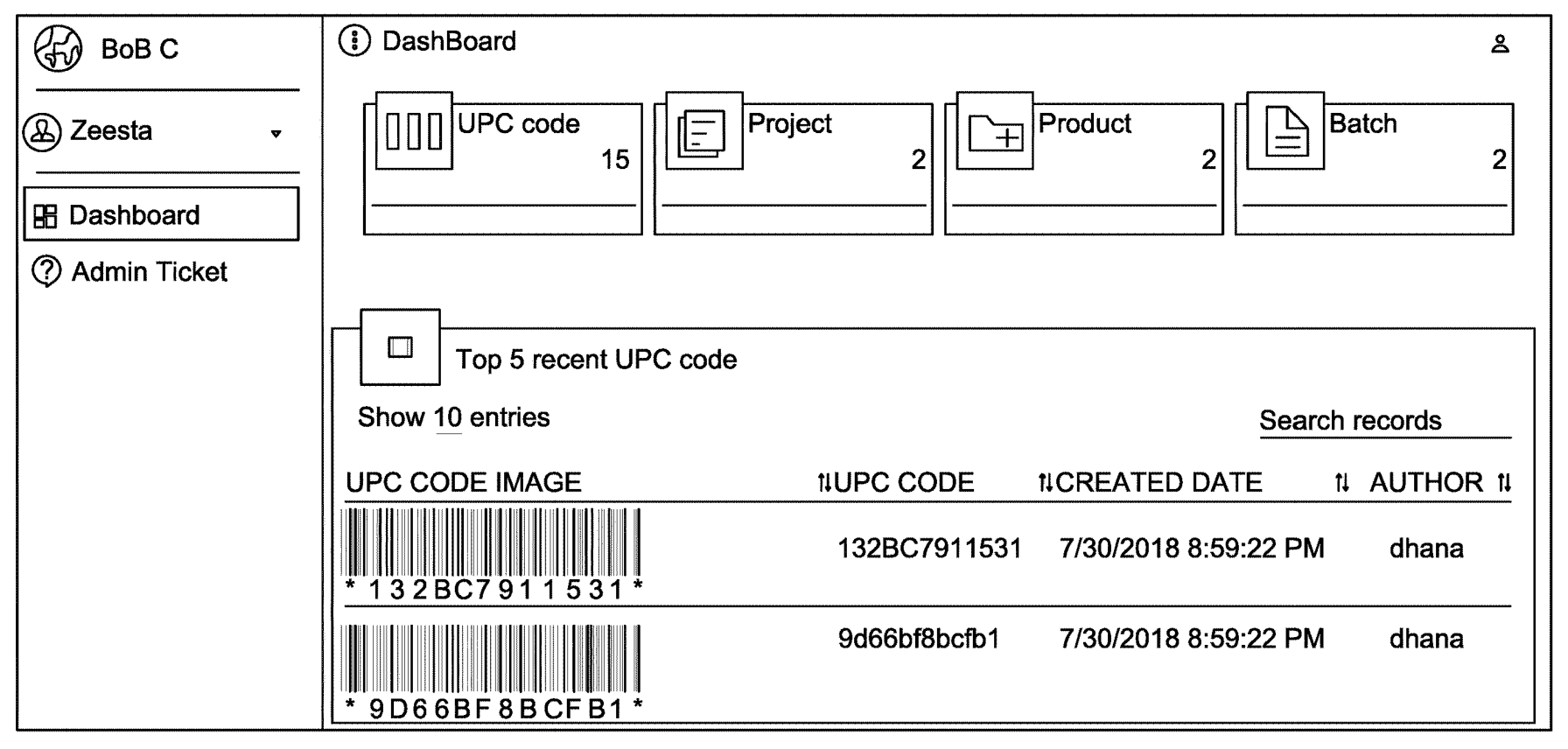
Figure 26B:
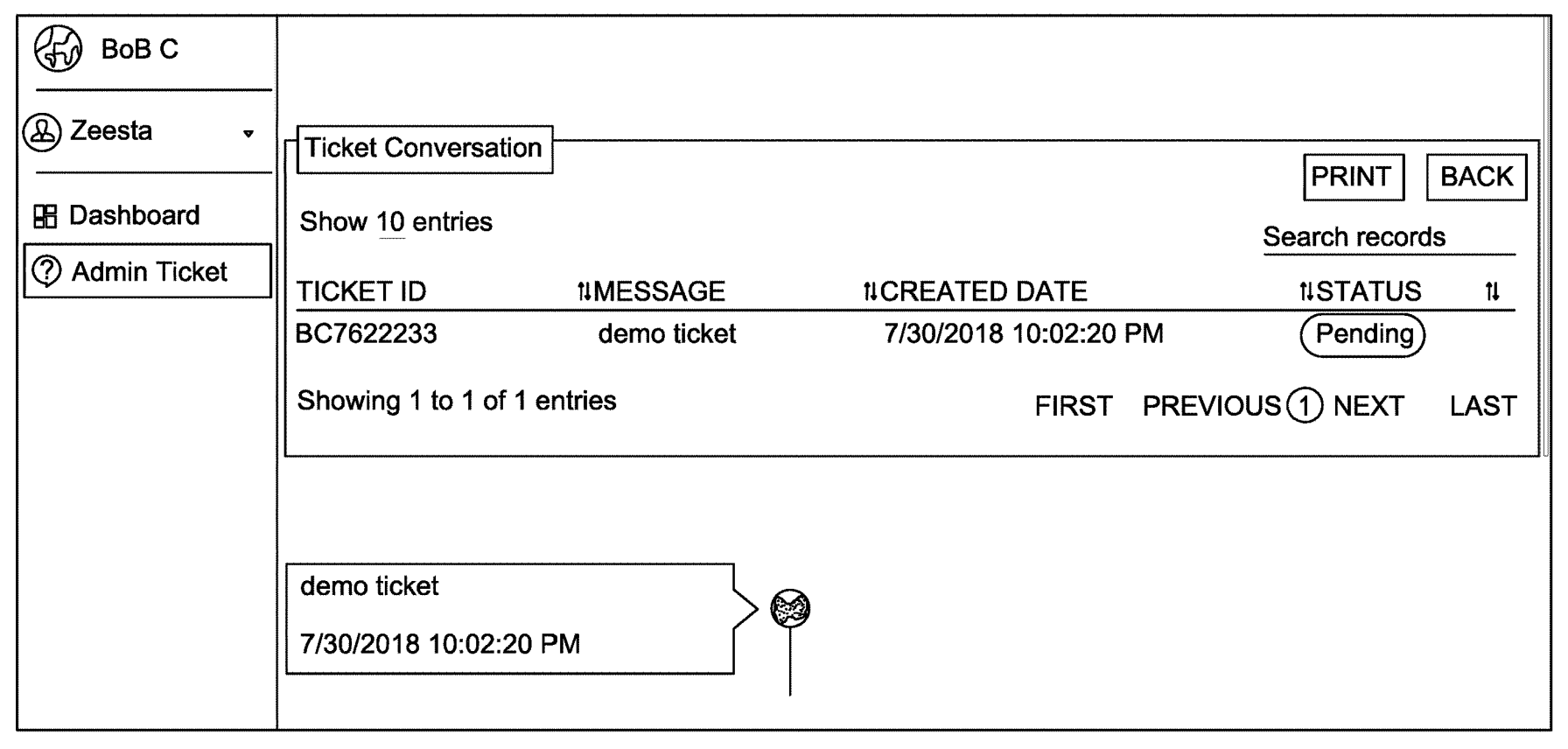
Figure 26C:
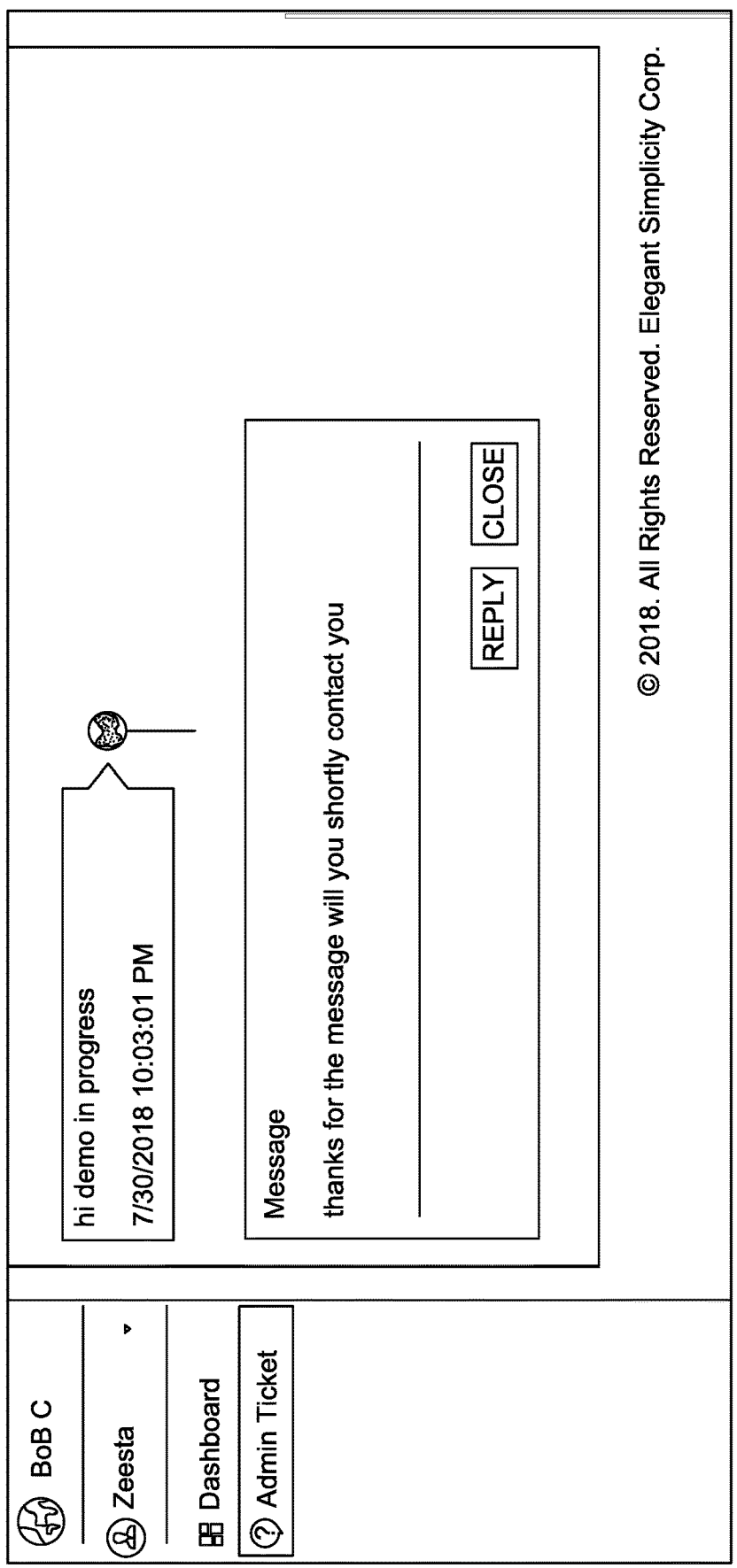

FIGS. 25A and 25B are examplary user interfaces illustrating a dashboard for an administrator of the system according to an embodiment of the present disclosure. FIGS. 26A-26C are examplary user interfaces for monitoring tickets and exchanging messages in the system according to an embodiment of the present disclosure. The user interfaces of FIGS. 25A-26C, allow an administrator to, among other things, monitor the users of the system to ensure the integrity of the system and to ensure that the system operates efficiently. The administrator dashboard of FIGS. 25A and 25B includes UPC code, project, product, and batch information for all users of a particular instance of the system, which may encompass one or more organizations, e.g., businesses. The administrator dashboard may also show recently generated and updated UPC codes. As illustrated in FIGS. 26A-26C, the system also includes an administrator ticketing feature similar to the ticketing feature illustrated in FIGS. 24A-24D. This allows an administrator to manage the ticketing process and to provide input or guidance via the ticket conversation feature.

Some embodiments of this disclosure may incorporate blockchain ID (e.g., government-issued ID) verification technology. The verification technology may use optical character recognition (OCR) technology with advanced logics that serves to identify and distinguish counterfeit or forged IDs (e.g., government IDs) from the genuine and legitimately-issued IDs (e.g., legitimate government-issued IDs). The technology may include various portals and applications including an admin portal, an Android application, and/or an iOS application. In some embodiments, an identification system, at least a portion of which may be implemented by an android or iOS application, for example, is used to identify whether the IDs are the original or counterfeit. An admin portal may be the backbone of the system. In the admin portal, the administrator uploads the ID details, which, in the case of government-issued IDs, is provided by a government. While the present disclosure describes government-issued IDs, embodiments of this disclosure may also be applied to other types of IDs.

The issued ID number becomes the master key. Thus, for example, every government-issued ID has a unique master key. All government ID details and activities are saved under the corresponding master key. In the admin portal, the administrator can upload the government ID details using Microsoft Excel, CSV files, or one or more application programming interface (API) calls. The API includes a set of routines, protocols, and tools for building software and applications. The API calls represent specific operations that the client applications can invoke at runtime to perform tasks, for example: query data in an organization; add, update, and delete data; obtain metadata about data; or run utilities to perform administration tasks. The admin portal may contain login, change password, and profile pages. The administrator can update the profile as needed.

In one implementation, a blockchain government ID identification application may be published to a store (e.g., Android Google Play Store or iOS App Store) and can be downloaded onto any mobile device (e.g., an Android or iOS mobile phone or smartphone). Government-authorized personnel only would be allowed to use the application.

The base of the application may be ironclad and include data breach security without losing the data outside. Only the authorized ID can get the results. No one can change the data from the backend. Thus, the code used is obfuscated and guarded to not lose any backend information (e.g., database name, server URL, encrypted values, etc.). Therefore, none of the information can be gathered outside of these parameters or modified.

A read ID is encrypted and is pushed to a URL so that it is secure and cannot be modified by hackers to produce false data. The reading technique may be any reading technique known to those skilled in the art including optical character recognition, which includes electronic conversion of images of typed, handwritten, or printed text into machine-encoded text. The features of the application include the fast and easy reading of an ID from a document and jumping directly to decoded web addresses.

The government-issued identification may be a birth certificate, a social security card, a state-issued driver's license or ID card, a department of defense identification card, or a permanent resident card. The birth certificate may include all or a portion of the following details: the baby's name; the name of the parents; the time and date of birth; the city, state, and country of birth; and/or the footprints and/or handprints of the baby. The social security card may include all or a portion of the following details: name (shown on card); full name at birth; social security number; place of birth; date of birth; citizenship; response of voluntary; sex; parent details; parent social security number details; mailing address; digital signature; and/or date of social security issue details. The state-issued driver's license or ID card may include all or a portion of the following details: name; type of license; issued date; expiration date; image; digital signature; address; sex; height; eyes; donor details; state; and/or date of birth. The department of defense identification card may include all or a portion of the following details: name; digital photo; digital signature; expiration date; federal identifier; affiliation; service/agency; pay grade; rank; blood type; department of defense (DoD) benefits number; date of birth; Geneva Convention category; and/or DoD identification number. The permanent resident card may include all or a portion of the following details: surname; given name; USCIS; date of birth; country of birth; sex; digital photo; digital signature; card expiration; and/or card number.

In some implementations, the blockchain government ID identification application may be used as follows. First, the application is installed from an application store. The application is opened and permissions are given for the camera. The camera permissions are needed to read the ID. The permissions may be requested immediately after opening the application for the first time by internal rules of the digital security feature of the device. Once the camera is open, the ID is read. After a successful reading, the ID application automatically brings up the ID verification result page. The records are displayed in the mobile application from the backend securely. The application can be uninstalled and reinstalled anytime and anywhere with an active Internet connection. These steps can be followed to get successful results of the ID verification and authentication.

Figure 27:
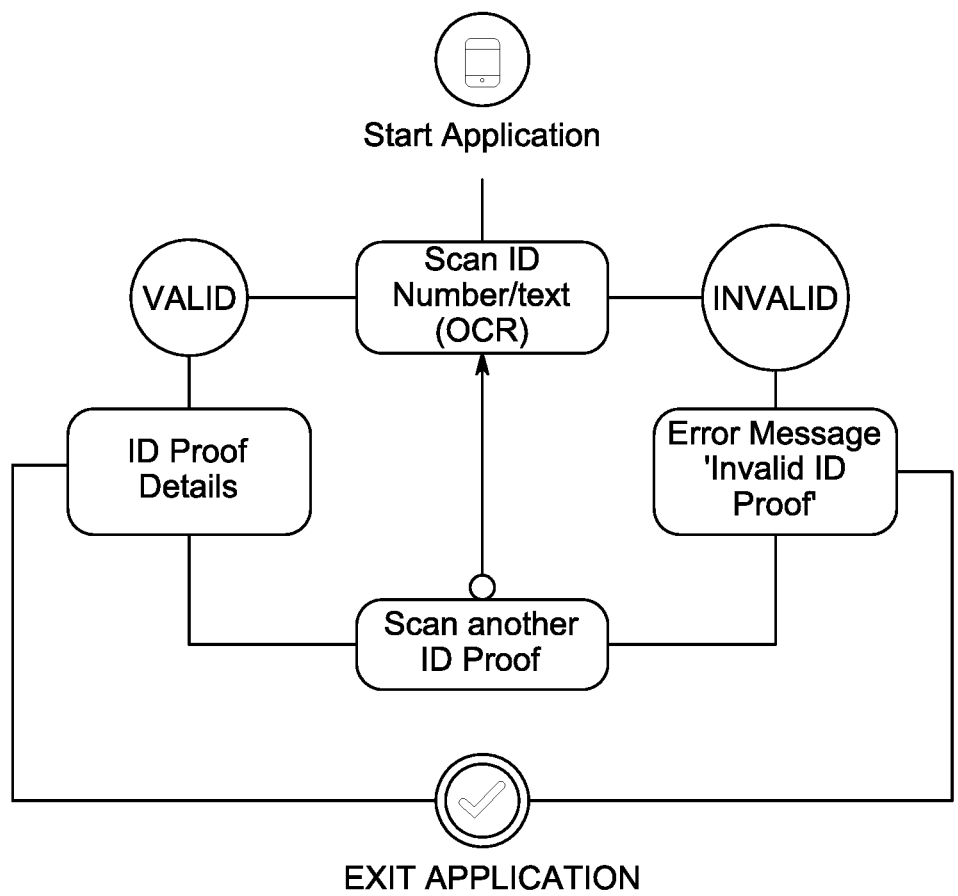
FIG. 27 is a flowchart illustrating operation of the blockchain ID proof identification application according to an embodiment of the present disclosure.

FIG. 27 is a flowchart illustrating operation of the blockchain ID proof identification application. After starting the application, the ID number and/or text is scanned, e.g., via OCR. Then, the application determines whether the ID is valid or invalid. If the ID is valid, ID proof details are displayed. If the ID is invalid, an error message is displayed (e.g., a message with the text: "Invalid ID proof". Then, unless another ID proof needs to be scanned, the application is exited.

The base of the Android application may be developed with Core Java with Google Android Studio and SDK. The base of the iOS application may be developed with Objective C with iOS APPLE Xcode and SDK.

In embodiments, the present disclosure features as system and method for passport identification using barcode on blockchain technology with advanced logics that serve to find counterfeit or forged passports throughout the world. The system includes an admin portal and an application. The identification system is used to identify whether a passport or passport details are original or counterfeit. The system can verify and authenticate whether the passport is an original or counterfeit using the application.

Figure 28A:
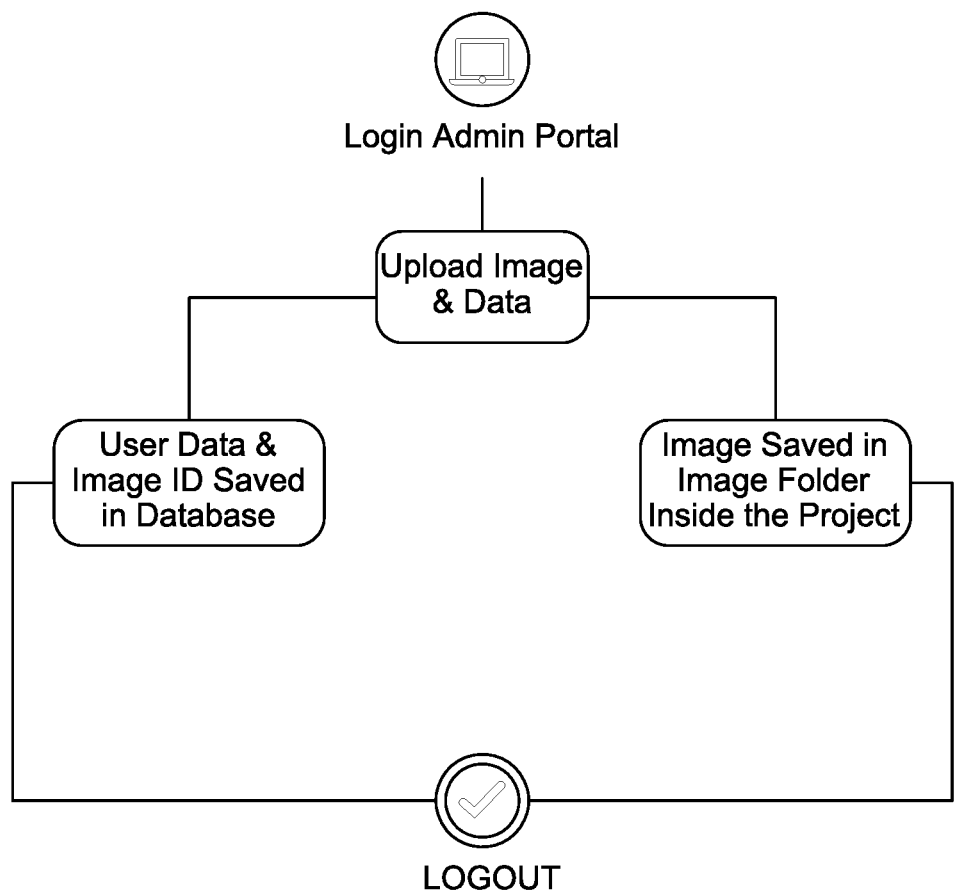
FIGS. 28A and 28B are flowcharts illustrating operation of the blockchain passport system according to an embodiment of the present disclosure.

The admin portal is the backbone of the system. In the admin portal, the authorized administrator uploads the passport details which is obtained from the high value data protocol (HVDP), as illustrated in FIG. 28A.

The passport number serves as the master key. Thus, every passport has a unique master key based on their unique assigned number. All passport details and activities are saved under the corresponding master key. In the admin portal, the authorized administrator can upload the passport details using Microsoft Excel, CSV files, or using an API call from the high value data protocol (HVDP). In June 2009, the governments of the United Kingdom, Canada, the United States, Australia, and New Zealand (the Five Country Conference) signed a joint agreement to pursue biometric data sharing for immigration purposes. Under the agreement, known as the high value data sharing protocol, the countries share a limited number of immigration fingerprint records (approximately 3,000 per country per year) for matching against the other countries' immigration databases. If a match is found, further biographical information is shared on a bilateral basis. The admin portal contains login, change password and profile page. The admin can update the profile.

The passport identification application may be published to an application store and can be downloaded onto any mobile device. Authorized persons only are allowed to use the application. The base of the application is strong and securely developed without losing the data outside; only the appropriate barcodes can be scanned to get the results. No one has the ability to scan and change the data from the backend. Thus, the code used is obfuscated and guarded to not lose any backend information (e.g., database name, server URL, encrypted values, etc.). Therefore, none of the information can be gathered outside these parameters or modified.

The scanned barcode is encrypted, to be pushed to URL, so that it is secure enough and cannot be modified by hackers to produce false data.

Two types of scanning technique may be used: a 1D scanning type and a 2D scanning type. The following are 1D scanning types which may be used to scan a barcode and which are the globally-supported 1D barcode standards: Add-2, Add-5, Australian Post 4-State Barcode, BCD Matrix, Codabar, Code-128, Code 2 of 5, Code 32, Code 39, Code 39 Extended, Code 93 Code 93 Extended, DataLogic 2 of 5, EAN 128, EAN-13, EAN-8, IATA 2 of 5 Industrial 2 of 5, Intelligent Mail, Interleaved 2 of 5, Inverted 2 of 5, Matrix 2 of 5 Patch Code, PostNet, Royal Post 4-State Barcode, UPC-A, and/or UPC-E.

The following are the 2D scanning types used to scan a barcode with multiple dimensions and these are standard processes used to scan a barcode and encrypt it to upload and get the data from the backend securely: Aztec, Data Matrix, PDF-417, or QR.

The passport verification details may include all or a portion of the following: surname; given name; nationality;

passport number; date of birth; place of birth; sex; issued on date; expired on date; digital image; digital signature; and/or list of traveling details.

The passport identification application may be used as follows: install application from application store; open application and give permissions for camera; once the camera is open, scan the barcode that needs to be scanned to get the desired results; after a successful scan, the application automatically displays the barcode scan result page; every record is displayed in the mobile application from the backend securely; and the application can be uninstalled and reinstalled any time anywhere with an active Internet connection.

Figure 28B:
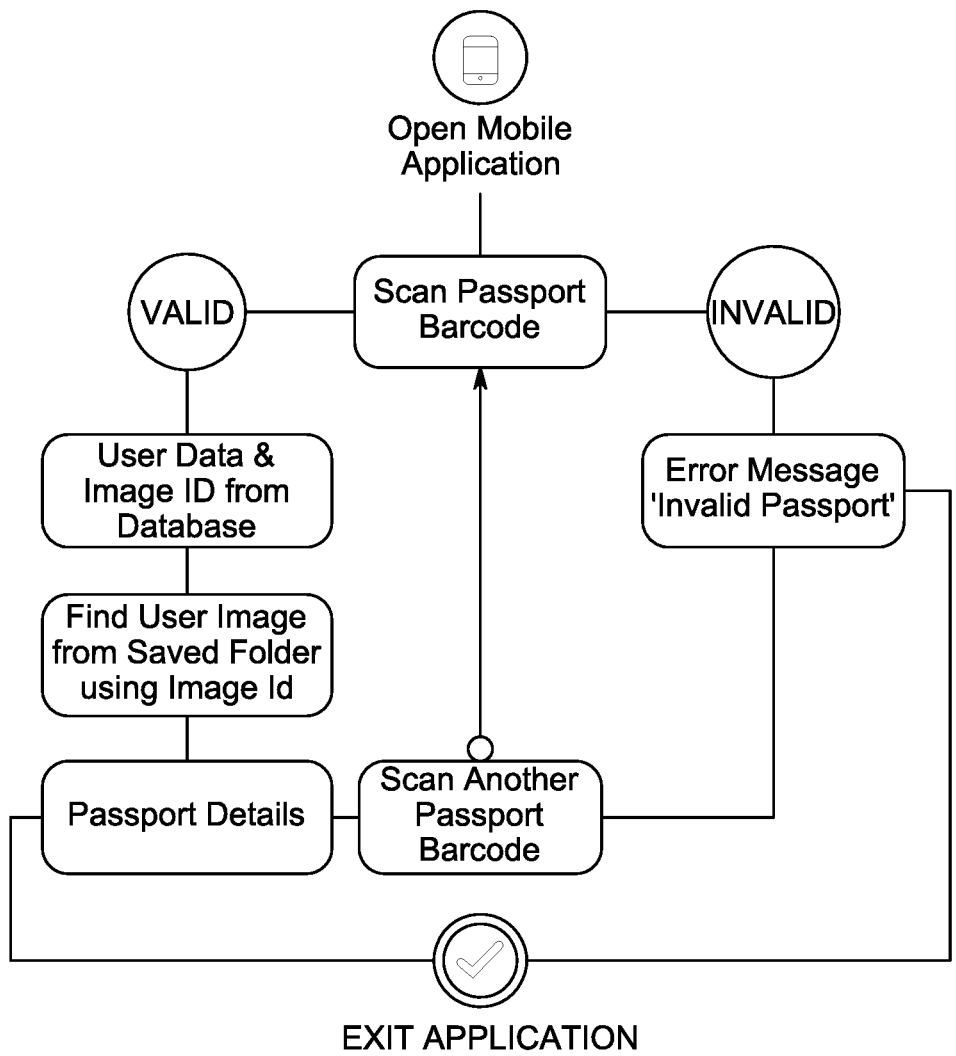

FIG. 28B is a flowchart illustrating operation of the blockchain passport system according to an embodiment of the present disclosure. After opening the application, the passport barcode is scanned. Then, the application determines whether the passport is valid or invalid. If the passport is valid, user data and image ID is obtained from a database, the user image is found in a saved folder using the image ID, and passport details are displayed. If the ID is invalid, an error message is displayed (e.g., a message with the text: "Invalid ID proof". Then, unless another passport barcode needs to be scanned, the application is exited.

Figure 29:
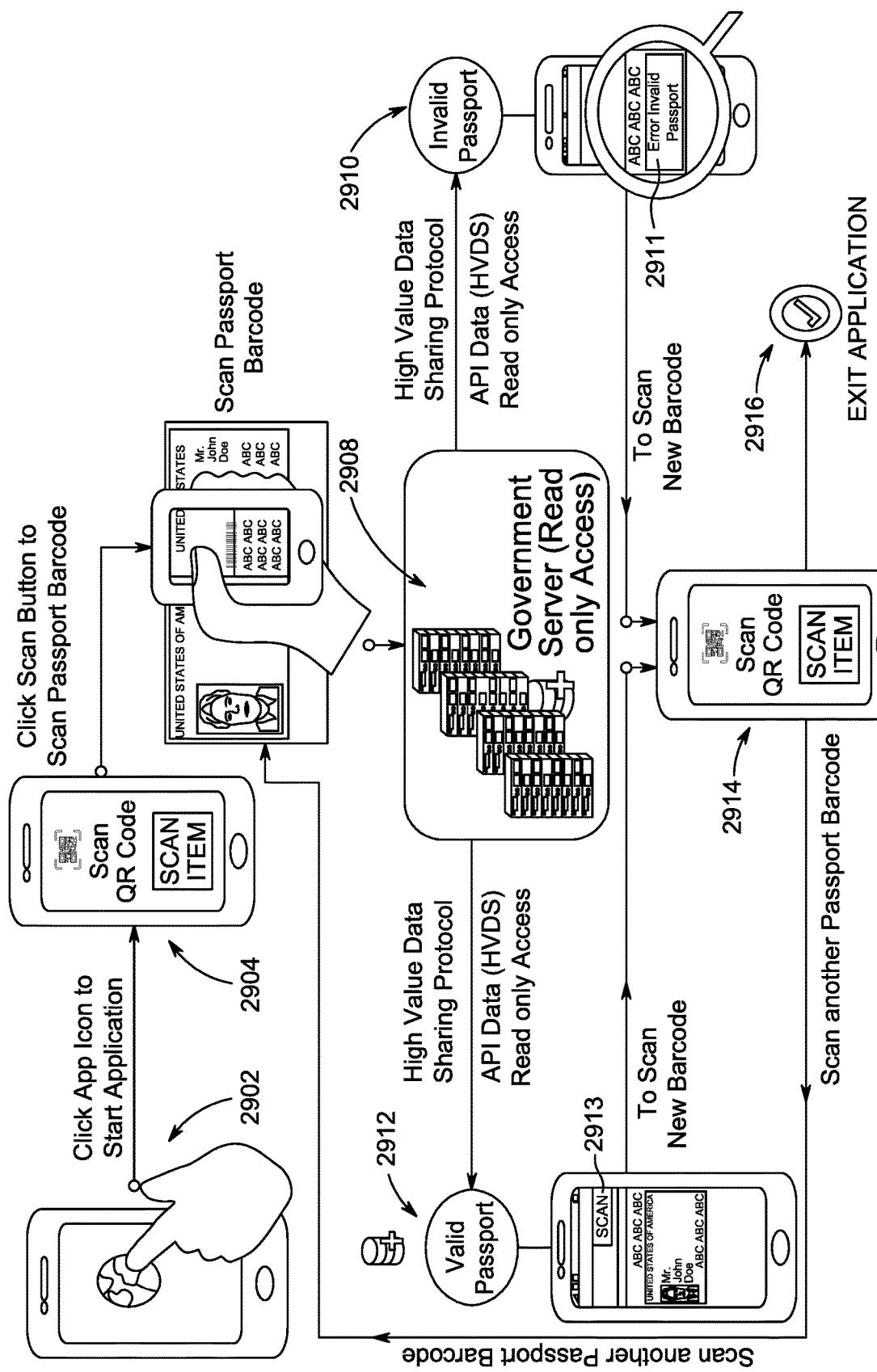
FIG. 29 is a flow diagram illustrating operation of the blockchain passport system according to another embodiment of the present disclosure.

FIG. 29 is a flow diagram illustrating operation of the blockchain passport system according to another embodiment of the present disclosure. At 2902, the mobile device starts a blockchain passport application in response to detecting a user clicking on an app icon displayed on the display of the mobile device. At 2904, the mobile device displays a scan button, which, when clicked or selected by a user, causes the camera or other scanning device of the mobile device to scan a passport barcode, as illustrated at 2906, or to scan another type of code on an identification document (e.g., a driver license) to obtain scanned code information. At 2908, the scanned code information is used to search a government server for passport information corresponding to the scanned code information. The passport information may include an image of the person, an image of all or a portion of a passport document, or an electronic passport. At 2912, the mobile device uses the scanned code information to gain read-only access (e.g., via a high-value data sharing protocol) to passport information securely stored in a blockchain residing on a government server. The passport information includes an image of the valid passport. In one implementation, the mobile device displays the passport information to allow a user to determine whether the passport is valid. In another implementation, the mobile device may be used to scan a physical passport presented by a person to obtain an image of the physical passport and to compare the image of the physical passport to the image of the passport securely stored in the blockchain residing on the government server. After obtaining read-only access to the passport information and finding the passport valid at 2912, the user may select a "Scan Item" button 2913 on the screen of the mobile device.

Figure 30:
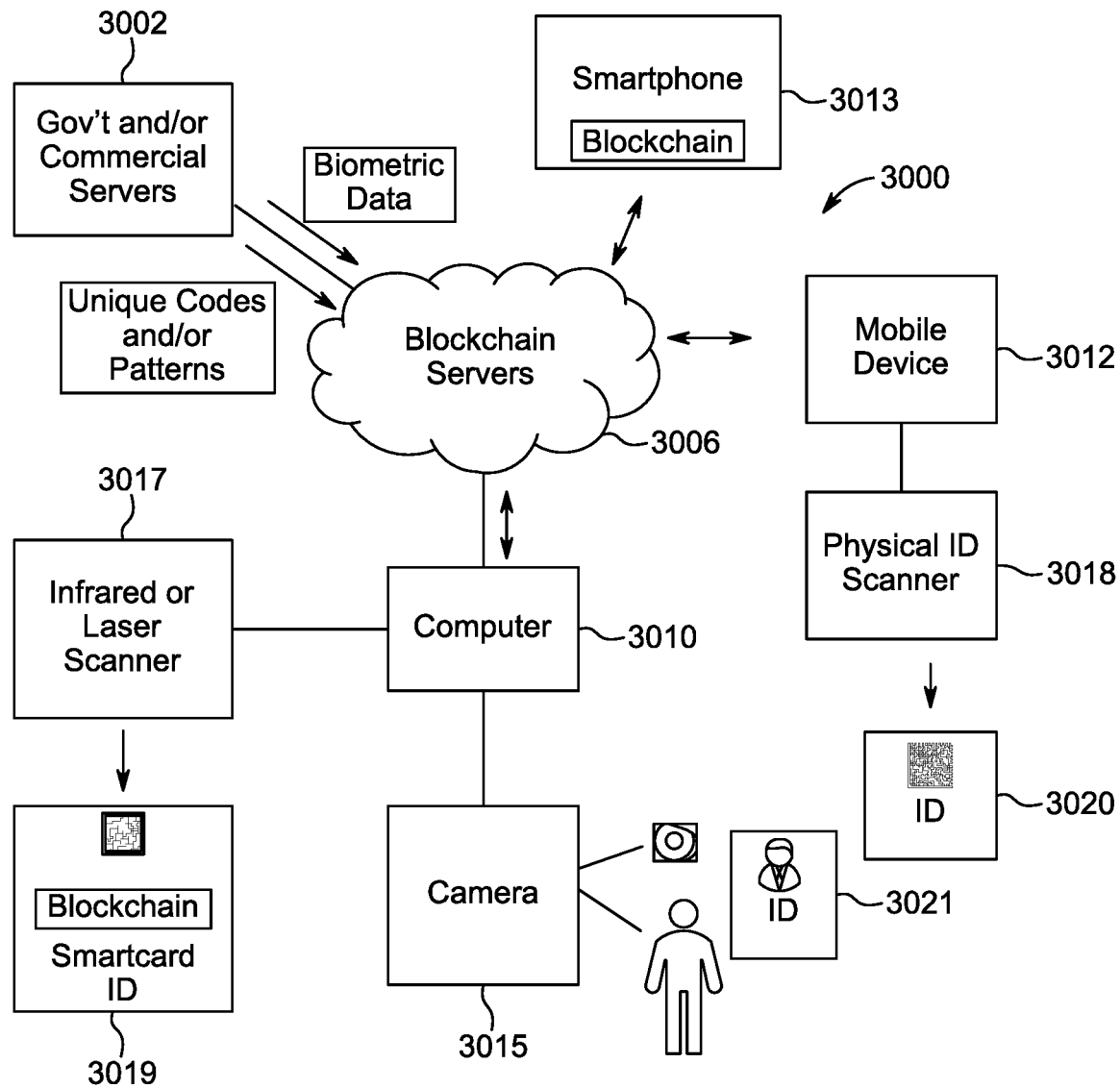
FIG. 30 is a system diagram of a blockchain identification system according to an embodiment of the present disclosure.

FIG. 30 is a system diagram of a blockchain identification system 3000 according to another embodiment of the present disclosure. The blockchain identification system 3000 includes government and/or commercial servers 3002, blockchain servers 3006, a computer 3010, a mobile device 3012, a smartphone or smartcard 3013, a camera 3015, an infrared or laser scanner 3017, a physical ID scanner 3018, a smartcard ID 3019, and IDs 3020 and 3021. As illustrated, the government and/or commercial servers 3002 may provide ID information, licensing information, biometric data, or unique codes and/or patterns to blockchain servers 3006 to add to identification blockchains stored on the blockchain servers 3006. The blockchains stored in the blockchain server 3006 may be stored redundantly in the smartphone 3013 or the smartcard ID 3019. The mobile device 3012 may connect to or otherwise communicate with a physical ID scanner 3018, which is used to scan the unique code of the ID 3020. The unique code of the ID 3020 is used to access a blockchain corresponding to the unique code of the ID 3020. The mobile device 3012 may only access a read-only version of all or a portion of the information stored in the blockchain corresponding to the unique code of the ID 3020 to determine the validity of the ID 3020.

The computer 3010 may connect to or otherwise communicate with an infrared or laser scanner 3018, which is used to scan the unique code of the smartcard ID 3019. The unique code of the smartcard ID 3019 is used to access a blockchain corresponding to the unique code of the smartcard ID 3019. The computer 3010 may only access a read-only version of all or a portion of the information stored in the blockchain corresponding to the unique code of the smartcard ID 3019 to determine the validity of the smartcard ID 3019.

The computer 3010 may connect to or otherwise communicate with a camera 3015, which is used to capture an image of an eye of a person, another feature of the person (e.g., vein patterns in a person's palm), or all or a portion of the ID 3021. The image is a unique image that is used to access a blockchain corresponding to the person.

Figure 31:
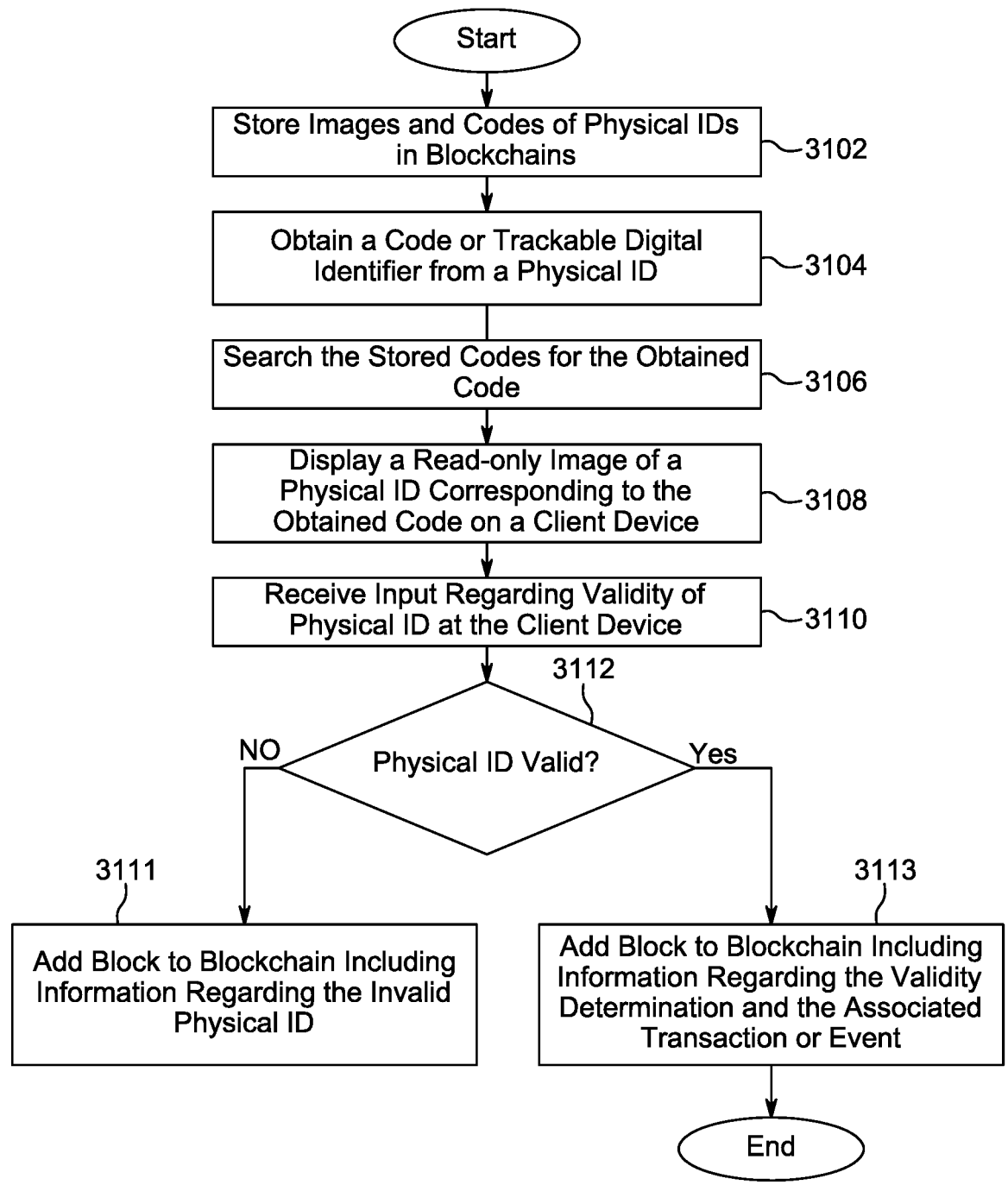
FIGS. 31-34 are flowcharts illustrating operation of a blockchain systems according to embodiments of the present disclosure.

FIG. 31 is a flowchart illustrating a method of determining the validity of a physical ID using a blockchain system according to an embodiment of the present disclosure. At block 3102, images and codes of physical IDs are stored in blockchains. The physical ID may be a government-issued identification card or document, a smartcard, a subdermal microchip, or a smartphone that displays an electronic ID. The images may be images of persons shown on the physical IDs or images of all or a portion of the physical IDs. At block 3104, a code or trackable digital identifier is obtained from a physical ID presented by a person. This may involve a government official using a scanner device to scan the physical ID and read a code or trackable digital identifier from the physical ID.

At block 3106, the blockchains are searched to find a stored code that matches the obtained code. At block 3108, if a match is found, a read-only image of a physical ID corresponding to the obtained code is transmitted to a client device. The user of the client device may then compare the read-only image of the physical ID with the physical ID presented by the person, and input information regarding the validity of the physical ID presented by the person to the client device. At block 3110, the input regarding the validity of the physical ID is received at the client device. At block 3112, it is determined whether the input indicates that the physical ID is valid. If the input indicates that the physical ID is valid, a blockchain block including information regarding the validity determination and an associated transaction or event is added to a blockchain at block 3113. If the input indicates that the physical ID is invalid, a blockchain block including information regarding the invalid physical ID and an associated transaction or event is added to a blockchain at block 3111.

Figure 32:
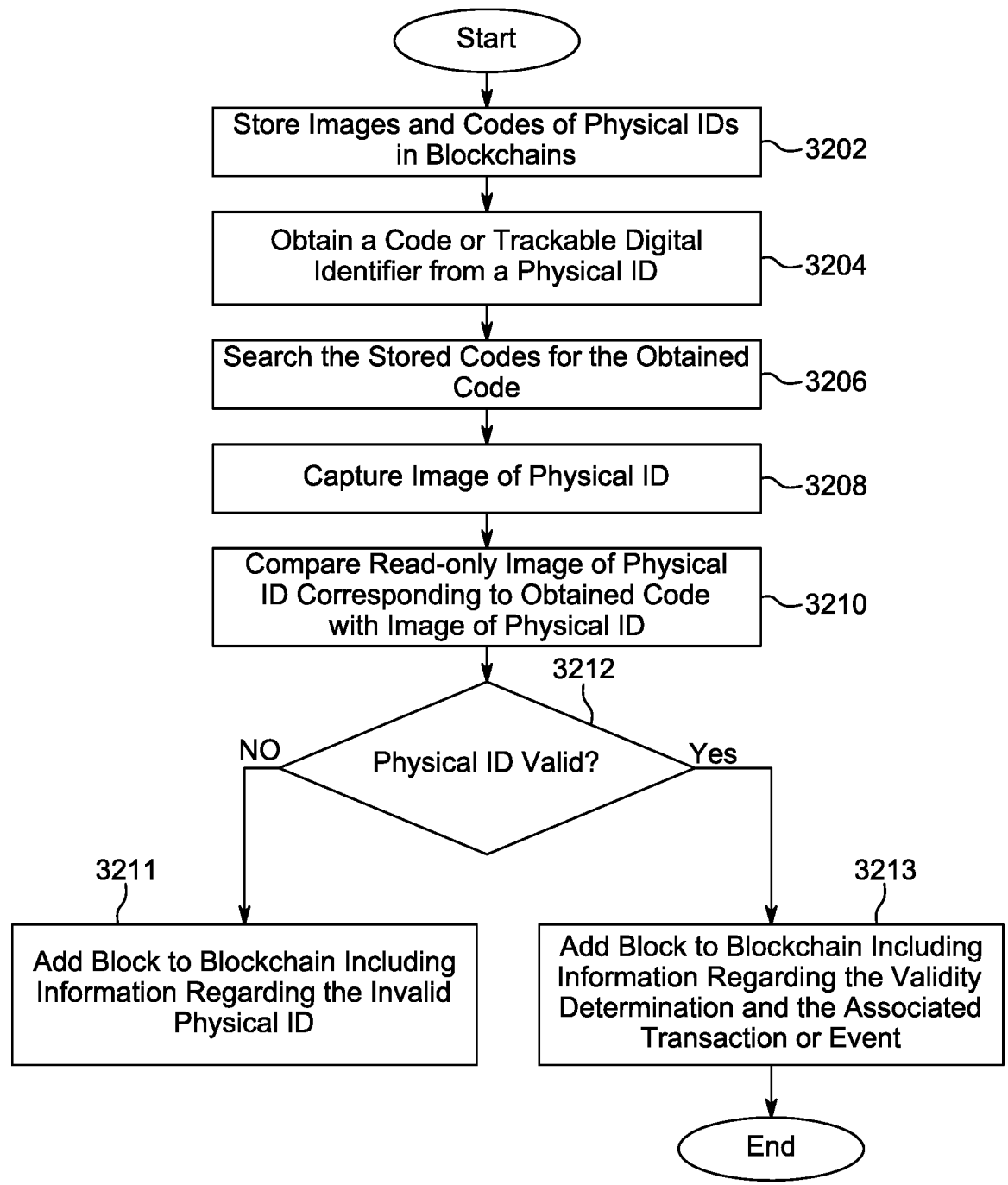

FIG. 32 is a flowchart illustrating a method of determining the validity of a physical ID using a blockchain system according to another embodiment of the present disclosure. At block 3202, images and codes of physical IDs are stored in blockchains. The physical ID may be a government-issued identification card or document, a smartcard, or a smartphone that displays an electronic ID. The images may be images of persons shown on the physical IDs or images of all or a portion of the physical IDs. At block 3204, a code or trackable digital identifier is obtained from a physical ID presented by a person. This may involve an official using a scanner device to scan the physical ID and read a code or trackable digital identifier from the physical ID.

At block 3206, the blockchains are searched to find a stored code that matches the obtained code. At block 3208, if a match is found, an image of the physical ID presented by the person is captured. At block 3210, an image of the physical ID stored in the blockchain is compared with the captured image of the physical ID. At block 3112, it is determined whether the physical ID is valid based on the comparison. If the physical ID is valid, a blockchain block including information regarding the validity determination and an associated transaction or event is added to a blockchain at block 3213. If the input indicates that the physical ID is invalid, a blockchain block including information regarding the invalid physical ID and an associated transaction or event is added to a blockchain at block 3211.

Figure 33:
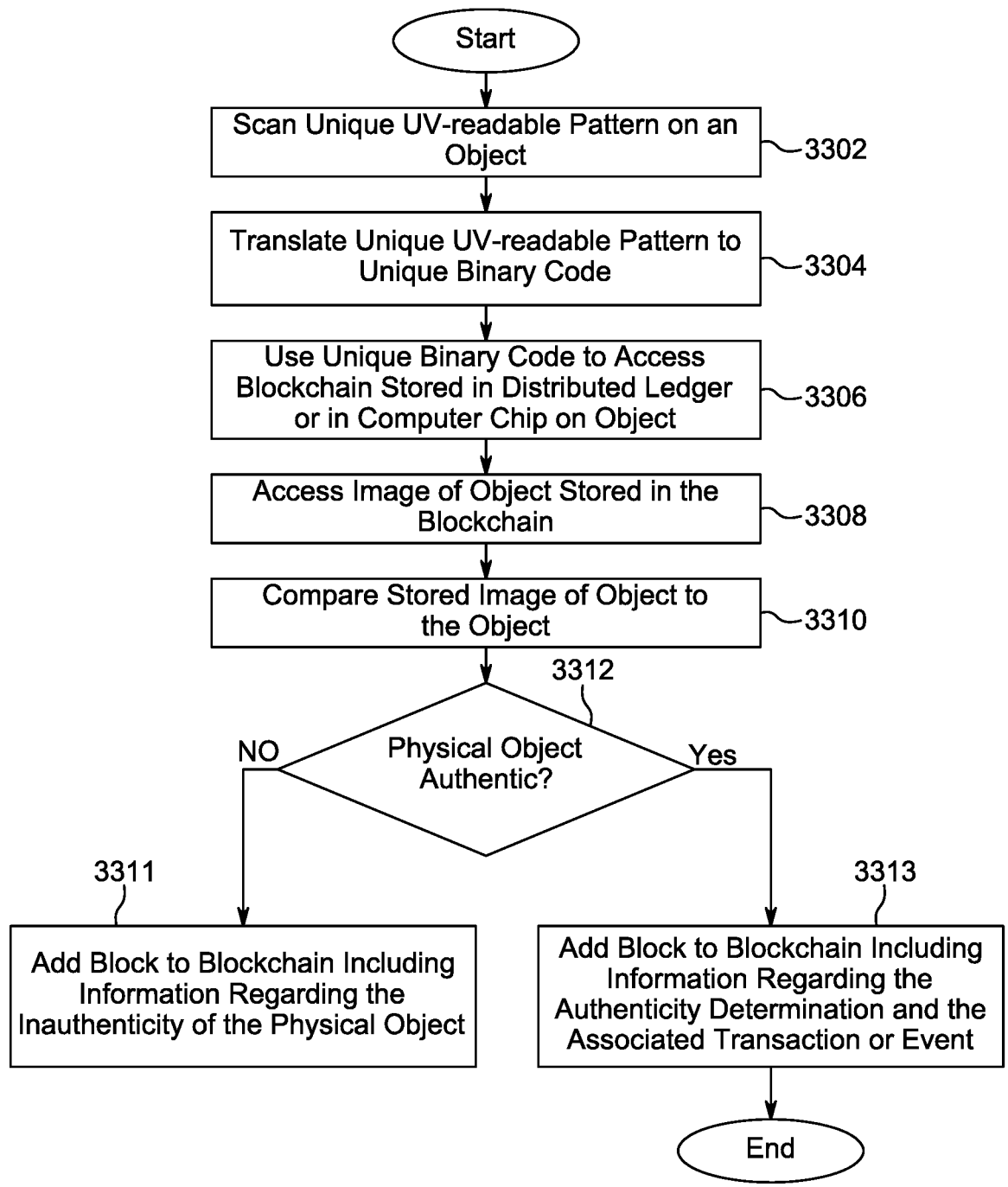

FIG. 33 is a flowchart illustrating a method of determining the authenticity of a physical object using a blockchain system according to an embodiment of the present disclosure. At block 3302, a unique UV-readable pattern on an object is scanned by a UV scanner or reader. At block 3304, the scanned unique UV-readable pattern is translated to a unique binary code. At block 3306, the unique binary code is used to access a blockchain stored in a distributed ledger or in a computer chip disposed on or incorporated in the physical object. At block 3308, an image of the object stored in the blockchain is accessed or obtained. At block 3310, an image of the physical object stored in the blockchain is compared with the physical object. At block 3312, it is determined whether the physical object is authentic based on the comparison. If the physical object is determined to be authentic, a blockchain block including information regarding the authenticity determination and an associated transaction or event is added to a blockchain at block 3313. If the physical object is determined to be inauthentic, a blockchain block including information regarding the inauthenticity of the physical object and an associated transaction or event is added to a blockchain at block 3311.

Figure 34:
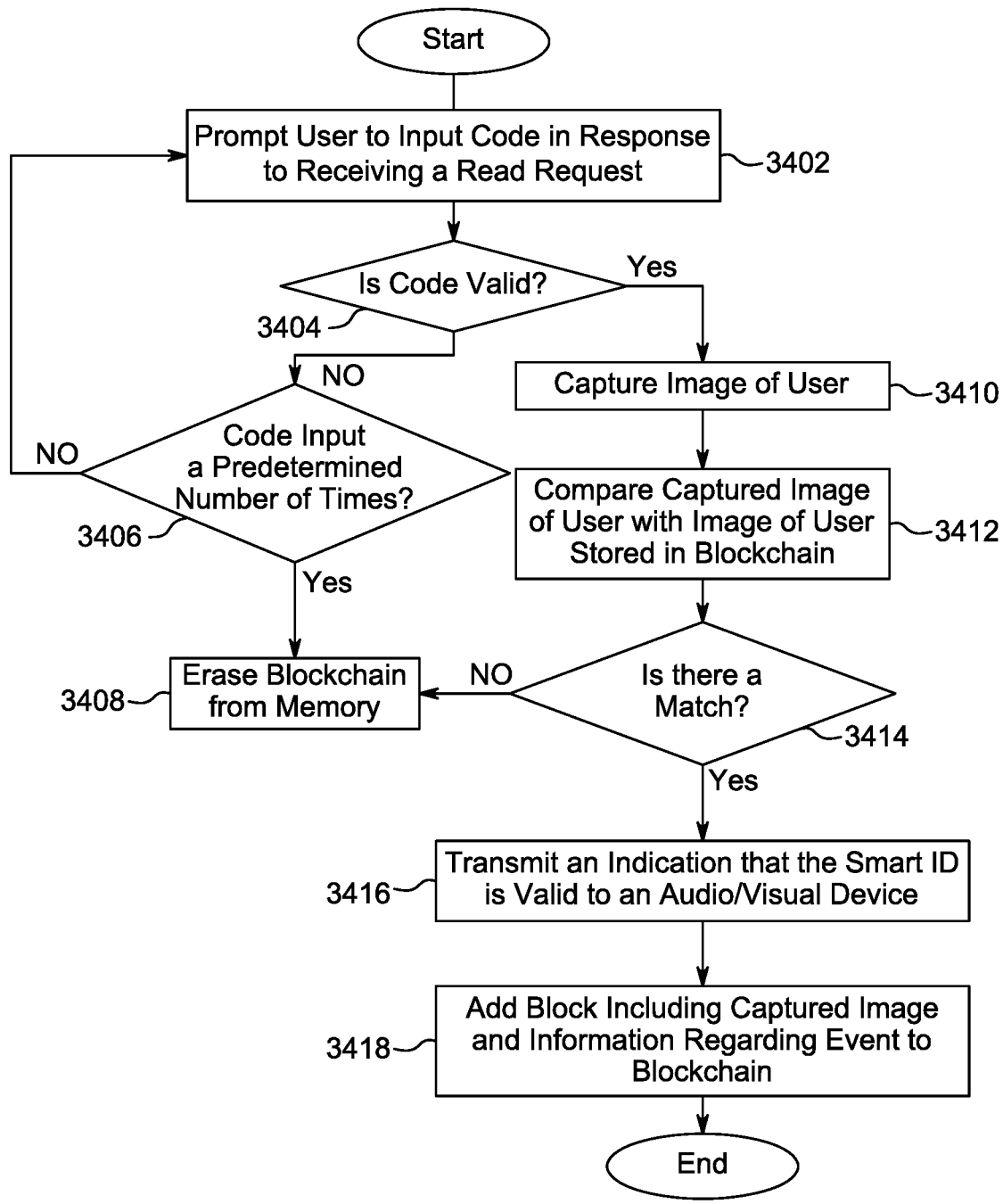

FIG. 34 is a flowchart illustrating a method of using an ID smart card or document according to an embodiment of the present disclosure. The ID smart card or document may be used to check the authenticity of the ID or verify age for a transaction (e.g., purchasing alcohol or renting a car). At block 3412, the user is prompted to input a code to a smartcard reader in response to the smartcard receiving a request to read a blockchain stored in the smartcard. At decision block 3404, it is determined whether the code is valid. The code may be stored in a block of the blockchain and may be a unique code. If the code is not valid, it is determined whether the code has been input a predetermined number of times, e.g., three or four times. If the code has been input a predetermined number of times, the blockchain is erased from memory of the smartcard at block 3408. In other implementations, all data in memory, including volatile and nonvolatile memory, is erased, or access to the blockchain or data is restricted. If the code has not been input a predetermined number of times, the smartcard causes the smartcard reader to again prompt the user to input a code at block 3402.

If the code is determined to be valid at block 3404, an image of the user is captured at block 3410 and the captured image is compared to image of user stored in the blockchain 3412. If it is determined that there is not a match at 3414, the blockchain is erased from memory at block 3408. If there is a match, an indication that the smart ID is valid is transmitted to an audio/visual device at block 3416. In implementations, the indication or alarm may be an audio indication, e.g., a chirping sound, or a visual indication, e.g., a textual message or an image indicating the validity of the smart ID. At block 3418, a block including the captured image and information regarding the event is added to the blockchain.

The identity event includes checking the authenticity of a physical ID (e.g., a smartcard ID) or verifying age for a transaction (e.g., purchasing alcohol or renting a car). If there is an identity event, a block including information regarding the event, identity information, and an image is added to a blockchain at block 3413. Then, before continuing to determine whether another identity event has occurred, an alarm is generated if the physical ID invalid and a block including information regarding invalidity of physical ID is added to the blockchain at block 3415.

Figure 35:
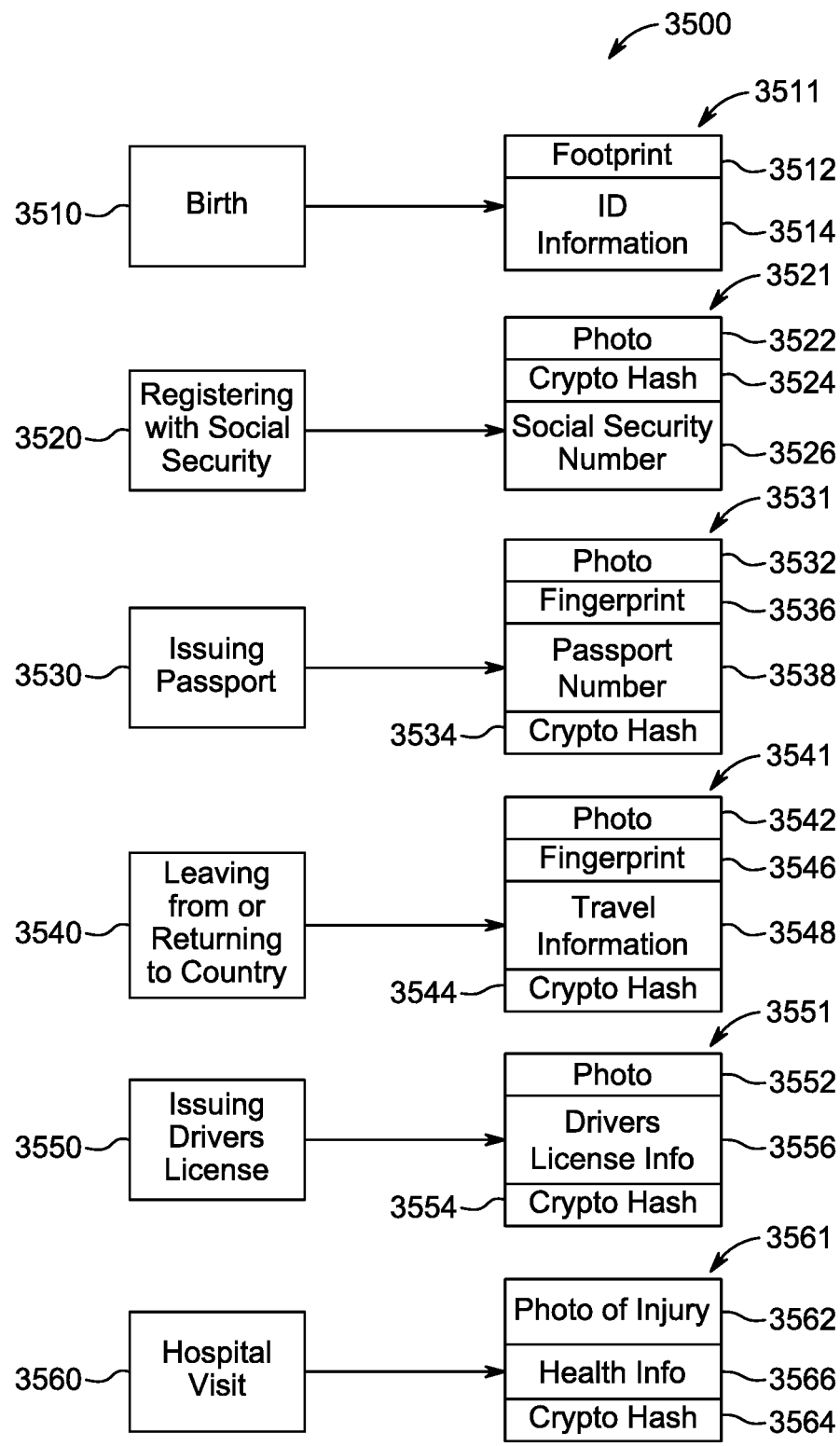
FIG. 35 is a block diagram illustrating the formation of an identification blockchain over a portion of a person's life according to an embodiment of the present disclosure.

FIG. 35 is a block diagram illustrating the formation of an identification blockchain over a portion of a person's life according to an embodiment of the present disclosure. In a person's life, each of the events 3500 trigger the creation of another block in the identification blockchain 3500. At birth 3510, the first block 3511 of the identification blockchain 3511 is created. The block 3511 includes a unique identification item, e.g., an image of a footprint 3512, and identification information 3514, e.g., the person's names, the person's parents' names, the date of birth, the place of birth, etc. The next event may be registering with social security 3520, in which case another block 3521 is created including other unique identification items, e.g., a photo 3522 and a social security number 3526 or a code, and a cryptographic hash value 3524, which is a fixed-sized alphanumeric string that is obtained by inputting block 3511 to a cryptographic hash function.

The next event may be issuing a passport 3530, in which case another block 3531 is created including unique identification items, e.g., an updated photo 3532, a fingerprint 3536, and a passport number 3538, and a cryptographic hash value 3524, which is obtained by inputting block 3521 to a cryptographic hash function. As illustrated by block 3531, multiple unique identification items may be layered in a single block. In some blocks, there may be no unique identification items. For example, an event may simply be to add transaction information, in which case a block would be created including only the updated transaction information.

The next event may be leaving from or returning to a country 3540, in which case another block 3541 is created including: (a) unique identification items, e.g., a photo 3542 taken by a government official or by a kiosk at a governmental checkpoint and another fingerprint 3546, (b) travel information 3548 (which may include destination information), and (c) a cryptographic hash value 3544, which is obtained by inputting block 3531 to a cryptographic hash function. The next event may be issuing a driver license 3550, in which case another block 3551 is created containing: (a) a unique identification item, e.g., a photo 3552 taken by a drivers license official, (b) driver license information 3556, which may include the type of license, address information, or organ donation information, and (c) a cryptographic hash value 3554, which is obtained by inputting block 3541 to a cryptographic hash function.

The next event may be a hospital visit 3560, in which case another block 3561 is created containing: (a) a photo of the injury 3562, (b) health information 3566, which may include recent diet history, recent sleep history, recent physical activity, or updated allergy information, and (c) a cryptographic hash value 3564, which is obtained by inputting block 3551 to a cryptographic hash function.

Figure 36:
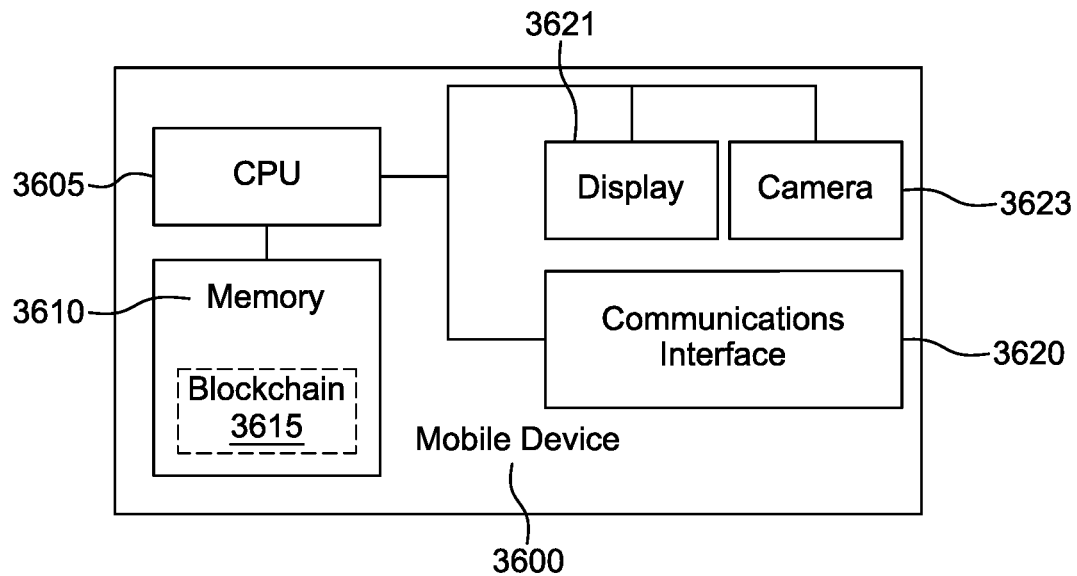
FIG. 36 is a block diagram of a smartphone storing a blockchain according to an embodiment of the present disclosure.

FIG. 36 is a block diagram of a mobile device 3600 according to an embodiment of the present disclosure. The mobile device 3600 includes a central processing unit (CPU) 3605, a memory 3610, a display 3621, a camera 3623, and a communications interface 3620. The memory 3610 may store an electronic ID and/or, optionally, a blockchain 3615. In a case where the mobile device 3600 cannot access a server or the Cloud to add one or more blocks to a blockchain, one or more blocks may be added to the blockchain 3615 and then, when the mobile device 3600 gains access to the server or the Cloud, the new blockchain 3615 may be used to update the blockchain stored in the server or in the Cloud.

Figure 37:
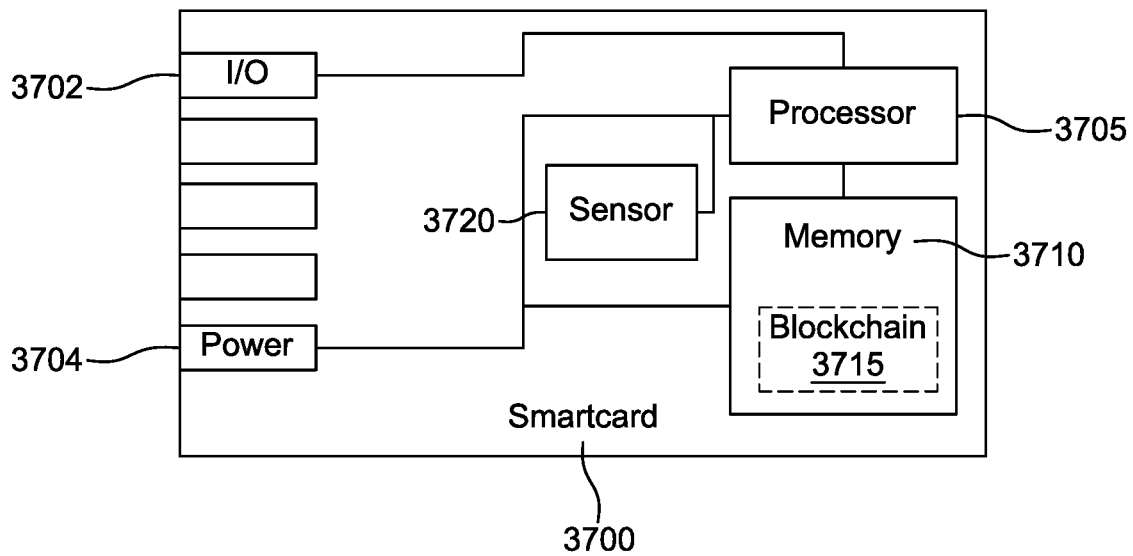
FIG. 37 is a block diagram of a smartcard storing a blockchain according to an embodiment of the present disclosure.

FIG. 37 is a block diagram of a smartcard 3700 according to an embodiment of the present disclosure. The smartcard 3700 has multiple contacts including an input/output contact 3702 and a power contact 3704. The smartcard 3700 also includes a processor 3705 and a memory 3710. The input/output contact 3702 is used for communicating messages between the processor 3705 and a card reader (not shown), which may have an input/output contact (not shown) configured to connect to the input/output contact 3702. The card reader provides power to the processor 3705 and the memory 3710 via the power contact 3704. Similar to the mobile device 3600 of FIG. 36, the memory 3710 may store a blockchain 3715, which may provide redundancy. The smartcard 3700 may be used as an identification card, which may serve as a passport or a driver license. In embodiments, the smartcard 3700 may incorporate features or measures to counter an attack on the smartcard 3700 to extract information from the memory 3710. The smartcard may include a sensor 3720 that senses an attack and causes the processor 3705 to erase all data stored in the memory 3710 or to restrict access to all or a portion of the data stored in the memory 3710. The sensor 3720 may be a sensor which senses an abnormal environment or an environment in which an attacker would typically place the smart card to launch an attack to extract information from the smart card. The sensor 3720 may be a light-sensitive sensor. Alternatively, the sensor 3720 may be a grid or pattern of wires, traces, or other type of conductive material disposed on or adjacent to the microchip, which when severed, tampered with, broken, or otherwise manipulated causes the processor 3705 to erase all data stored in the memory 3710 or to restrict access to all or a portion of the data stored in the memory 3710.

The management systems and methods in this disclosure may be applied to healthcare, education, government, warehouse, defense, oil and gas, utility, telecom and cable, manufacturing, shipboard and marine, etc.

Blockchain's smart contract may be written with ASP-.NET, an open-source server-side web application framework designed for web development to produce dynamic web pages. C# may be another multi-paradigm programming language encompassing strong typing, imperative, declarative, functional, generic, object-oriented (class-based), and component-oriented programming disciplines. It was developed by Microsoft within its .NET initiative and later approved as a standard by Ecma (ECMA-334) and ISO (ISO/IEC 23270:2006). C# is one of the programming languages designed for the Common Language Infrastructure.

In some embodiments, a duplicate blockchain is stored on a computer chip to provide another layer of security. The duplicate blockchain may be referred to as a copy of a blockchain or a child blockchain of the parent or original blockchain. The information in the child blockchain may be accessed by using a child key, which may be revoked by a parent key associated with the parent blockchain, which is stored in one or more server.

In embodiments, the code is a QR code, a bar code, a serialized code, a code or pattern etched in the physical object, or a material embedded in the physical object and having a pattern readable by illuminating the material with ultraviolet light, infrared light, blue light, or red light. In some embodiments, the security features of the physical identification document, e.g., biometrics or a pattern readable by different wavelengths of light, incorporate a code or pattern. For example, the system may use an infrared camera or infrared sensor to read a code in the security features of a passport.

In some embodiments, multiple codes may be layered or stacked to increase the security of the information stored in the blockchain. For example, one code may be read using blue laser light and another code may be read using ultraviolet laser light. In some implementations, the codes are read by different systems.

In the embodiment where a user manually compares the physical identification document to the read-only version of the image of the physical identification document, if the user determines that the physical identification document is invalid, the user, e.g., a government official, may make a gesture in a user interface to add a flag and/or a description relating to the invalid determination to the blockchain. In this way, for example, a system can track people that are fraudulently using social security numbers, e.g., social security numbers of deceased persons.

In embodiments, the system may perform image processing to generate an age-adjusted image of a person based on an original image stored in a block of the blockchain for identification documents. This age-adjusted image may be added to the blockchain. Then, facial recognition technology may be used to compare an existing image of the person to the age-adjusted image to determine whether the physical identification document is authentic. This would be especially useful in older passports, which may not accurately reflect current facial features.

Embodiments of this disclosure may be applied to historical artifacts, e.g., coins, to determine whether the historical artifacts are counterfeit. For example, a painting may be authenticated by scanning the painting with laser light, e.g., infrared or blue light, to read one or more unique codes, patterns, or other information in the painting. The blockchain of the painting may be stored on a computer chip embedded in the painting. The blockchain may include an image or other electronic depiction of the painting. The painting may be more valuable because it includes blockchain information that is used to verify the authenticity and/or provenance of the painting. The unique information stored in the blockchain of the painting may include multiple codes or patterns or biometric information, which may be stacked to increase security. Unique identification information that is stacked in a blockchain may make an associated smart contract much more enforceable because of the immutability.

In embodiments, the system may require a user to use two-way authentication techniques to access, view, and/or update a blockchain information to ensure security and reliability of the blockchain information. For example, a user may be required to log into an account and enter a code sent to a smart device that is on record and is known to be associated with the user.

Embodiments of this disclosure may be used to verify the record and/or history of a potential job candidate or potential tenant. For example, a landlord or employer could scan information from a driver license or passport and obtain information that would give the landlord or employer a more accurate understanding of the background of a potential tenant or employee. The blockchain information may also be useful in allowing access to predetermined areas or rooms in a building using an RFID carried by users.

The blockchain may include a medical history, which may be updated each time a user visits a doctor or other medical professional. This blockchain may be in a computer chip on a card. For example, the blockchain information may be used to automatically inform the social security administration, etc. when a person dies so that the social security number can be canceled and not fraudulently used.

Embodiments of the disclosure may be applied to a variety of physical objects including currency, teacups, clothing, eyewear, pharmaceuticals, alcohol, tobacco, footwear, eyewear, socks, underwear, toothpaste, soda cans, butane, hardware, plywood, hammers, rakes, nails, topsoil, chickens, foodstuffs, containers holding liquids such as crude oil or gasoline, any item that can be produced or manufactured, etc.

It will be understood that various modifications may be made to the embodiments of the presently disclosed adapter assemblies. Therefore, the above description should not be construed as limiting, but merely as exemplifications of embodiments. Those skilled in the art will envision other modifications within the scope and spirit of the present disclosure.

What is claimed is:

1. A method for validating authenticity of a physical identification object, the method comprising:
storing a plurality of images of users, a plurality of respective read-only images of physical identification objects and a plurality of trackable digital identifiers of the physical identification objects in a respective plurality of blockchains residing at one or more servers;
receiving a request to obtain a read-only image of a physical identification object;
prompting a user to input a code in response to the request to read the read-only image of the physical identification object;
determining that the code is valid;
in response to determining that the code is valid, capturing an image of the user and determining that the captured image of the user matches the image of the user stored in the blockchain;
in response to determining that the captured image of the user matches the image of the user stored in the blockchain:
scanning at least a portion of a physical identification object to obtain a trackable digital identifier from the physical identification object;
searching the plurality of trackable digital identifiers for the obtained trackable digital identifier;
transmitting a read-only image of a physical identification object corresponding to the obtained trackable digital identifier to a client device via a high value data sharing protocol;
comparing the scanned at least a portion of the physical identification object with the read-only image of the physical identification object to automatically recognize that the physical identification object is invalid; and
in response to automatically recognizing that the physical identification object is invalid, adding a block including information regarding the invalid physical identification object to a blockchain associated with the user.

2. The method according to claim 1, further comprising displaying an error message if it is determined that the imaged or scanned physical identification object is not authentic.

3. The method according to claim 1, wherein obtaining the trackable digital identifier includes imaging or scanning at least a portion of the physical identification object including the trackable digital identifier and performing image recognition to determine a numeric or alphanumeric string corresponding to the trackable digital identifier.

4. The method according to claim 1, wherein the physical identification object is a driver license, a passport, a visa, a chip embedded within a document, a film within currency, a hologram, or a government identification document or card.

5. The method according to claim 1, wherein the client device is a mobile device, a smart phone, a tablet, a laptop, or a desktop computer.

6. The method according to claim 1, wherein the trackable digital identifier is a QR code, a bar code, a serialized code, a chip, a code or pattern etched in the physical identification object, or a material embedded in the physical identification object and having a pattern readable by illuminating the material with ultraviolet light, infrared light, blue light, or red light.

7. The method according to claim 1, further comprising:
determining that the physical identification object is a valid identification document based on the read-only image of the physical identification object; and
in response to determining that the physical identification object is a valid identification document, adding a block including information regarding the valid physical identification object and the associated transaction or event to a blockchain associated with a user.

8. The method according to claim 1, wherein scanning the physical identification object includes scanning the physical identification object with a mobile computing device, further comprising transmitting the obtained trackable digital identifier to the one or more servers to search the plurality of trackable digital identifiers in the plurality of blockchains for the obtained trackable digital identifier.

9. The method according to claim 1, further comprising storing the plurality of images of physical identification objects and trackable digital identifiers of the physical identification objects in a blockchain residing on a mobile device.

10. The method according to claim 1, further comprising:
receiving verification information for a physical identification object from an issuing authority computing device; and
storing the verification information in the plurality of blockchains.

11. The method according to claim 1, further comprising displaying a first management user interface enabling a user to create a type of physical identification object.

12. The method according to claim 11, further comprising, in response to generating a type of physical identification object, displaying a second management user interface enabling a user to create a batch of physical identification objects based on the created type of physical identification object.

13. The method according to claim 12, further comprising, in response to creating a batch of physical identification objects, displaying a third management user interface enabling a user to generate trackable digital identifiers for the batch of physical identification objects.

14. The method according to claim 1, further comprising:
determining that the code is invalid;
in response to determining that the code is invalid, determining that the code is input a predetermined number of times; and
in response to determining that the code is input a predetermined number of times, erasing the user's blockchain from memory.

15. The method according to claim 1, further comprising:
determining that the captured image of the user does not match the image of the user stored in the blockchain; and
in response to determining that the captured image of the user matches the image of the user stored in the blockchain, erasing the user's blockchain from memory.

\* \* \* \* \*